US008666838B2

(12) United States Patent
Bamborough et al.

(10) Patent No.: US 8,666,838 B2
(45) Date of Patent: *Mar. 4, 2014

(54) ELECTRONIC COMMERCE TRANSACTIONS WITHIN A MARKETING SYSTEM THAT MAY CONTAIN A MEMBERSHIP BUYING OPPORTUNITY

(75) Inventors: David L. Bamborough, Kentwood, MI (US); James G. Blodgett, Kentwood, MI (US); William R. Dangl, Ada, MI (US); Robin A. Horder-Koop, Holland, MI (US); James P. Hunking, London (CA); Kenneth J. McDonald, Ada, MI (US); John P. Parker, Ada, MI (US); Kelly K. Savage, Byron Center, MI (US); Claire E. Zevalkink, Grand Rapids, MI (US); Thomas D. Paasche, Grand Rapids, MI (US)

(73) Assignee: Amway Corp., Ada, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,133

(22) Filed: Jul. 6, 2012

(65) Prior Publication Data

US 2012/0278153 A1    Nov. 1, 2012

Related U.S. Application Data

(60) Division of application No. 12/821,385, filed on Jun. 23, 2010, now Pat. No. 8,239,272, which is a continuation of application No. 11/453,624, filed on Jun. 15, 2006, now Pat. No. 7,778,884, which is a continuation of application No. 09/714,739, filed on Nov. 16, 2000, now Pat. No. 7,359,871, which is a continuation of application No. 09/515,860, filed on Feb. 29, 2000, now Pat. No. 6,980,962.

(60) Provisional application No. 60/126,493, filed on Mar. 25, 1999, provisional application No. 60/122,385, filed on Mar. 2, 1999.

(51) Int. Cl.
*G06Q 30/00*    (2012.01)

(52) U.S. Cl.
USPC ........................................ 705/26.1; 705/27.1

(58) Field of Classification Search
USPC ................................................ 705/26.1, 27.1
See application file for complete search history.

(56) References Cited

U.S. PATENT DOCUMENTS

| | | | |
|---|---|---|---|
| 4,797,818 A | 1/1989 | Cotter | |
| 4,799,156 A | 1/1989 | Shavit et al. | |

(Continued)

FOREIGN PATENT DOCUMENTS

| | | |
|---|---|---|
| CA | 2184380 | 11/1995 |
| CA | 2183274 | 2/1997 |

(Continued)

OTHER PUBLICATIONS

Michaud, Anne, Crouch, Gregory, Resurrected Fund America Puts Its Troubles Behind It Regulation: Despite bankruptcy and the criminal trial of its founder, the Irvine marketing company is back in business.: [Orange County Edition] Los Angeles Times (pre-1997 Fulltext) [Los Angeles, Calif] Aug. 25, 1991, downloaded from ProQuestDirect on the internet.*

(Continued)

*Primary Examiner* — James Zurita
(74) *Attorney, Agent, or Firm* — Brinks Gilson & Lione

(57) ABSTRACT

The present invention is directed to a system and method for providing complete electronic commerce ("E-Commerce") transactions and solutions for a marketing company's products via the World Wide Web, including facilities for signing up new customers and recruiting, training and supporting new Independent Business Owners through an interactive online process. In another aspect, the present invention relates to the combination of a marketing business with a membership buying opportunity using both electronic commerce and face-to-face transactions. The present invention is also directed to a system and method for combining a marketing business with a membership buying opportunity, so that Independent Business Owners participating in the marketing plan can introduce customers to a membership buying opportunity and earn bonuses or commissions based on the purchases by those members, while Members in the buying opportunity can consume products or, at their option, qualify to become Independent Business Owners.

11 Claims, 40 Drawing Sheets

(56) References Cited

U.S. PATENT DOCUMENTS

| | | |
|---|---|---|
| 4,941,090 A | 7/1990 | McCarthy |
| 4,958,280 A | 9/1990 | Pauly et al. |
| 4,972,318 A | 11/1990 | Brown et al. |
| 4,984,155 A | 1/1991 | Geier et al. |
| 4,992,940 A | 2/1991 | Dworkin |
| 5,025,372 A | 6/1991 | Burton et al. |
| 5,053,957 A | 10/1991 | Suzuki |
| 5,056,019 A | 10/1991 | Schultz et al. |
| 5,063,507 A | 11/1991 | Lindsey et al. |
| 5,117,355 A | 5/1992 | McCarthy |
| 5,173,851 A | 12/1992 | Off et al. |
| 5,185,695 A | 2/1993 | Pruchnicki |
| 5,202,826 A | 4/1993 | McCarthy |
| 5,231,571 A | 7/1993 | D'Agostino |
| 5,233,514 A | 8/1993 | Ayyoubi et al. |
| 5,283,731 A | 2/1994 | Lalonde et al. |
| 5,287,268 A | 2/1994 | McCarthy |
| 5,289,371 A | 2/1994 | Abel et al. |
| 5,293,310 A | 3/1994 | Carroll et al. |
| 5,319,542 A | 6/1994 | King, Jr. et al. |
| 5,351,186 A | 9/1994 | Bullock et al. |
| 5,359,508 A | 10/1994 | Rossides |
| 5,380,991 A | 1/1995 | Valencia et al. |
| 5,402,336 A | 3/1995 | Spiegelhoff et al. |
| 5,440,479 A | 8/1995 | Hutton |
| 5,475,585 A | 12/1995 | Bush |
| 5,483,445 A | 1/1996 | Pickering |
| 5,493,490 A | 2/1996 | Johnson |
| 5,528,490 A | 6/1996 | Hill |
| 5,537,314 A | 7/1996 | Kanter |
| 5,541,925 A | 7/1996 | Pittenger et al. |
| 5,548,110 A | 8/1996 | Storch et al. |
| 5,555,496 A | 9/1996 | Tackbary et al. |
| 5,557,518 A | 9/1996 | Rosen |
| 5,590,197 A | 12/1996 | Chen et al. |
| 5,592,375 A | 1/1997 | Salmon et al. |
| 5,592,376 A | 1/1997 | Hodroff |
| 5,592,611 A | 1/1997 | Midgely et al. |
| 5,621,201 A | 4/1997 | Langhans et al. |
| 5,621,797 A | 4/1997 | Rosen |
| 5,634,012 A | 5/1997 | Stefik et al. |
| 5,638,519 A | 6/1997 | Haluska |
| 5,642,419 A | 6/1997 | Rosen |
| 5,655,089 A | 8/1997 | Bucci |
| 5,664,110 A | 9/1997 | Green et al. |
| 5,664,111 A | 9/1997 | Nahan et al. |
| 5,666,493 A | 9/1997 | Wojcik et al. |
| 5,671,279 A | 9/1997 | Elgamal |
| 5,678,041 A | 10/1997 | Baker et al. |
| 5,684,963 A | 11/1997 | Clement |
| 5,684,965 A | 11/1997 | Pickering |
| 5,694,551 A | 12/1997 | Doyle et al. |
| 5,696,898 A | 12/1997 | Baker et al. |
| 5,703,949 A | 12/1997 | Rosen |
| 5,708,780 A | 1/1998 | Levergood et al. |
| 5,710,887 A | 1/1998 | Chelliah et al. |
| 5,715,314 A | 2/1998 | Payne et al. |
| 5,715,399 A | 2/1998 | Bezos |
| 5,715,448 A | 2/1998 | Suzuki et al. |
| 5,724,424 A | 3/1998 | Gifford |
| 5,727,048 A | 3/1998 | Hiroshima et al. |
| 5,727,163 A | 3/1998 | Bezos |
| 5,732,400 A | 3/1998 | Mandler et al. |
| 5,734,838 A | 3/1998 | Robinson et al. |
| 5,737,539 A | 4/1998 | Edelson et al. |
| 5,740,549 A | 4/1998 | Reilly et al. |
| 5,742,931 A | 4/1998 | Spiegelhoff et al. |
| 5,745,681 A | 4/1998 | Levine et al. |
| 5,745,882 A | 4/1998 | Bixler et al. |
| 5,757,917 A | 5/1998 | Rose et al. |
| 5,758,327 A | 5/1998 | Gardner et al. |
| 5,758,328 A | 5/1998 | Giovannoli |
| 5,761,647 A | 6/1998 | Boushy |
| 5,761,648 A | 6/1998 | Golden et al. |
| 5,761,650 A | 6/1998 | Munsil et al. |
| 5,765,141 A | 6/1998 | Spector |
| 5,765,143 A | 6/1998 | Sheldon et al. |
| 5,774,670 A | 6/1998 | Montulli |
| 5,774,868 A | 6/1998 | Cragun et al. |
| 5,774,870 A | 6/1998 | Storey |
| 5,774,874 A | 6/1998 | Veeneman et al. |
| 5,781,632 A | 7/1998 | Odom |
| 5,784,565 A | 7/1998 | Lewine |
| 5,790,025 A | 8/1998 | Amer et al. |
| 5,790,677 A | 8/1998 | Fox et al. |
| 5,794,207 A | 8/1998 | Walker et al. |
| 5,794,210 A | 8/1998 | Goldhaber et al. |
| 5,794,234 A | 8/1998 | Church et al. |
| 5,794,395 A | 8/1998 | Reed |
| 5,794,396 A | 8/1998 | Gibbs |
| 5,794,399 A | 8/1998 | Searer |
| 5,796,393 A | 8/1998 | MacNaughton et al. |
| 5,796,841 A | 8/1998 | Cordery et al. |
| 5,799,283 A | 8/1998 | Francisco et al. |
| 5,799,284 A | 8/1998 | Bourquin |
| 5,799,285 A | 8/1998 | Klingman |
| 5,802,497 A | 9/1998 | Manasse |
| 5,805,798 A | 9/1998 | Kearns et al. |
| 5,806,045 A | 9/1998 | Biorge et al. |
| 5,812,769 A | 9/1998 | Graber et al. |
| 5,822,736 A | 10/1998 | Hartman et al. |
| 5,825,881 A | 10/1998 | Colvin, Sr. |
| 5,825,884 A | 10/1998 | Zdepski et al. |
| 5,826,241 A | 10/1998 | Stein et al. |
| 5,826,242 A | 10/1998 | Montulli |
| 5,832,457 A | 11/1998 | O'Brien et al. |
| 5,832,482 A | 11/1998 | Yu et al. |
| 5,842,178 A | 11/1998 | Giovannoli |
| 5,845,267 A | 12/1998 | Ronen |
| 5,850,442 A | 12/1998 | Muftic |
| 5,850,446 A | 12/1998 | Berger et al. |
| 5,852,809 A | 12/1998 | Abel et al. |
| 5,857,175 A | 1/1999 | Day et al. |
| 5,860,068 A | 1/1999 | Cook |
| 5,864,822 A | 1/1999 | Baker, III |
| 5,864,823 A | 1/1999 | Levitan |
| 5,864,829 A | 1/1999 | Tago |
| RE36,116 E | 2/1999 | McCarthy |
| 5,870,716 A | 2/1999 | Sugiyama et al. |
| 5,870,717 A | 2/1999 | Wiecha |
| 5,870,718 A | 2/1999 | Spector |
| 5,870,733 A | 2/1999 | Bass et al. |
| 5,870,753 A | 2/1999 | Chang et al. |
| 5,878,139 A | 3/1999 | Rosen |
| 5,890,132 A | 3/1999 | Sanders |
| 5,892,900 A | 4/1999 | Ginter et al. |
| 5,893,076 A | 4/1999 | Hafner et al. |
| 5,893,098 A | 4/1999 | Peters et al. |
| 5,893,904 A | 4/1999 | Harris et al. |
| 5,895,454 A | 4/1999 | Harrington |
| 5,897,620 A | 4/1999 | Walker et al. |
| 5,897,622 A | 4/1999 | Blinn et al. |
| 5,897,639 A | 4/1999 | Greef et al. |
| 5,899,980 A | 5/1999 | Wilf et al. |
| 5,899,982 A | 5/1999 | Randle |
| 5,901,287 A | 5/1999 | Bull et al. |
| 5,903,652 A | 5/1999 | Mital |
| 5,903,877 A | 5/1999 | Berkowitz et al. |
| 5,903,878 A | 5/1999 | Talati et al. |
| 5,905,973 A | 5/1999 | Yonezawa et al. |
| 5,907,831 A | 5/1999 | Lotvin et al. |
| 5,909,023 A | 6/1999 | Ono et al. |
| 5,909,492 A | 6/1999 | Payne et al. |
| 5,909,671 A | 6/1999 | Byford et al. |
| 5,910,987 A | 6/1999 | Ginter et al. |
| 5,911,143 A | 6/1999 | Deinhart et al. |
| 5,915,019 A | 6/1999 | Ginter et al. |
| 5,915,243 A | 6/1999 | Smolen |
| 5,915,244 A | 6/1999 | Jack et al. |
| 5,918,014 A | 6/1999 | Robinson |
| 5,918,211 A | 6/1999 | Sloane |
| 5,918,213 A | 6/1999 | Bernard et al. |
| 5,918,214 A | 6/1999 | Perkowski |
| 5,918,215 A | 6/1999 | Yoshioka et al. |

(56) References Cited

U.S. PATENT DOCUMENTS

| | | |
|---|---|---|
| 5,918,228 A | 6/1999 | Rich et al. |
| 5,918,229 A | 6/1999 | David et al. |
| 5,920,861 A | 7/1999 | Hall et al. |
| 5,924,077 A | 7/1999 | Beach et al. |
| 5,924,080 A | 7/1999 | Johnson |
| 5,926,798 A | 7/1999 | Carter |
| 5,930,764 A | 7/1999 | Melchione et al. |
| 5,930,767 A | 7/1999 | Reber et al. |
| 5,933,599 A | 8/1999 | Nolan |
| 5,937,390 A | 8/1999 | Hyodo |
| 5,937,391 A | 8/1999 | Ikeda et al. |
| 5,937,392 A | 8/1999 | Alberts |
| 5,937,393 A | 8/1999 | O'Leary et al. |
| 5,937,394 A | 8/1999 | Wong et al. |
| 5,940,807 A | 8/1999 | Purcell |
| 5,946,665 A | 8/1999 | Suzuki et al. |
| 5,948,061 A | 9/1999 | Merriman et al. |
| 5,950,178 A | 9/1999 | Borgato |
| 5,956,693 A | 9/1999 | Geerlings |
| 5,956,695 A | 9/1999 | Carrithers et al. |
| 5,956,699 A | 9/1999 | Wong et al. |
| 5,960,411 A | 9/1999 | Hartman et al. |
| 5,960,416 A | 9/1999 | Block |
| 5,963,915 A | 10/1999 | Kirsch |
| 5,963,924 A | 10/1999 | Williams et al. |
| 5,963,925 A | 10/1999 | Kolling et al. |
| 5,966,695 A | 10/1999 | Melchione et al. |
| 5,970,469 A | 10/1999 | Scroggie et al. |
| 5,970,470 A | 10/1999 | Walker et al. |
| 5,970,471 A | 10/1999 | Hill |
| 5,970,472 A | 10/1999 | Allsop et al. |
| 5,970,473 A | 10/1999 | Gerszberg et al. |
| 5,970,474 A | 10/1999 | LeRoy et al. |
| 5,970,475 A | 10/1999 | Barnes et al. |
| 5,987,423 A | 11/1999 | Arnold et al. |
| 5,987,429 A | 11/1999 | Maritzen et al. |
| 5,987,498 A | 11/1999 | Athing et al. |
| 5,991,735 A | 11/1999 | Gerace |
| 5,991,736 A | 11/1999 | Ferguson et al. |
| 5,991,738 A | 11/1999 | Ogram |
| 5,991,739 A | 11/1999 | Cupps et al. |
| 5,991,740 A | 11/1999 | Messer |
| 5,995,092 A | 11/1999 | Yuen et al. |
| 5,995,942 A | 11/1999 | Smith et al. |
| 5,995,943 A | 11/1999 | Bull et al. |
| 5,996,001 A | 11/1999 | Quarles et al. |
| 5,996,006 A | 11/1999 | Speicher |
| 5,999,914 A | 12/1999 | Blinn et al. |
| 5,999,915 A | 12/1999 | Nahan et al. |
| 6,000,832 A | 12/1999 | Franklin et al. |
| 6,014,641 A | 1/2000 | Loeb et al. |
| 6,016,484 A | 1/2000 | Williams et al. |
| 6,026,376 A | 2/2000 | Kenney |
| 6,029,141 A | 2/2000 | Bezos et al. |
| 6,044,205 A | 3/2000 | Reed et al. |
| 6,047,268 A | 4/2000 | Bartoli et al. |
| 6,049,778 A * | 4/2000 | Walker et al. ............. 705/14.14 |
| 6,105,001 A | 8/2000 | Masi et al. |
| 6,112,186 A | 8/2000 | Bergh et al. |
| 6,115,690 A | 9/2000 | Wong |
| 6,134,533 A * | 10/2000 | Shell ........................ 705/26.82 |
| 6,182,050 B1 | 1/2001 | Ballard |
| 6,219,692 B1 | 4/2001 | Stiles |
| 6,223,209 B1 | 4/2001 | Watson |
| 6,249,772 B1 | 6/2001 | Walker et al. |
| 6,249,773 B1 | 6/2001 | Allard et al. |
| 6,282,517 B1 | 8/2001 | Wolfe et al. |
| 6,298,373 B1 | 10/2001 | Burns et al. |
| 6,327,573 B1 | 12/2001 | Walker et al. |
| 6,332,124 B1 | 12/2001 | Loeb et al. |
| 6,336,100 B1 | 1/2002 | Yamada |
| 6,338,047 B1 | 1/2002 | Wallman |
| 6,370,580 B2 | 4/2002 | Kriegsman |
| 6,415,265 B1 | 7/2002 | Shell et al. |
| 6,421,648 B1 | 7/2002 | Gagnon et al. |
| 6,466,671 B1 | 10/2002 | Maillard et al. |
| 6,578,010 B1 | 6/2003 | Teacherson |
| 6,594,641 B1 | 7/2003 | Southam |
| 6,662,164 B1 | 12/2003 | Koppelman et al. |
| 6,782,369 B1 | 8/2004 | Carrott |
| 2001/0034658 A1 | 10/2001 | Silva et al. |
| 2001/0051905 A1 | 12/2001 | Lucas |
| 2002/0059114 A1 | 5/2002 | Cockrill et al. |
| 2002/0095345 A1 | 7/2002 | Panelli et al. |
| 2007/0078772 A1 | 4/2007 | Dadd |

FOREIGN PATENT DOCUMENTS

| | | |
|---|---|---|
| CA | 2242874 | 7/1997 |
| CA | 2247479 | 8/1997 |
| CA | 2210281 | 2/1998 |
| CA | 2222229 | 7/1998 |
| CN | 1147875 | 9/1996 |
| CN | 1211330 | 8/1997 |
| EP | 0308224 | 3/1989 |
| EP | 0762692 A2 | 3/1997 |
| EP | 0812081 A2 | 12/1997 |
| EP | 0822535 A2 | 2/1998 |
| EP | 00844577 A2 | 5/1998 |
| EP | 0911745 A2 | 4/1999 |
| EP | 0921485 A2 | 6/1999 |
| EP | 0921665 A2 | 6/1999 |
| JP | 9319970 | 12/1997 |
| JP | H10-21304 | 1/1998 |
| JP | 9212549 | 3/1999 |
| JP | 11120241 | 7/1999 |
| NZ | 283103 | 2/1998 |
| WO | WO92/10868 | 6/1992 |
| WO | WO93/12489 | 6/1993 |
| WO | WO95/21428 | 8/1995 |
| WO | WO96/27155 | 9/1996 |
| WO | WO96/36926 | 11/1996 |
| WO | WO97/15885 | 5/1997 |
| WO | WO97/22058 | 6/1997 |
| WO | WO97/25801 | 7/1997 |
| WO | WO97/26612 | 7/1997 |
| WO | WO97/31321 | 8/1997 |
| WO | WO98/09209 | 3/1998 |
| WO | WO98/10381 | 3/1998 |
| WO | WO98/14921 | 4/1998 |
| WO | WO98/19224 | 5/1998 |
| WO | WO98/19261 | 5/1998 |
| WO | WO98/19262 | 5/1998 |
| WO | WO98/20411 | 5/1998 |
| WO | WO98/25220 | 6/1998 |
| WO | WO98/28699 | 7/1998 |
| WO | WO98/37675 | 8/1998 |
| WO | WO98/40982 | 9/1998 |
| WO | WO98/42123 | 9/1998 |
| WO | WO98/49804 | 11/1998 |
| WO | WO99/04326 | 1/1999 |
| WO | WO99/04357 | 1/1999 |
| WO | WO99/05612 | 2/1999 |
| WO | WO99/07102 | 2/1999 |
| WO | WO99/07121 | 2/1999 |
| WO | WO99/09502 | 2/1999 |
| WO | WO99/10850 | 3/1999 |
| WO | WO99/19819 | 4/1999 |
| WO | WO99/20013 | 4/1999 |
| WO | WO99/23596 | 5/1999 |
| WO | WO99/31602 | 6/1999 |
| WO | WO99/33010 | 7/1999 |
| WO | WO00/64089 A3 | 10/2000 |
| WO | WO2007/035682 A2 | 9/2006 |

OTHER PUBLICATIONS

A New Way to Shop Nu Skin 1-888-4NUSKIN, Nuskin Fountain Club Policies and Procedures, © 1999 Nu Skin Enterprises, Inc.

AOL Using MLM for New Revenues, Newsbytes, (Jan. 14, 1999).

AOL Using MLM for New Revenues (America Online is using Multi-Level Marketing, a program similar to that of Amwayu, to sell its new "AOL Select" service through Monument Communications), Newsbytes News Network (Jan. 14, 1999).

(56) References Cited

OTHER PUBLICATIONS

Amway® Products Delivered on Your Schedule Customer Order Worksheet, © 1998 Amway Corporation, USA Jun. 24, 1998.
Amway® Products Delivered on Your Schedule brochure, © 1998 Amway Corporation, USA Jul. 16, 1998.
Amway puts direct selling model online (Amway to launch Quixtar. com web site in Sep. 1999 to sell variety of products) Marketing News, v33, n7, p. 12 (Mar. 29, 1999).
Amway—New Web-Based Business Opportunity Announced; To Launch Sep. 1, 1999 in the U.S. And Canada <http://www.amway.com/infocenter/pressrel155.asp> (visited Mar. 26, 1999).
Arlen, Gary, Cyberselling: Shopping Comes to the Web, Response TV, p. 26 (Jul. 1995).
Automatic Delivery brochure, © 1996 Nu Skin International, Inc. and Interior Design Nutritionals.
Avon, Mar. 1999 <http://www.avon.com/> (visited Mar. 29, 1999).
Bibliofind <http://www.bibliofind.com/cgi-bin/texis.exe/s/search> (visited Mar. 30, 1999).
Big Planet Incorporated, The Internet Working Company <<http://www.bigplanet.com/about/index.html>> (visited Mar. 29, 1999).
Bragg, Steven M., Accounting Best Practices, John wiley and sons, Inc., 1999.
Compu-DAWN Changes Stock Symbol to "ETVC" and Plans to Change Its Corporate Name to e.Tv Commerce Industries, Inc., Business Wire, p. 1228 (Mar. 5, 1999).
CR2000 Announces Competition for Quixtar, Business Wire (Jul. 2, 1999).
Credit Systems International Inc. <http://www.stockgroup.com/csu.html> (visited Nov. 25, 1997).
Crossroads2000.net <http://www.crossroads2000.net/MainPage2.htm> (visited Jul. 9, 1999).
Cyberauthorize.com <http://www.cyberauthorize.com/> (visited Mar. 29, 1999).
Danish, Sherif & Gannon, Patrick, Building Database-Driven Web Catalogs, McGraw-Hill Companies, Inc., 1998.
Dean & Deluca, Holiday 2000, Tea Collecting.
Derfler, Frank J. et al., How Networks Work, Millennium Ed. Que Corporation, Jan. 2000.
Direct-Sales Firm Amway to Begin Marketing on Web (Amway Corp to launch online store called Quixtar on Sep. 1, 1999) Detroit Free Press, (Mar. 3, 1999).
DiRon Marketing and Wholesale <http://www.diron.com/> (visited May 14, 1999).
Distributor Cost Comparison Survey & Analysis—US, © 1991, 1997 InterNET Services Corporation, Mar. 1997.
Dogpile <http://senghor.dogpile.com/texis/search?g=shopping+carts&fs=web&to=thirty> (visited Mar. 30, 1999).
Duffy, Tom, Nu Skin's NT Server network gets a face-lift, PC Week, v. 13, n. 40, p. N22(2) (Oct. 7, 1996).
English Translation of Japanese Application No. Hei 4-49783 *System for Automatically Generating a Repeat Order Record*, filed Mar. 6, 1992.
Equinox International <http://www.equinoxinternational.com/> (visited Apr. 20, 1999).
Eskow, Dennis, Amway of the Web, PC Week, v. 13, n. 50, p. A1 (2) (Dec. 16, 1996).
Fast Growth Program, "Home Shopping Delivered" Automatic Product Replenishment Service brochure, © 1997 InterNET Services Corporation.
Fingerhut Executive Views Internet as Route to Expand, Save on Postage (Catalog retailer generates nearly $10 mil in sales from existing Internet site, expands by taking 20% stake in online florist business), Saint Paul Pioneer Press, (Aug. 2, 1998).
Fruit From Washington—Subscription Fruit Orders, obtained at Http://www.fruitfromwashington.com/fruit/subscription/subscribe.htm, pp. 1-2 Oct. 17, 2000.
FutureNet Re-Enters Phone Service Resales, Newsbytes, P. New04100038, (Apr. 10, 1998).
Glossary—of the Rexall® Compensation Plan explanation terms.
Halpin, Jon, AOL Selects a Multilevel Marketing Partner, Computer Shopper, 19, 4, 107(1) (Apr. 1999).
Herbalife Today, News for Business Building, U.S. Edition No. 026, Jul./Aug. 1996, pp. 1-16.
Henry, Shannon, AOL Abandons Marketing Plan, Fear of Junk E-Mail kills Pyramid-Stule Sales Effort, The Washington Post, p. E3, (Feb. 23, 1999).
Hickey, Mary, Shopping at home: one modem line, no waiting (On-Line Connections-Exploring The Information Highway), Home PC, p. 307, (1994).
Holt, Paul, E-Commerce's toy story: new business strategies are required as electroic commerce gains in popularity and profitability, Communications News, v.35, n. 7, p. 34(2) (Jul. 1998).
Horizons Interactive Mall—Exceeding your shopping needs, <http://www.horizonsmaii.com/> (visited Jul. 12, 1999).
Horizons Marketing Group Inc., <http://www.phoenix.net/~horizons/> (visited May 14, 1999).
Hu, Jim, AOL ends marketing scheme, jilting users, <http://www.news.com/News/Item/Textonly/o,25,32365,00.html> (visited Mar. 29, 1999).
www.instant pc.com, Total E-Business Solutions from Instant PC, <http://www.instantpc.com/> (visited Mar. 30, 1999).
Indermaur, Kurt, At Your Service, DMBS, v. 11, n. 10, p. 31(1), (Sep. 1998).
Inside Neways, Nov./Dec. '97, product catalog, pp. 1-31.
Internet Product Sales Up 500% At natural health Trends Corp.'s Kaire Subsidiary, Business Wire, p. 0082, (Mar. 16, 1999).
Jafra cosmetics International, "Shop Online with Jan Lawrence", obtained at http://www.myjafra.com/catalog/skin_profiler1.cfm?id=460318, pp. 1-2, Feb. 26, 2001.
L., Bill, Van Name Catchings Mark, PC Week, 36(1) (Oct. 19, 1998).
Lang, Curtis, Cashing in: The rush is on to go buy and sell on the Internet, Advertising Age, p. 11, (Dec. 19, 1994).
Mary Kay, Online99, <http://www.mervkay.com/> (visited Mar. 29, 1999).
Macavinta, Courtney, New York slams Net pyramids, <http://www.news.com/News/item/Textonly/0.25,19934,00.html> (visited Mar. 29, 1999).
McNaughton, Kora, E-commerce rocks direct-sales world, <http://www.news.com/News/Item/Textonly/0,25,31639,00.html> (visited Mar. 29, 1999).
Multilevel Marketing Plans, <http://www.ftc.gov/bcp/conline/publ/invest/mlm.htm>, (visited Mar. 29, 1999).
Megamarketing WWW, Income Opportunities, <http://www.mynflistore.com/opportunity.htm> (visited Mar. 30, 1999).
Multilevel Marketing CEO Admits Entire Industry is Built on a Lie, Business Wire (Feb. 9, 1998).
MySiteInc.com, <http://www.mysiteinc.com/cgi-bin/menu/webmaster/autoresponder/index.cg?dist=regroup> (visited Mar. 29, 1999).
Neways, Inc., U.S.A. Fax/Purchase Order Form, Item #0194 Rev. Feb. 27, 1997.
Nikken®, Nikken, Inc. application for Retail Autoshop.
Nikken®, Nihon Zenko Zoushin Kenkyukai, Canada Inc., Application for Retail Autoship.
Nikken®, Nihon Zenko Zoushin Kenkyukai, Canada Inc., Application for Wholesale Autoship.
Nikken®, Nihon Zenko Zoushin Kenkyukai, Canada Inc., Autoship/KenkoCom Promotion.
Nets Inc. Expands Electronic Commerce Services for Industry, PR Newswire (Jan. 6, 1997).
New Horizons "Enhancing the Lives of Those We Touch", US Melaleuca Mela Kit 1998, © Copyright of Melaleuca, Inc. 997 rev. May 1997 Printed in USA.
Nu Skin Enterprises Announces Intent to Acquire Internet Company Big Planet and North American Affiliates, PR Newswire (Feb. 4, 1999).
NuSkin "Policies & Procedures" Manual for distributors, pp. 1-30.
OnlineSelect & You <http://members,tripod.com/onlineselectandyou/what.htm> (visited Mar. 29, 1999).
PR Newswire, Bidworld, Inc.: Internet Blast-Off Set for Oct. 1, (Sep. 10, 1996).

(56) References Cited

OTHER PUBLICATIONS

Pelline, Jeff, eBay named in patent suit, <http://www.news.com/News/Item/Textonly/0,25,34271,00.html> (visited Mar. 29, 1999).
Persistent Client State HTTP Cookies, <http://home.netscape.com/newsref/std/cookie_spec.html> (visited Mar. 30, 1999).
PETsMART.com "What is the Frequent Fetcher™ Repeat Home Delivery Service?", obtained at http://www.petsmart.com/misc/regular_delivery.shtml, pp. 1-2, Mar. 5, 2001.
Pharmanex® ADP "Automatic Delivery Program", © 1999 Pharmanex®.
Quixtar.com, New Web-Based business Opportunity Announced; To Launch Sep. 1, 1999 in the U.S. and Canada <http://www.amyway.com/quixtar.asp> (visited Mar. 26, 1999).
RDI Marketing Launches Consolidation Plan in the Private Discount Club Industry, Business Wire, (Aug. 10, 1998).
Reuters, AOL goes for selective marketing, <http://www.news.com/News/Item/Textonly/0,24 30911,00.html> (visited Mar. 29, 1999).
Rexall® Showcase International®, Customer Autoship Agreement.
Royal BodyCare, <http://www.rbcglobenet.com/welcome/corporate.asp> (visited Apr. 20, 1999).
Salon, Amway joins the online multilevel marketing melee, <http://www.salonmagazine.com/21st/log/1999/03/01log.html> (visited Mar. 4, 1999).
TAB Team (Top achievers business Team), Herbalife Sales and Marketing Plan, pp. 3-12.
*Technology Buyers Guide*, fortune, Dec. 1, 1997.
The Rexall® Compensation Plan brochure, Jul. 2000.
US Herbalife Product Catalog © 2000 insert.
USANA® "Enjoy the Benefits of Autoship", #92020 USANA Autoship Benefits Brochure—Rev. 4.97.
USANA® Distributor Autoship Agreement, © USANA, Inc. Form 9526 rev Jan. 1997.
USANA® "Summary of Policies and Procedures" brochure.
Up2 technologies inc. Officially Launches UP2ME.com—One of the Most Comprehensive Internet Navigational guides in the Industry, Business Wire (Jan. 21, 1999).
Vanilla, <http://www.vanilia-online.com/body_vanilia2.htm> (visited Mar. 29, 1999).
VhHS Network beats Excell and Amway to the punch, Business Wire (May 13, 1997).
Walker, Leslie, Amway takes the E-Way, The Washington Post, (Mar. 25, 1999).
Walker, Leslie, Amway Takes the E-Way, The Washington Post, <http://www.washingtonpost.com/wp-srv/Wplate/1999-03/25/2761-032599-idx.html> (visited Mar. 26, 1999).
Wells, Melanie, Amway takes aim at Web, Home products company to route distributors to Quixtar site, USA Today, (May 11, 1999).
White, Ron, *How Computers Work*, Millennium Ed. Que Corporation, Sep. 1999.
"Why Autoship", Nikken ® US Retail Autoship, New Autoship Guidelines.
Wisdom Wise, Neways Policies and Procedures #0005 Wise Distributor Manual, © 1998 Neways, Inc., pp. 1-38.
Woods, Bob, Plan to Sell AOL Via MLM Cancelled, Newsbytes (Feb. 17, 1999).
Amway Asia Pacific Hit by Direct Selling Ban in China, Amway Press Release (Apr. 22, 1998).
Karathanos, P., et al., Management Decision, vol. 32, No. 1, 1994, pp. 15-19, seventh paragraph.
The Majority Owned Subsidiary of NET LNNX Inc, Communications/USA has filed a listing application with the Pacific Stock Exchange and the SEC, NET LNNX press release, May 1, 1996, fifth paragraph.
Ostroff, J., Women's Wear Daily, Jul. 21, 1998, vol. 176, No. 14, p. 28.
The Amway Business Review, © 1999 Amway Corporation, USA.
Scott Harris MLM Compensation Plans, pp. 1-7, obtained at internet address, http://mlmstartup.com/articles/scotth.htm, Jun. 15, 2000.
Article, "China: Avon restarts operation after adjustment," Copyright 1998 China Daily. Source: World Reporter™—Asia Intelligence Wire.
Amagram advertisement for Audio/Video standing order, Amway Corporation, Amagram, pp. 32, Apr. 1992.
Amagram Automatic Filter Replacement Service article, Amway Corporation, Amagram, Jun. 1992, 6 pages.
Amway Automatic Shipment Agreement Program Order Form, (L-7375-SAA), 1994, 2 pages.
Amway Corporation, introducing "Direct Delivery" brochure, 1997, USA, 30 pages.
Amway Corporation, Standing Order Form (L-920-SAD), 1988, USA, 2 pages.
Amway Corporation, Standing Order Form, (SA-6971), 1989, USA, 2 pages.
Amway Newsgram, USA "AMAGRAM Standing Orders: Drop Shipping to Other Than Direct Distributor", Amway Corporation, Jun. 6, 1963, 1 page.
Amway Priority Service Plus 1992-1993 brochure, "Discover hundreds of ways to simplify your life", Amway Corporation 1992, 36 pages.
Amway Scheduled Shipment Program Order Form/Contract (L-8489-SAA), Amway Corporation, 1996, USA. 2 pages.
Amway Scheduled Shipment Program, introducing the "Amway Scheduled Shipment Program for Double X®," © 1996 Amway Corp.,, 1 page.
Anonymous Author, "Family Values", *Kiplinger's Personal Finance Magazine*. Washington: Feb. 1998, vol. 52, Iss. 2, p. 54, Downloaded from ProQuest on the Internet on Aug. 1, 2006, 2 pages.
Anonymous Author, "Lettuce by Modem", Published on Jan. 12, 1998, Downloaded from the Internet on Aug. 1, 2006 from http://www.forbes.com/forbes/1998/0112/6101160s1_print.html, 1 page.
END-ALL™ homepage software Solutions for your Growing Business features, obtained at http://endall.com Jun. 4, 2001, 4 pages.
END-ALL™ Program help screens, 40 pages.
New Horizons "Enhancing the Lives of Those We Touch", Melaleuca Mela Kit 1998, © Copyright by Melaleuca, Inc. 1997 Rev. May 1997 Printed in U.S.A., 48 pages.
Patent Abstract of Japanese Application No. JP-A-2000-250990 "Virtual Gift System and Gift System", date of publication Sep. 14, 2000, 1 page.
Patent Abstract of Japanese Application No. JP-A-H10-207940 "Network Shopping Device and Network Shopping Method", date of publication Aug. 7, 1998, 1 page.
Wilson Enterprises, Inc. "Fast Growth" brochure, 1997, 36 pages.
Copy of Supplementary European Search Report for European Application No. EP 00 92 1434, dated Jun. 24, 2005, 3 pgs.
Edwards, John, "Delivering Differentiation: Building Winning Enterprises", *European Management Journal*, 1997, vol. 15, No. 1, pp. 79-91.
Keck, Leanne, "Channel Conflict: The Impact of Direct Interest sales of Personal Computers on Traditional Retail Channels", copyright 1998 by Keck, Marcheve, Valen and Years, 33 pgs.
Rawwas, Mohammed et al., "Management of Conflict Using Individual Power Sources: A Retailer's Perspective", *Journal of Business Research*, 1997, vol. 40, pp. 49-64.
Wilson, Ralph, "Manufacturer's Dilemma: To Sell or Not to Sell Directly", *Web Commerce Today*, May 1998, 3 pgs.
Amway Newsgram, dated Jan. 15, 1993, 6 pgs.
Amway Newsgram, dated Jan. 28, 1994, 6 pgs.
Amway Newsgram, dated Feb. 28, 1992, 6 pgs.
Amway Newsgram, dated May 22, 1992, 6 pgs.
Amway Newsgram, dated Jul. 9, 1993, 6 pgs.
Amway Newsgram, dated Jul. 10, 1992, 6 pgs.
Amway Newsgram, dated Jul. 28, 1989, 6 pgs.
Amway Newsgram, dated Jul. 28, 1995, 6 pgs.
Amway Newsgram, dated Oct. 8, 1993, 6 pgs.
Amway Newsgram, dated Oct. 26, 1990, 6 pgs.
Amway Newsgram, dated Oct. 27, 1995, 6 pgs.
Amway Newsgram, dated Nov. 11, 1988, 6 pgs.
Amway Newsgram, dated Nov. 22, 1991, 6 pgs.
Amway Newsgram, dated Nov. 24, 1993, 6 pgs.

(56) References Cited

OTHER PUBLICATIONS

Amway Connexions™, titled "We'll Treat Your Time As a Priority", copyright by Amway Corporation, 1996, 37 pages.
Amway Connexions™, titled "We'll Treat Your Time As a Priority", copyright by Amway Corporation, 1997, 37 pages.
Amway Connexions™, titled "The One That Does It All", copyright by Amway Corporation, Spring/Summer 1998, 57 pages.
Amway Connexions™, titled "All the Products for Your Life", copyright by Amway Corporation, Spring/Summer 1999, 63 pages.
Connexions™, titled "Health, Self, Home, More Choices", copyright by Amway Corporation, Mar. 2000 Update, 22 pages.
Amway Connexions™, titled "They get the product . . . You get the credit . . .", copyright by Amway Corporation, 1997, 9 pages.
Argila, Carl, "E-Commerce Tools: Part II—Storefronts", Corporate Internet Strategies, 1998, vol. IV, No. 2, 16 pgs.
"Compaq Public Sector ValuePaqs", 1998, 4 pgs.
"Compaq Unveils Next Generation of Online Shopping for Government, Education, Healthcare Customers", *Business Wire*, Jun. 1, 1998, 3 pgs.
Credle, Rufus et al., "Case Study; Domino. Merchant for IBM Netfinity Servers", International Technical Support Organization, copyright 1998 by IBM Corporation, 140 pgs.
Edwards, John, "Delivering Differentiation: Building Winning Enterprises", *European Management Journal*, vol. 15, No. 1, 1997, pp. 79-91.
Kaitin, Sart, "Conflict Resolution", from the magazine *CIO Web Business*, dated Feb. 1, 1998, 9 pgs.
Keck, Leanne et al. "Channel Conflict: The Impact of Direct Internet Sales of Personal Computers on Traditional Retail Channels", copyright 1998 by keck, Marcheva, Valen and Years, 33 pgs.
Kanellos, Michael, "Compaq's new plan hurts dealers", *CNET News*, Nov. 11, 1998, 3 pgs.
Mehling, Herman, "Compaq adds more shine on GEM inline", *Computer Reseller News*, Jul. 13, 1998, 3 pgs.
"Newsgram", dated Nov. 11, 1988 6, pgs.
"Newsgram", dated Jul. 28, 1989, 6 pgs.
"Newsgram", dated Oct. 26, 1990, 6 pgs.
"Newsgram", dated Nov. 22, 1991, 6 pgs.
"Newsgram", dated Jul. 7, 1993, 6 pgs.
Rawwas, Mohommad Y.A. et al., "Management of Conflict Using Individual Power Sources: A Retailers Perspective", *Journal of Business Research*, 1997, vol. 40, pp. 49-64.
Radosevich, Lynda, "Fruits of Their Labors", from the magazine *CIO*, dated Nov. 15, 1996, 6 pgs.
Stevens, Ruth P., "Managing Web-Driven Channels Conflict", *DM News*, May 7, 1998, 2 pgs.
"The Hidden Potential of Web Catalog Kits", The Merrifield Consulting Group, dated Jul. 3, 2012, 5 pgs.
Wilson, Ralph F., "Manufacturers' Dilemma: To Sell or Not to Sell Directly", *Web Commerce Today*, Issue 10, May 15,1998, 4 pgs, obtained from Wilson Internet.
"Vista 3.0 Users Guide", dated Jul. 5, 1995, 112 pgs.
"2012.Interactive Homepage", from www.2012.com, 1997, 13 pgs.

* cited by examiner

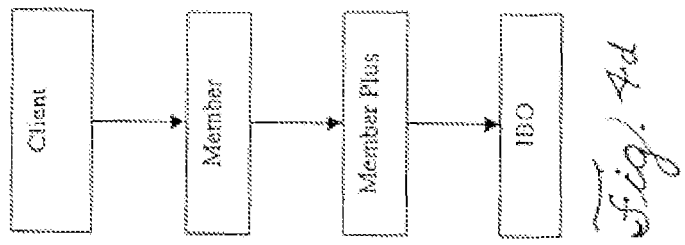
Fig. 4d
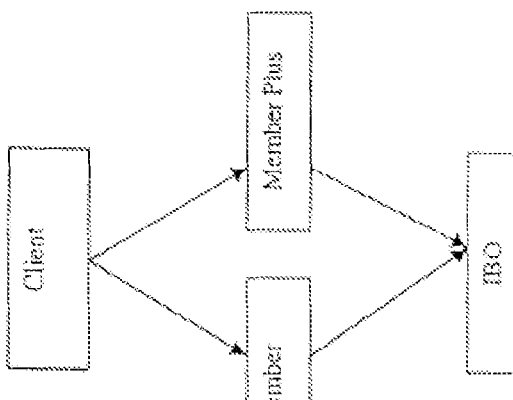
Fig. 4c
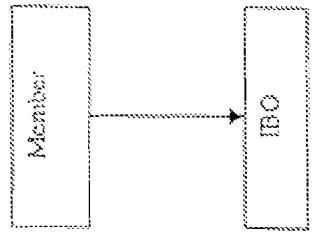
Fig. 4f
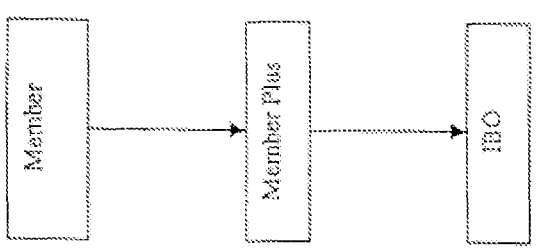
Fig. 4b
Fig. 4a
Fig. 4e

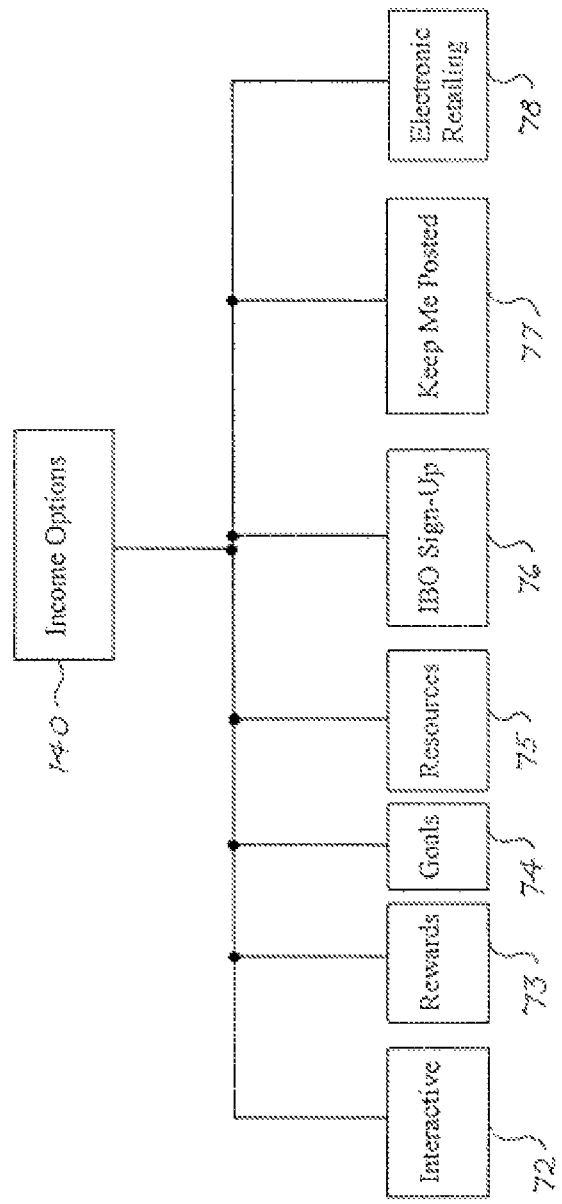

Fig. 6a
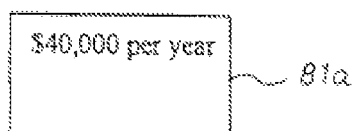 — 81a
What amount of income would fulfill your dreams (annual, monthly)?
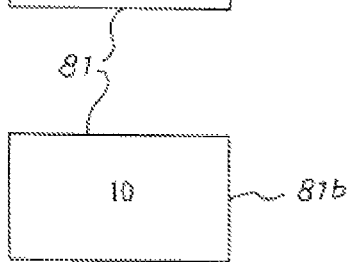 — 81b
How many customers could you interest in purchasing products?
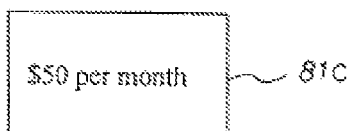 — 81c
How much would these customers purchase (annual, monthly)?
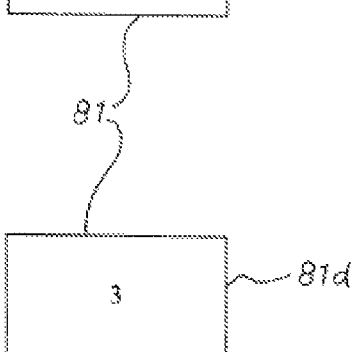 — 81d
How many people could you interest in supplementing their income with their own business?

Fig. 8b

| STEP 1 | STEP 2 | STEP 3 | STEP 4 | STEP 5 |

How does a dream come true? It starts with customers brought to Quixtar by you. They may purchase products as Clients at Suggested Retail and you keep the basic discount or they may become Members to buy at a significant discount and you profit from a Performance Bonus paid on their sales volume. The basic discount is the difference between the price you pay for the products and the suggested retail price. If your customers were evenly divided between the two participation levels, your income would be:

You were comfortable with
that purchased: 10 customers
Total volume purchased: $50 per month
$500.00

This results in a retail mark-
up of: $75.00
and a Performance Bonus of: $14.66

If you did this every month,
your annual income would be: $1,076.00

| STEP 1 | STEP 2 | STEP 3 | STEP 4 | STEP 5 |

This is a business of balance. If you brought 3 people into the business and they repeated your customer success, each would contribute to the volume on which your Performance Bonus is based.

| | |
|---|---|
| 3 business builders: | $1,500 per month |
| Your customers: | $500 per month |
| Total sales: | $2,000.00 |
| | |
| The total sales yields a net Performance Bonus of: | $131.97 |
| Added to the retail mark-up: | $75.00 |
| Total monthly income: | $206.97 |
| | |
| If your group did this every month, your annual income would be: | $2,483.64 |

| Product Image | Product Name | Color/Size | PV | BV | Member Cost | Your Cost | Quantity |
|---|---|---|---|---|---|---|---|
| | L.O.C. | | 10.00 | 10.00 | 19.00 | 20.00 | 1 |
| | Quixtar Jacket | Black-XL | 60.00 | 60.00 | 100.00 | 120.00 | 1 |

View Next 25 Products    Add to Basket

Fig. 10

| Quantity to Add to Order | SKU | Product Name | PV | BV | Member Cost | Your Cost | Total |
|---|---|---|---|---|---|---|---|
| 2 | E0001 | L.O.C. | 10.00 | 10.00 | 9.00 | 20.00 | 40.00 |
| 3 | WE0301 | Quixtar Jacket | 60.00 | 60.00 | 55.00 | 120.00 | 360.00 |

Total: 400.00

Update Basket    Return    Continue Checkout    Standing Order

| Quantity to Add to Order | SKU | Product Name | Stock Status | PV | BV | Your Cost | Total |
|---|---|---|---|---|---|---|---|
| 2 | E0001 | L.O.C. | In Stock | 10.00 | 10.00 | 20.00 | 40.00 |
| 3 | WE0001 | Quixtar Jacket | Back Order | 60.00 | 60.00 | 120.00 | 360.00 |

Shipping: 10.00
Handling: 0.00
Service Charge: 40.00
Tax: 24.00
Total: $474.00

Please enter your payment information:

Payment Method: [ ]

Name on Card: [ ]

Credit Card Number: [ ]

Expiration Date:   Month: [ ]
                   Year: [ ]

Purchase

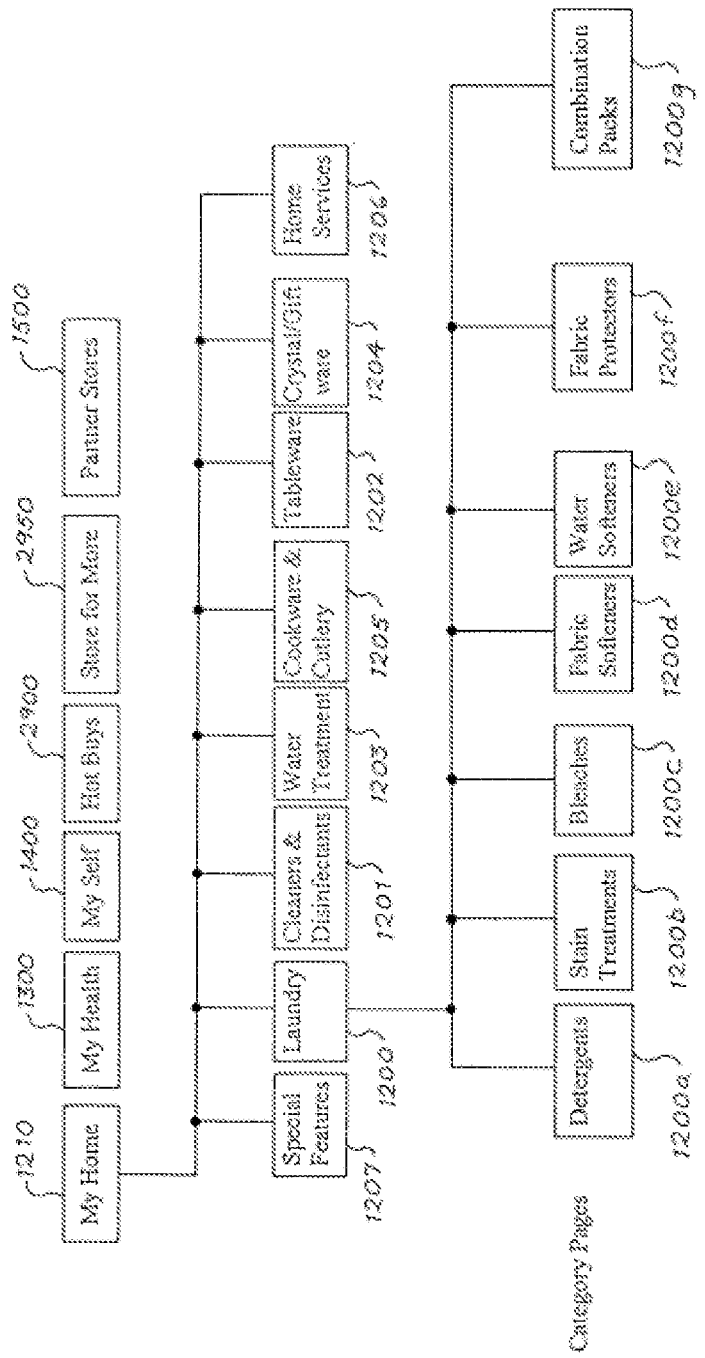
Fig. 12.b

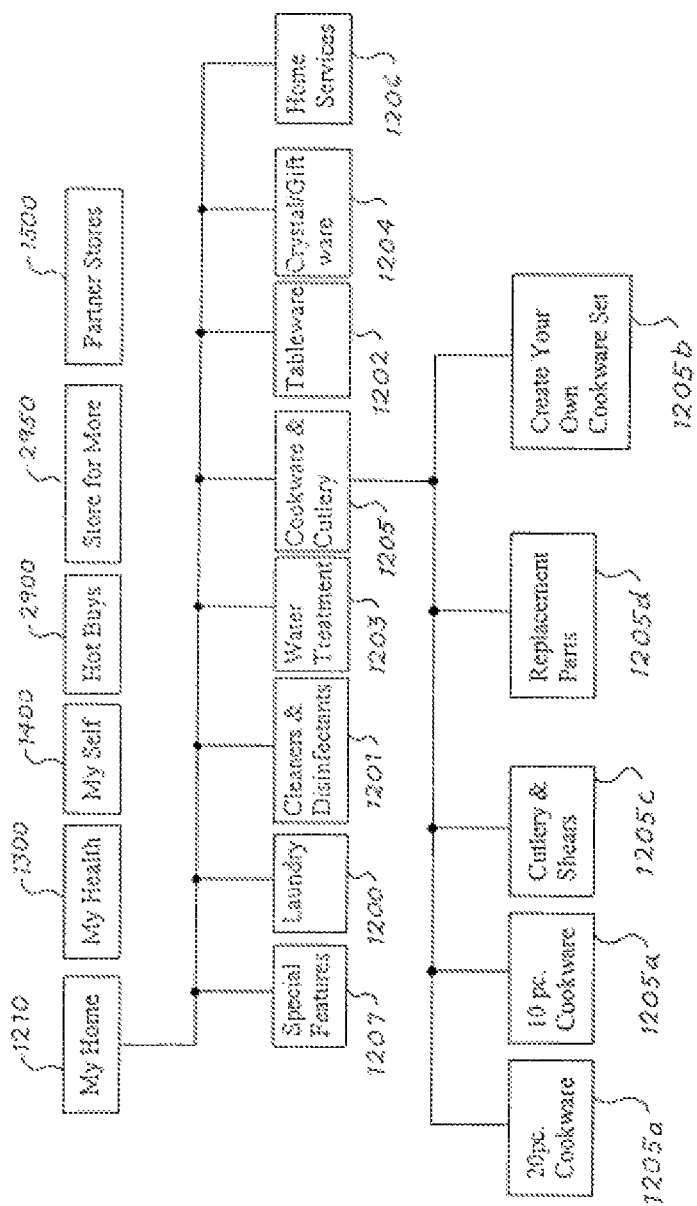
Fig. 12.9

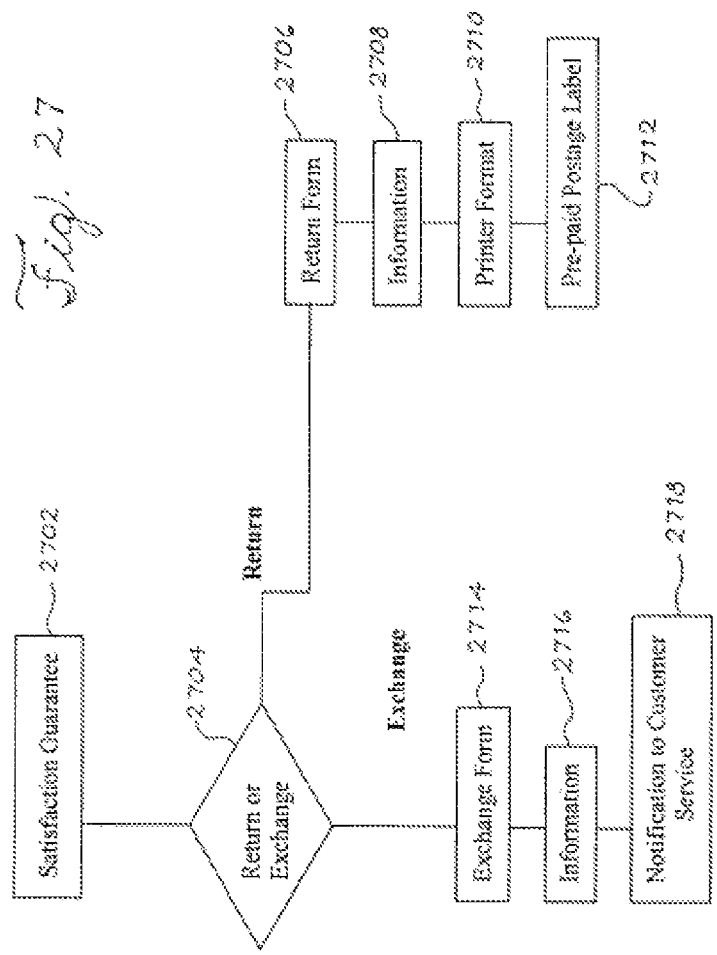

ELECTRONIC COMMERCE TRANSACTIONS WITHIN A MARKETING SYSTEM THAT MAY CONTAIN A MEMBERSHIP BUYING OPPORTUNITY

REFERENCE TO RELATED APPLICATIONS

This application is a divisional under 37 C.F.R. §1.53(b) of U.S. patent application Ser. No. 12/821,385 filed Jun. 23, 2010 now U.S. Pat. No. 8,239,272, which is a continuation under 37 C.F.R. §1.53(b) of U.S. patent application Ser. No. 11/453,624 filed Jun. 15, 2006 now U.S. Pat. No. 7,778,884, which is a continuation under 37 C.F.R. §1.53(b) of U.S. patent application Ser. No. 09/714,739 filed Nov. 16, 2000 now U.S. Pat. No. 7,359,871, which is a continuation of U.S. patent application Ser. No. 09/515,860, filed Feb. 29, 2000, now U.S. Pat. No. 6,980,962, which claims benefit of U.S. Provisional Application Ser. No. 60/126,493, filed Mar. 25, 1999 and Ser. No. 60/122,385, filed Mar. 2, 1999, the entirety of each being herein incorporated by reference.

BACKGROUND

1. Field of the Invention

The present invention relates generally to electronic commerce transactions. More particularly, the present invention relates to electronic commerce transactions with a marketing company. The invention also relates to using electronic networks to manage independent businesses associated with the marketing company.

2. Related Art

The Internet is becoming the world's new market place. The number of people and businesses that have access to the Internet is growing rapidly. Businesses are increasingly interested in selling and marketing products and services over the Internet, particularly via the World Wide Web ("WWW").

In particular, marketing companies, including multilevel marketing companies, are increasingly becoming familiar with the power of the Internet and its reach to potential new customers and members. Heretofore, however, the full capabilities of the Internet to provide a complete opportunity for electronic commerce with a marketing system in combination with a membership buying club have not been achieved.

For example, conventional systems and methods for carrying out electronic transactions, such as shopping, have generally required separate electronic shopping baskets when shopping from various merchants that may be associated with a particular web site. In addition, conventional systems have generally not been capable of providing a distribution system that allows distribution of the products of several sellers. Indeed, such distribution systems have not allowed products to be distributed through a single independent sales network but with different levels and structures of compensation for different product lines.

Conventional multilevel marketing systems, in particular, have generally not been able to provide a system for allowing members within the system to purchase directly from a marketing company associated with the marketing system. Moreover, these conventional systems have generally not provided bonuses and/or commissions based upon sales made directly to the members by the marketing company as well as sales made to the members from a member's sponsor. Indeed, conventional multilevel marketing companies have relied upon the shear number of the distributors or members associated with the marketing company to promote and market its products and services as well as add members to the marketing system. Moreover, those companies doing business over the Internet have generally required that a shopper purchase products via a web page that is sponsored by one of the members of the marketing company.

Thus, there is a need to overcome the disadvantages described above. There is a particular need to provide a system and method for a single marketing distribution system that can distribute the products of several different sellers, all distributed through a single independent sales network but with different levels and structures of compensation for different product lines. There is a further need to allow shoppers to shop for and buy products from different sources in a single transaction. There is a particular need to provide a system and method that allows a shopper to purchase products directly from a marketing company, a registered business owner, and a merchant partner and to do so using an electronic shopping basket that is preferably persistent throughout the web site.

SUMMARY

The present invention solves the problems with, and overcomes the disadvantages of, conventional marketing systems.

The present invention relates to a method for facilitating electronic commerce transactions in a marketing system through a network, the network comprising at least one server computer capable of communicating with a browser system located at a remote client computer. The method includes establishing an interactive online registration process between the client browser system and the server computer so that an individual may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The method further includes providing a plurality of web files operatively coupled to a web site associated with the marketing system. Additionally, the method includes allowing access to a plurality of marketing system products and services to the registered Client, Member, Member Plus, or IBO via at least one of the plurality of web files.

In another aspect, the present invention relates to a method for facilitating an on-line shopping and rewards program through a network, the network comprising at least one server computer capable of communicating with a browser system located at a remote client computer. The method includes establishing an interactive online registration process between the client browser system and the server computer so that an individual may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The method further includes maintaining a catalog comprising marketing system products and services on the server computer. Additionally, the method includes: maintaining a rewards database on the server computer for storing reward points corresponding to a registered Client, Member, Member Plus, and IBO; assigning a rewards value to the marketing system products and services and storing the rewards value in the catalog; assigning a redemption value to the marketing system products and services and storing the redemption value in the catalog; providing on-line access to the catalog to a registered Client, Member, Member Plus, and IBO via an on-line order form; allowing the registered Client, Member, Member Plus, and IBO to submit an order for marketing system products and services via the on-line order form; providing on-line access to the catalog to a registered Client, Member, Member Plus, and IBO via an on-line redemption form; allowing the registered Client, Member, Member Plus, and IBO to submit a rewards exchange request for marketing system products and services via the on-line redemption form; and subtracting from the rewards database a redemption value corresponding to the marketing system products and services chosen by the registered Client, Member, Member Plus, and IBO.

In another aspect, the present invention relates to a system for facilitating an on-line shopping and rewards program. The system includes a computer system accessible for on-line interactive communication. The computer system includes a memory device having embodied therein information relating to a plurality of marketing system products and services and a processor in communication with said memory device. The processor is preferably configured for establishing an interactive online registration process so that an individual may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation.

The processor is preferably additionally configured for: maintaining a catalog comprising marketing system products and services; maintaining a rewards database for storing reward points corresponding to a registered Client, Member, Member Plus, and IBO; assigning a rewards value to the marketing system products and services and storing the rewards value in the catalog; assigning a redemption value to the marketing system products and services and storing the redemption value in the catalog; providing on-line access to the catalog to a registered Client, Member, Member Plus, and IBO via an on-line order form; allowing the registered Client, Member, Member Plus, and IBO to submit an order for marketing system products and services via the on-line order form; providing on-line access to the catalog to a registered Client, Member, Member Plus, and IBO via an on-line redemption form; allowing the registered Client, Member, Member Plus, and IBO to submit a rewards exchange request for marketing system products and services via the on-line redemption form; and subtracting from the rewards database a redemption value corresponding to the marketing system products and services chosen by the registered Client, Member, Member Plus, and IBO.

In another aspect, the present invention is related to a computer program product comprising a computer useable medium having computer program logic recorded thereon for enabling a processor in a computer system to facilitate an on-line shopping and rewards program. The computer program includes establishing means for enabling the processor to establish an interactive online registration process so that an individual may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation.

The computer program preferably additionally includes: catalog maintaining means for enabling the processor to maintain a catalog comprising marketing system products and services; rewards database maintaining means for enabling the processor to maintain a rewards database for storing reward points corresponding to a registered Client, Member, Member Plus, and IBO; rewards value assigning means for enabling the processor to assign a rewards value to the marketing system products and services and storing the rewards value in the catalog; redemption value assigning means for enabling the processor to assign a redemption value to the marketing system products and services and storing the redemption value in the catalog; first providing means for enabling the processor to provide on-line access to the catalog to a registered Client, Member, Member Plus, and IBO via an on-line order form; first allowing means for enabling the processor to allow the registered Client, Member, Member Plus, and IBO to submit an order for marketing system products and services via the on-line order form; second providing means for enabling the processor to provide on-line access to the catalog to a registered Client, Member, Member Plus, and IBO via an on-line redemption form; second allowing means for enabling the processor to allow the registered Client, Member, Member Plus, and IBO to submit a rewards exchange request for marketing system products and services via the on-line redemption form; and subtracting means for enabling the processor to subtract from the rewards database a redemption value corresponding to the marketing system products and services chosen by the registered Client, Member, Member Plus, and IBO.

In another aspect, the present invention is related to a method for facilitating electronic commerce transactions in a marketing system through a network, the network comprising at least one server computer capable of communicating with a browser system located at a remote client computer. The method includes providing a user with on-line access to a home page file for electronic commerce transactions, wherein the user may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The method preferably additionally includes providing a plurality of shopping page web files for buying products and services from a marketing company associated with the marketing system, and providing at least one vendor partner page web file for buying products and services from a vendor partner associated with the marketing system.

In another aspect, the present invention relates to a system for facilitating electronic commerce transactions in a marketing system. The system includes a memory device having embodied therein information relating to a plurality of marketing system products and services. The system further includes a processor in communication with said memory device. The processor is preferably configured for providing a user with on-line access to a home page file for electronic commerce transactions, wherein the user may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The processor is additionally configured for providing a plurality of shopping page web files for buying products and services from a marketing company associated with the marketing system, and for providing at least one vendor partner page web file for buying products and services from a vendor partner associated with the marketing system.

In another aspect, the present invention relates to a computer program product comprising a computer useable medium having computer program logic recorded thereon for enabling a processor in a computer system to facilitate electronic commerce transactions in a marketing system. The computer program logic includes providing means for enabling the processor to provide a user with on-line access to a home page file for electronic commerce transactions, wherein the user may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The computer program logic further includes providing means for enabling the processor to provide a plurality of shopping page web files for buying products and services from a marketing company associated with the marketing system, and providing means for enabling the processor to provide at least one vendor partner page web file for buying products and services from a vendor partner associated with the marketing system.

In another aspect, the present invention is related to a system for facilitating electronic commerce transactions in a marketing system. The system includes a memory device having embodied therein information relating to a plurality of marketing system products and a processor in communication with the memory device. The processor is preferably configured for establishing an interactive online registration process so that an individual may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The processor is further configured for providing a plurality of web files operatively coupled to a web site associated with the marketing system, and allowing access to a plurality of marketing system products and services to the registered Client, Member, Member Plus, or IBO via at least one of the plurality of web files.

In another aspect, the present invention relates to a computer program product comprising a computer useable medium having computer program logic recorded thereon for enabling a processor in a computer system to facilitate electronic commerce transactions in a marketing system. The computer program logic includes establishing means for enabling the processor to establish an interactive online registration process so that an individual may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The computer program logic further includes providing means for enabling the processor to provide a plurality of web files operatively coupled to a web site associated with the marketing system and allowing means for enabling the processor to allow access to a plurality of marketing system products and services to the registered Client, Member, Member Plus, or IBO via at least one of the plurality of web files.

In another aspect, the present invention relates to a method of marketing and selling products through a marketing system. The method includes registering individuals with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The method further includes allowing the registered Client, Member, Member Plus, or IBO to purchase products directly from a marketing company associated with the marketing system, and compensating an individual who has qualified as an IBO based on sales of marketing system products, the marketing system products comprising products of the marketing company.

In another aspect, the present invention relates to a method of marketing and selling products through a marketing system. The method includes establishing a plurality of participation categories within the marketing system, the participation categories comprising a Client, a Member, a Member Plus, and an Independent Business Owner (IBO), wherein the Client is not eligible to earn compensation and is eligible to buy products at a Client price, wherein the Member is eligible to buy products at a Member price and is not eligible to earn compensation, and wherein the Member Plus is eligible to buy products at a Member Plus price, wherein the Member Plus qualifies to earn compensation by satisfying a sales qualification level and thereby qualifying as an IBO. The method further includes selling products directly from a marketing company associated with the marketing system to a participant in at least one of the participation categories and selling products from an IBO or a Member Plus to a participant in at least one of the participation categories and to a non-participant outside the marketing system. In addition, the method includes compensating the IBO based on product sales.

In another aspect, the present invention relates to a system for facilitating electronic commerce transactions in a marketing system. The system includes a memory device having embodied therein information relating to a plurality of marketing system products and a processor in communication with the memory device. The processor is configured for registering individuals with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The processor is further configured for allowing the registered Client, Member, Member Plus, or IBO to purchase products directly from a marketing company associated with the marketing system, and for compensating an individual who has qualified as an IBO based on sales of marketing system products. The marketing system products preferably include products of the marketing company.

In another aspect, the present invention relates to a computer program product comprising a computer useable medium having computer program logic recorded thereon for enabling a processor in a computer system to facilitate electronic commerce transactions in a marketing system. The computer program logic includes registering means for enabling the processor to register individuals with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The computer program logic further includes allowing means for enabling the processor to allow the registered Client, Member, Member Plus, or IBO to purchase products directly from a marketing company associated with the marketing system, and compensating means for enabling the processor to compensate an individual who has qualified as an IBO based on sales of marketing system products. The marketing system products preferably include products of the marketing company.

In another aspect, the present invention relates to a system for facilitating electronic commerce transactions in a marketing system. The system includes a memory device having embodied therein information relating to a plurality of marketing system products and a processor in communication with said memory device. The processor is preferably configured for establishing a plurality of participation categories within the marketing system, the participation categories comprising a Client, a Member, a Member Plus, and an Independent Business Owner (IBO), wherein the Client is not eligible to earn compensation and is eligible to buy products at a Client price, wherein the Member is eligible to buy products at a Member price and is not eligible to earn compensation, and wherein the Member Plus is eligible to buy products at a Member Plus price, wherein the Member Plus qualifies to earn compensation by satisfying a sales qualification level and thereby qualifying as an IBO. The processor is further configured for selling products directly from a marketing company associated with the marketing system to a participant in at least one of the participation categories, for selling products from an IBO or a Member Plus to a participant in at least one of the participation categories, and for compensating the IBO based on product sales.

In another aspect, the present invention relates to a computer program product comprising a computer useable medium having computer program logic recorded thereon for enabling a processor in a computer system to facilitate electronic commerce transactions in a marketing system. The computer program logic includes establishing means for enabling the processor to establish a plurality of participation categories within the marketing system, the participation categories comprising a Client, a Member, a Member Plus, and an Independent Business Owner (IBO), wherein the Client is not eligible to earn compensation and is eligible to buy products at a Client price, wherein the Member is eligible to buy products at a Member price and is not eligible to earn compensation, and wherein the Member Plus is eligible to buy products at a Member Plus price, wherein the Member Plus qualifies to earn compensation by satisfying a sales qualification level and thereby qualifying as an IBO. The computer program logic further includes selling means for enabling the processor to sell products directly from a marketing company associated with the marketing system to a participant in at least one of the participation categories, selling means for enabling the processor to sell products from an IBO or a Member Plus to a participant in at least one of the participation categories, and compensating means for enabling the processor to compensate the IBO based on product sales.

In another aspect, the present invention relates to a method for facilitating electronic commerce transactions in a marketing system through a network, the network comprising at least one server computer capable of communicating with a browser system located at a remote client computer. The method includes establishing an interactive online registration process between the client browser system and the server computer so that an individual may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein each IBO is eligible to buy products at an IBO price and is eligible to earn compensation. The method further includes providing a plurality of web files operatively coupled to a web site associated with the marketing system and allowing access to a plurality of marketing system products and services to the registered Client, Member, or IBO via at least one of the plurality of web files.

In another aspect, the present invention relates to a method for facilitating an on-line shopping and rewards program through a network, the network including at least one server computer capable of communicating with a browser system located at a remote client computer. The method includes establishing an interactive online registration process between the client browser system and the server computer so that an individual may register with the marketing system as a Client, a Member, or a Member Plus, wherein a Client is not eligible to earn compensation and is eligible to buy products at a Client price, wherein a Member is eligible to buy products at a Member price and is not eligible to earn compensation, and wherein a Member Plus is eligible to buy products at a Member Plus price, and wherein a Member Plus qualifies to earn compensation by satisfying a sales qualification level and thereby qualifying as an IBO, wherein each IBO is eligible to buy products at an IBO price and is eligible to earn compensation. The method also includes maintaining a catalog comprising marketing system products and services on the server computer and maintaining a rewards database on the server computer for storing reward points corresponding to a registered Member. The method further includes assigning a rewards value to the marketing system products and services and storing the rewards value in the catalog. In addition, the method includes assigning a redemption value to the marketing system products and services and storing the redemption value in the catalog and providing on-line access to the catalog to a registered Member via an on-line order form. The method also includes allowing the registered Member to submit an order for marketing system products and services via the on-line order form and providing on-line access to the catalog to a registered Member via an on-line redemption form. The method further includes allowing the registered Member to submit a rewards exchange request for marketing system products and services via the on-line redemption form and subtracting from the rewards database a redemption value corresponding to the marketing system products and services chosen by the registered Member.

In yet another aspect, the present invention relates to a method for accumulating a list of products and services selected for purchase from a shopping page web file and a merchant partner page web file. The method includes accumulating a list of the products and services selected for purchase at a server computer and receiving at the server computer at least one of the products and services selected for purchase from one of the shopping page web file and the merchant partner page web file. The method further includes at the server computer, adding to the list each product and service received by said receiving step, wherein said adding step accumulates an updated list of the products and services selected for purchase.

In another aspect, the present invention relates to a method for facilitating electronic commerce transactions in a marketing system through a network, the network comprising at least one server computer capable of communicating with a browser system located at a remote client computer. The method includes establishing an interactive online registration process between the client browser system and the server computer so that a first individual may register with the marketing system. The method further includes providing a plurality of web files operatively coupled to a web site associated with the marketing system and allowing access to a plurality of marketing system products and services to the registered individual via at least one of the plurality of web files. The method also includes assigning a second individual who registers with the marketing system to the first individual.

In another aspect, the present invention relates to a method for granting access to a user to a first web page file. The method includes determining if the user has an authentication identifier and directing the user to a marketing page web file if the user does not possess an authentication identifier. The method further includes determining a participation level of the user if the user possesses an authentication identifier and granting access to the first web page file if the participation level of the user meets a predetermined access level. The method also includes directing the user to a second web page file if the participation level of the user does not meet the predetermined access level.

In another aspect, the present invention relates to a method for facilitating electronic commerce transactions in a marketing system. The method includes registering individuals with the marketing system as a Client, wherein the Client is not eligible to earn compensation and is eligible to purchase products at a Client price, a Member, wherein the Member is not eligible to earn compensation and is eligible to purchase products at a Member price, or an IBO, wherein the IBO is eligible to earn compensation and is eligible to purchase products at an IBO price, which is less than a Member price.

Features and Advantages

A feature of the present invention is that it allows a marketing company to increase sales and grow the company's business by increasing orders, appealing to new market segments, improving productivity, cross-selling, and implementing online incentives and promotions.

A further feature of the present invention is that it provides a system and method for complete electronic commerce ("E-Commerce") transactions and solutions for a marketing company's products via the World Wide Web ("WWW"), including facilities for signing up new customers and recruiting, training and supporting new Independent Business Owners (IBOs) (described in more detail below) through an interactive online process.

A further feature of the present invention is that it combines a marketing business with a membership buying opportunity, so that IBOs participating in the marketing plan can introduce customers to a membership buying opportunity and earn bonuses or commissions based on the purchases by those members. Members in the buying opportunity can consume products or, at their option, qualify to become Independent Business Owners.

A further feature of the present invention is that it provides an electronic product catalog that may enhance an Independent Business Owner's recruiting efforts, retain IBO's, and open up new channels for IBO's to sell products.

An additional feature of the present invention is that it enables an IBO and his or her customers to order directly from the marketing company. This reduces order entry time and costs, and relieves IBO's from ordering administration, reporting, order tracking and Standing Order Product (SOP) processing. It also gives individual customers control over their shopping experience.

An additional feature of the present invention is that participants in a marketing business opportunity can introduce customers to membership in a membership buying opportunity and earn bonuses or commissions based on product purchases by those customers.

Another advantage of the present invention is that by providing opportunities for mass merchandising and targeted marketing, the present invention will allow business owners and the marketing company to gain a greater market share in particular product segments. The present invention also provides opportunities to identify new market segments so that new products and services may be produced to satisfy these new market segments. In addition, by building customer profiles and personalizing messages to individual customers, the present invention may allow the marketing company to increase sales of the existing products to current customers.

A further advantage of the present invention is that a single marketing distribution system can distribute the products of several different sellers, all distributed through a single independent sales network but with different levels and structures of compensation for different product lines. The present invention advantageously allows shoppers to shop for and buy products from different sources in a single transaction. The present invention further advantageously allows Independent Business Owners to earn income under a single marketing plan for selling a variety of different product lines in combinations selected by each individual Independent Business Owner.

A further advantage of the present invention is that by catering to streamlined and convenient ways of doing business and allowing the marketing company's IBOs a greater range of choices, the present invention can increase IBO retention.

Another advantage of the present invention is that the marketing company can increase the level of service to its customers while driving down the overall cost of doing business through efficient utilization of new technologies, particularly, although not limited to, Internet-related technologies.

A further advantage of the present invention is that the marketing company can build requisite customer data profiles and merchandizing expertise necessary for large-scale direct customer merchandizing.

A further advantage of the present invention that it provides Independent Business Owners in a marketing business with a "Virtual Office" feature that provides information vital to the operation of their business, including, but not limited to information on different product offerings and compensation systems, training, financial information, marketing support, customer profiles, and other information. The present invention also advantageously provides different levels of access to information about products and "Virtual Office" functions to different categories of Independent Business Owners, so that each participant receives information and marketing materials targeted to their individual preferences and business situation.

A still further advantage of the present invention is that the invention will support and enhance the relationships between IBOs and their customers thereby improving growth in the customer base. Growth will result in Web-generated leads, reducing communication time and increasing efficiency.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

FIGS. 4a-4f show block diagrams of exemplary alternative registration procedures according to the present invention;

FIG. 7 shows an exemplary layout of a "Income options" page web file of the present invention;

FIGS. 8a, 8b, and 8c show an exemplary interactive presentation within the Income options page web file of the present invention;

FIG. 9 shows an exemplary product list used for product browsing and shopping in the present invention;

FIG. 10 shows an exemplary shopping basket display page;

FIGS. 12a-12h show an exemplary layout of an exemplary shopping page web file of the present invention;

FIG. 27 shows an exemplary flow diagram depicting the process by which a user administers a pre-paid postage label for product exchanges and/or returns.

DETAILED DESCRIPTION OF THE DRAWINGS AND PRESENTLY PREFERRED EMBODIMENTS

Definitions

Figure 1:
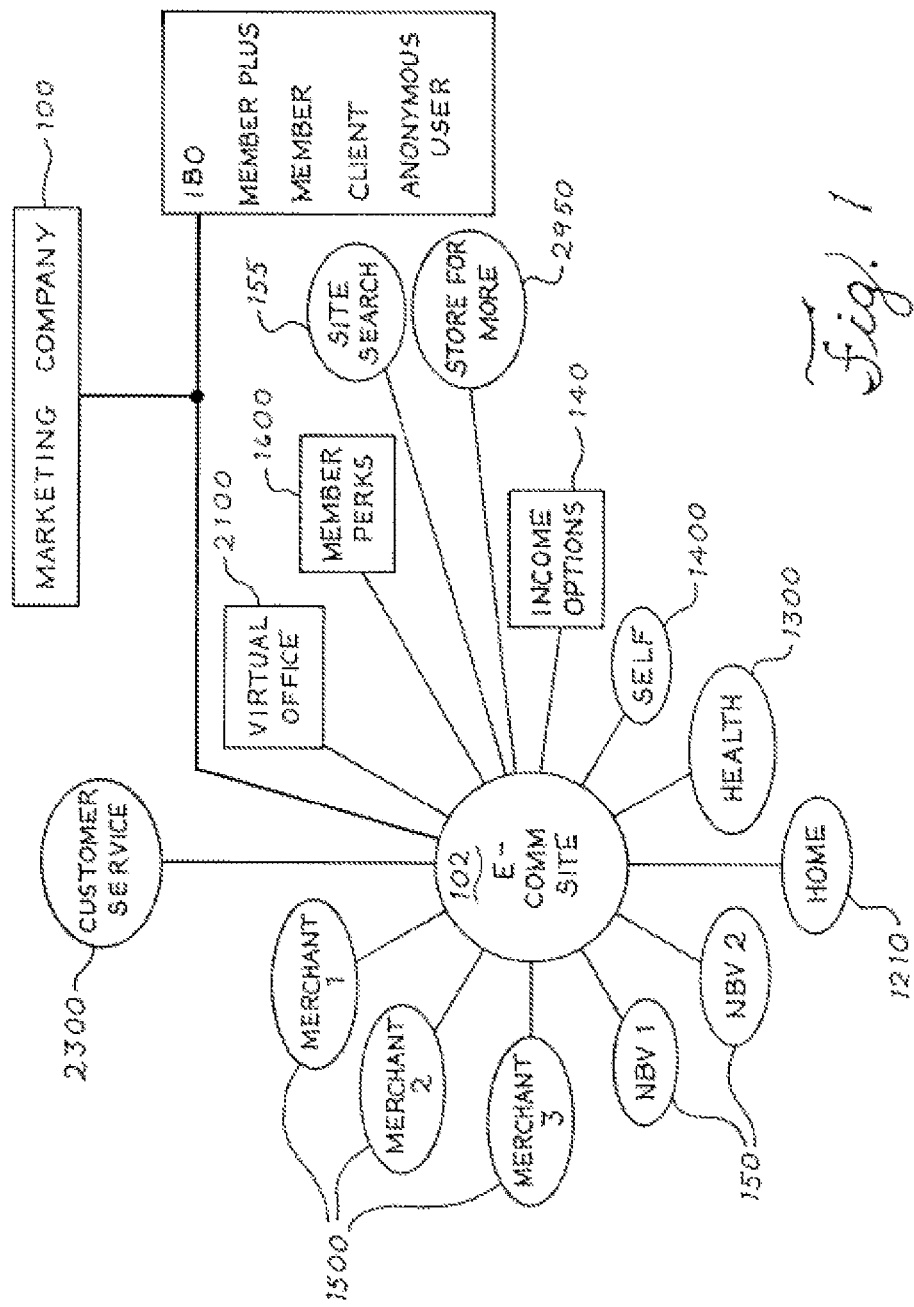
FIG. 1 shows a block diagram of one embodiment of the E-Commerce site of the present invention.

The following definitions are intended to provide clarity to various terms used in the present invention. Any reference to products is done for exemplary and/or explanatory purposes only. The breadth and scope of the present invention should not, however, be limited by any of the exemplary products or definitions disclosed herein.

ActiveX Data Objects (ADO)

ADO is an application program interface (API) from Microsoft Corporation, Redmond, Wash. ("Microsoft") that lets programmers writing Windows®, a registered trademark of the Microsoft Corporation, Redmond, Wash., applications get access to relational and non-relational databases from both Microsoft and other database providers. For example, if it was desired to write a program that would provide users of a Web site with data from an IBM DB2 database or an Oracle database, an ADO program statements could be included in an HTML file that was identified as an Active Server Page (ASP). When a user requested the page from the Web site, the page sent back could include appropriate data from a database, obtained using ADO code.

ActiveX

A software module based on Microsoft's Component Object Model (COM) architecture. It enables a program to add functionality by calling ready-made components that blend in and appear as normal parts of the program. They are typically used to add user interface functions, such as 3-D toolbars, a notepad, calculator or even a spreadsheet.

ActiveX Control

An ActiveX control is a component program object that can be re-used by many application programs within a computer or among computers in a network. The technology for creating ActiveX controls is part of Microsoft's overall ActiveX set of technologies, chief of which is the Component Object Model (COM). ActiveX controls can be downloaded as small programs or animations for Web pages, but they can also be used for any commonly-needed task by an application program in the latest Windows® and Macintosh®, a registered trademark of Apple Computer, Inc., Cupertino, Calif., environments.

Animated GIF

An animated GIF is a graphic image on a Web page that moves—for example, a twirling icon or a banner with a hand that waves or letters that get larger. In particular, an animated GIF is a file in the Graphics Interchange Format specified as GIF89a that contains within the single file a set of images that are presented in a specified order. An animated GIF can loop endlessly or it can present one or a few sequences and then stop the animation.

Anonymous E-Mail

Anonymous e-mail is e-mail that has been directed to a recipient through a third-party server that does not identify the originator of the message.

API (Application Program Interface)

An API (application program interface) is the specific method prescribed by a computer operating system or by another application program by which a programmer writing an application program can make requests of the operating system or another application.

ASP-Active Server Page

A Web page that contains programming code written in VB Script or Javascript. This code was developed by Microsoft starting with Version 3.0 of its Internet Information Server (IIS). When the IIS server encounters an ActiveServer page that is requested by the browser, it executes the embedded program. Active Server Pages are Microsoft's alternative to CGI scripts, which allow Web pages to interact with databases and other programs. Active Server Pages generally use an ".ASP" extension.

Authentication

Authentication is the process of determining whether someone or something is, in fact, who or what it is declared to be. In private and public computer networks (including the Internet), authentication is commonly done through the use of logon passwords. Knowledge of the password is assumed to guarantee that the user is authentic. Each user registers initially (or is registered by someone else), using an assigned or self-declared password. On each subsequent use, the user must know and use the previously declared password. The weakness in this system for transactions that are significant (such as the exchange of money) is that passwords can often be stolen, accidentally revealed, or forgotten.

AVI

Windows® AVI provides the capability to develop animation files that can be included in multimedia presentations and as part of World Wide Web pages. The files (which end with an .avi extension) require a special player which may be included with a Web browser or may require downloading.

Back End

Front-end and back-end are terms used to characterize program interfaces and services relative to the initial user of these interfaces and services. (The "user" may be a human being or a program). A "front-end" application is one that application users interact with directly. A "back-end" application or program serves indirectly in support of the front-end services, usually by being closer to the required resource or having the capability to communicate with the required resource. The back-end application may interact directly with the front-end or, perhaps more typically, is a program called from an intermediate program that mediates front-end and back-end activities.

Browser or Browser System

A browser system is a program that provides a way to look at, read and hear all the information on the World Wide Web. A browser typically interprets hypertext links and allows the user to view sites and navigate from one Internet node to another. A brief overview of web browsers and their interactions within the World Wide Web are set forth in U.S. Pat. No. 5,774,670, the entirety of which is herein incorporated by reference.

Browsing

A process that can describe moving between page web files associated with the marketing system web site of the present invention. "Browsing" can also refer to browsing the World Wide Web, which is described in U.S. Pat. No. 5,774,670, the entirety of which is herein incorporated by reference.

Bulletin Board System (BBS)

A bulletin board system is a computer that can be reached by computer modem dialing (and, in some cases, by Telnet) for the purpose of sharing or exchanging messages or other files. Some BBS's are devoted to specific interests; others offer a more general service.

C++

C++ is an object-oriented programming language that is now generally viewed as the best language for creating large-scale application programs. C++ is a superset of the C language.

CGI—Common Gateway Interface

A small program written in a script language such as Perl that functions as the glue between HTML pages and other programs on the Web server. For example, a CGI script would allow search data entered on a Web page to be sent to the DBMS (database management system). It would also format the results of that search onto an HTML page, which is sent back to the user.

Client/Server

An architecture in which the client machine (personal computer or workstation) is the requesting machine and the server is the supplying machine, both of which are connected via a local area network (LAN) or wide area network (WAN). Since the early 1990s, the client/server architecture has been used to build applications on LANs in contrast to centralized minicomputers and mainframes with dedicated terminals. The client machine contains the user interface and, in terms of the present invention, preferably performs none or very little of the application processing. A client machine may also be referred to herein as a "user machine" or "user." Servers can be high-speed microcomputers, minicomputers or even mainframes. A database server maintains the databases and processes requests from the client machine to extract data from, or update, the database. An application server may provide additional business processing for the client machine.

COM+

COM+ is an extension of COM (Component Object Model), Microsoft's strategic building block approach for developing applications. COM+ is both an object-oriented programming architecture and a set of operating system services. It adds to COM a new set of system services for application components while they are running, such as notifying them of significant events or ensuring they are authorized to run. COM+ is intended to provide a model that makes it relatively easy to create business applications that work well with the Microsoft Transaction Server (MTS) in a Windows® NT system.

Cookie

A cookie is a special text file that a Web site puts on a hard disk of a user machine accessing the web site so that it can remember something about the user at a later time. Typically, a cookie records a user's preferences when using a particular site. Using the Web's Hypertext Transfer Protocol (HTTP), each request for a Web page is independent of all other requests. For this reason, the Web page server has no memory of what pages it has sent to a user previously or anything about the user's previous visits. A cookie is a mechanism that allows the server to store its own file about a user on the user's own computer. The file is stored in a subdirectory of the browser directory. The cookie subdirectory will contain a cookie file for each Web site the user has been to that uses cookies. An exemplary specification for cookies can be found at http://www.netscape.com/newsref/std/cookie-spec.html, which is herein incorporated by reference in its entirety. A detailed description of cookies, and the storage of state information, is contained in U.S. Pat. No. 5,774,670, the entirety of which is herein incorporated by reference.

Data Warehouse

A data warehouse is a central repository for all or significant parts of the data that an enterprise's various business systems collect. Typically, a data warehouse is housed on an enterprise mainframe server. Data from various online transaction processing (OLTP) applications and other sources is selectively extracted and organized on the data warehouse database for use by analytical applications and user queries. Data warehousing emphasizes the capture of data from diverse sources for useful analysis and access, but does not generally start from the point-of-view of the end user or knowledge worker who may need access to specialized, sometimes local databases.

Database

A set of related files that is created and managed by a database management system (DBMS). DBMSs can manage any form of data including text, images, sound and video. The software determines database and file structures.

Demilitarized Zone (DMZ)

In computer networks, a DMZ is a computer host or small network inserted as a "neutral zone" between a company's private network and an outside public network. It prevents outside users from getting direct access to a server that has company data. A DMZ is an optional and more secure approach to a firewall and can also function as a proxy server as well.

Distributed Component Object Model (DCOM)

DCOM is a set of Microsoft concepts and program interfaces in which client program objects can request services from server program objects on other computers in a network. The Component Object Model (COM) provides a set of interfaces allowing clients and servers to communicate within the same computer (running a Windows® 95, 98, or NT system).

DHTML—Dynamic HTML

Specific enhancements to HTML tags that allow Web pages to function more like regular software. For example, fonts could be changed or images could be selected without having to jump to another page. Dynamic HTML (DHTML) is based on the Document Object Model (DOM) interface that allows HTML tags to be dynamically changed via JavaScript®, a trademark of Sun Microsystems, Inc., Mountain View, Calif., or some other scripting language. Netscape® Communicator and Microsoft Internet Explorer 4.0 use different methods to implement DHTML. Netscape® is a registered trademark of Netscape Communications Corporation, Mountain View, Calif.

Digital Subscriber Line (DSL)

A modem technology that increases the digital speed of ordinary telephone lines by a substantial factor over common V 0.34 (33600 BPS) modems. DSL modems may provide symmetrical or asymmetrical operation. Asymmetrical provides faster downstream speeds and is suited for Internet usage and video on demand, where the heaviest transmission requirement is from the provider to the customer.

Direct Access Storage Device (DASD)

DASD is a general term for magnetic disk storage devices and has historically been used in the mainframe and minicomputer (mid-range computer) environments. When used, it may also include hard disk drives for personal computers. A recent form of DASD is RAID (see below).

Downloading

Downloading is the transmission of a file from one computer system to another, usually smaller computer system. From the Internet user's point-of-view, to download a file is to request it from another computer (or from a Web page on another computer) and to receive it.

Dynamic Link Library (DLL)

An executable program module that performs some function. DLLs are not launched directly by users. When needed, they are called for by a running application and loaded to perform a specific function. DLLs are generally written so that their routines are shared by more than one application at the same time.

E-Commerce

E-Commerce is the application of communication and information sharing tools among trading partners to the pursuit of business objectives. Representative types of electronic commerce include, for example, Information access, Shopping services and Virtual enterprises.

Electronic Data Interchange (EDI)

EDI is a standard format for exchanging business data.

Electronic Mail (E-Mail)

E-Mail is the exchange of computer-stored messages by telecommunication. E-Mail messages are usually encoded in ASCII text. However, non-text files, such as graphic images and sound files, can be sent as attachments in binary streams. As used herein, E-mail may also be referred to as an electronic notification.

Encryption

Encryption is the conversion of data into a form, called a cipher, that cannot be easily intercepted by unauthorized people. Decryption is the process of converting encrypted data back into its original form, so it can be understood. Typically, when an encrypted document arrives at its destination, the encrypted document is converted back to its original form through decryption. The readable document is generally referred to as a "decrypted" document. A basic introduction to encryption and decryption is described in the text written by Bruce Scheiner entitled "Applied Cryptography: Protocols, Algorithms And Source Code in C," published by John Wiley & Sons, 1994, the entirety of which is hereby incorporated by reference. Moreover, more detailed descriptions of systems and apparatus for accomplishing encryption and decryption in computer networks are set forth in U.S. Pat. Nos. 5,903,652, 5,850,442, and 5,850,446, the entirety of each of which is hereby incorporated by reference.

ERP—Enterprise Resource Planning

An information system that integrates all manufacturing and related applications for an entire enterprise. An ERP implies the use of advanced information technologies, including, but not limited to, Graphical User Interfaces ("GUIs"), Computer Aided Software Engineering ("CASE") tools, 4GL (fourth-generation programming language), client/server architecture and open systems.

Electronic Retailing

Electronic retailing is the selling of retail goods on the Internet.

Ethernet

A type of Local Area Network (LAN) developed by Xerox, Digital and Intel. It is the most widely used LAN access method. Token Ring is the next most widely used method. Ethernet is normally a shared media LAN. All stations on the segment share the total bandwidth, which is either 10 MBPS (Ethernet), 100 MBPS (Fast Ethernet) or 1000 MBPS (Gigabit Ethernet). With switched Ethernet, each sender and receiver pair have the full bandwidth.

Extranet

An extranet is a private network that uses the Internet protocols and the public telecommunication system to securely share part of a business's information or operations with suppliers, merchants, partners, customers, or other businesses. An extranet can be viewed as part of a company's intranet that is extended to users outside the company.

Fourth-Generation Language (4GL)

A computer language that is more advanced than traditional high-level programming languages. Languages for accessing databases are often described as 4GLs. An exemplary 4GL language statement is "EXTRACT ALL CUSTOMERS WHERE "PREVIOUS PURCHASES" TOTAL MORE THAN $1000." Another example, as in dBase, the command list displays all the records in a data file. In second- and third-generation languages, instructions would have to be written to read each record, test for end of file, place each item of data on screen and go back and repeat the operation until there are no more records to process. First-generation languages are machine languages; second-generation languages are machine dependent assembly languages; third-generation languages are high-level programming languages, such as FORTRAN, COBOL, BASIC, Pascal and C.

Fractional T-1 or T-3 Line

A fractional T-1 or T-3 line is a T-1 or T-3 digital phone line in the North American T-carrier system that is leased to a customer at a fraction of its data-carrying capacity and at a correspondingly lower cost. A T-1 line contains 24 channels, each with a data transfer capacity of 64 KBPS. The customer can rent any number of the 24 channels. The transmission method and speed of transfer remain the same. Overhead bits and framing are still used, but the unrented channels simply contain no data.

Gigabyte (GB)

A gigabyte is a measure of computer data storage capacity and is "approximately" one billion bytes.

Graphics Interchange Format (GIF)

A popular raster graphics file format developed by CompuServe. It supports 8-bit color (256 colors) and is widely used on the Web, because the files compress well. GIFs include a color table that includes the most representative 256 colors used. For example, a picture of the forest would include mostly greens. This method provides excellent realism in an 8-bit image. GIF89 allows one of the colors to be made transparent and take on the background color of the underlying page or window. GIF89a supports animated GIFs, which are sequences of images displayed one after the other to simulate movement.

Hypertext Markup Language (HTML)

HTML (Hypertext Markup Language) is the set of "markup" symbols or codes inserted in a file intended for display on a World Wide Web browser. The markup tells the Web browser how to display a Web page's words and images for the user.

Hypertext Transfer Protocol (HTTP)

HTTP is the set of rules for exchanging files (text, graphic images, sound, video and other multimedia files) on the World Wide Web. Relative to the TCP/IP suite of protocols, HTTP is an application protocol. The World Wide Web is based on the concept of "hypertext" and the transfer method known as HTTP. HTTP is typically designed to run primarily over TCP/IP and uses the standard Internet setup, where a server issues the data and a client machine or "client browser" displays the data. One format for information transfer is to create documents using HTML page (see above), which are preferably made up of standard text as well as formatting codes which indicate how the page should be displayed. The Web client machine, reads these codes in order to display the page. The hypertext conventions and related functions of the World Wide Web are described in the appendices of U.S. Pat. No. 5,715,314, the entirety of which is herein incorporated by reference.

HTTPS (Secure Hypertext Transfer Protocol)

HTTPS is a Web protocol developed by Netscape® and built into its browser that encrypts and decrypts user page requests as well as the pages that are returned by the Web server. HTTPS uses Netscape's Secure Socket Layer (SSL) as a sublayer under its regular HTTP application layer. SSL can use a 40-bit or 120 bit key size for the stream encryption algorithm.

Hyperlink

On the Web or other hypertext systems, hyperlink is a synonym for both link and hypertext link.

Internet Information Server (IIS)

Web server software from Microsoft that runs under Windows® NT. It supports Netscape's SSL security protocol and turns an NT-based PC into a Web site.

Input/Output (I/O)

Transferring data between the CPU and a peripheral device. Every transfer is an output from one device and input into another.

Integrated Services Digital Network (ISDN)

An international telecommunications standard for transmitting voice, video and data over digital lines running at 64 KBPS. The telephone companies commonly use a 64 KBPS channel for digitized, two-way voice conversations. ISDN service is becoming widely available in the U.S.

Java®

Java®, a registered trademark of Sun Microsystems, Inc., Mountain View, Calif., is a programming language (Sun Microsystems) expressly designed for use in the distributed environment of the Internet. It was designed to have the "look and feel" of the C++ language, but it is simpler to use than C++ and enforces a completely object-oriented view of programming Java® can be used to create complete applications that may run on a single computer or be distributed among servers and clients in a network. It can also be used to build small application modules or applets for use as part of a Web page. Applets make it possible for a Web page user to interact with the page.

Java® Scripting Language (Javascript®)

A script language from Sun Microsystems, Inc. that is supported in Netscape® Navigator as of Version 2.0. JavaScript® uses the HTML page as its user interface, whereas Java® can generate a completely custom interface. On the client machine, JavaScript® applets are maintained in source code. On the server, they are compiled into byte code (intermediate language), similar to Java® programs. JavaScript® does not have the programming overhead of Java®, but can be used in conjunction with it. For example, a JavaScript® applet could be used to display a data entry form and validate the input, while a Java® program processes the information. JavaScript® is also used to tie Java® applets together.

Joint Photographic Experts Group (JPG)

A type of graphic compression. Good quality for photographs.

Legacy Systems

Mainframe and/or minicomputers typically supporting character based user interfaces.

Logical Data Model (LDM)

Representation of those entities, objects, relationships and attributes, which are used to construct a physical database model.

Logon/Login

In general computer usage, logon is the procedure used to get access to an operating system or application, usually in a remote computer. Generally, a logon procedure requires that the user have (1) a user ID and (2) a password. Often, the user ID must conform to a limited length such as eight characters and the password must contain at least one digit and not match a natural language word. The user ID can be freely known and is visible when entered at a keyboard or other input device. The password must be kept secret (and is not displayed as it is entered). A similar procedure, called registration, is required to enter some Web sites.

Message Queuing

In programming, message queuing is a method by which processes (or program instances) can exchange or pass data using an interface to a system-managed queue of messages. Messages can vary in length and be assigned different types or usages. A message queue can be created by one process and used by multiple processes that read and/or write messages to the queue. For example, a server process can read and write messages from and to a message queue created for client processes. The message type can be used to associate a message with a particular client process even though all messages are on the same queue.

Microsoft Transaction Server (MTS)

The Microsoft Transaction Server is a program that runs on an Internet or other network server and manages application and database transaction requests on behalf of a client computer user. The Transaction Server screens the user and client computer from having to formulate requests for unfamiliar databases and, if necessary, forwards the requests to database servers. It also manages security, connection to other servers and transaction integrity.

NetPerceptions

NetPerceptions is an application that is bundled with Vignette, a content management system, that can be used for Web site ad tracking. It also offers E-Commerce merchandizing solutions for cross selling, up selling and increasing Web shopper loyalty.

Network

In information technology, a network is a series of points or nodes interconnected by communication paths. Networks can interconnect with other networks and contain sub networks. The most common topologies or general configurations of networks include the bus, star and ring topologies. Networks can also be characterized in terms of spatial distance as local area networks (LANs), metropolitan area networks (MANs) and wide area networks (WANs).

NT File System (NTFS)

NTFS is the system that the Windows® NT operating system uses for storing and retrieving files on a hard disk. NTFS is the Windows® NT equivalent of the Windows® 95/98 FAT (file allocation table) and the IBM OS/2 HPFS (high performance file system).

Open Database Connectivity (ODBC)

A standard or open application programming interface (API) for accessing a database. By using ODBC statements in a program, files in a number of different databases, including Access, dBase, Excel and Text, can be accessed. In addition to the ODBC software, a separate module or driver is needed for each database to be accessed.

Peripheral

Any hardware device connected to a computer, such as a monitor, keyboard, printer, disk, tape, graphics tablet, scanner, joy stick, paddle and mouse.

Perl (Practical Extraction Report Language)

A programming language that combines syntax from several UNIX utilities and languages. Perl is designed to handle a variety of system administrator functions. Because of its comprehensive string handling capabilities, it is widely used on Web servers. Stemming from the UNIX world, Perl has been adapted to other platforms.

Physical Data Model (PDM)

Generation of an actual SQL server database.

Plug-In

An auxiliary program that works with a major software package to enhance its capability. For example, plug-ins are widely used in image editing programs such as PhotoShop to add a filter for some special effect. Plug-ins are added to Web browsers such as Netscape® to enable them to support new types of content (audio, video, etc.). The term is widely used for software, but could also be used to refer to a plug-in module for hardware.

RAID (Redundant Array of Independent Disks)

RAID is a way of storing the same data in different places (thus, redundantly) on multiple hard disks. By placing data on multiple disks, I/O operations can overlap in a balanced way, improving performance. Since multiple disks increases the mean time between failure (MTBF), storing data redundantly increases fault-tolerance.

Synchronized Multimedia Integration Language (SMIL)

Pronounced "smile", it is a language for displaying TV-like content on the Web from the World Wide Web Consortium ("W3C"). It is used to sequence audio, video and graphics elements into a continuous, low-bandwidth stream. SMIL supports hypertext links to background and related information or for ordering a product.

TCP/IP (Transmission Control Protocol/Internet Protocol)

TCP/IP (Transmission Control Protocol/Internet Protocol) is the basic communication language or protocol of the Internet. It can also be used as a communications protocol in the private networks called intranets and in extranets. When a computer is set up with direct access to the Internet, the computer is provided with a copy of the TCP/IP program just as every other computer that messages are sent to, or information is received from, also has a copy of TCP/IP.

URL (Uniform Resource Locator)

A URL is the address of a file (resource) accessible on the Internet. The type of resource depends on the Internet application protocol. Using the World Wide Web's protocol, the Hypertext Transfer Protocol (HTTP), the resource can be an HTML page, an image file, a program such as a CGI application or Java® applet, or any other file supported by HTTP. The URL contains the name of the protocol required to access the resource, a domain name that identifies a specific computer on the Internet and a hierarchical description of a file location on the computer. Additional descriptions of URLs can be found in U.S. Pat. No. 5,774,670 and the appendices to U.S. Pat. No. 5,715,314, the entirety of each of which is herein incorporated by reference.

VBScript

VBScript is an interpreted script language from Microsoft.

Vignette

Vignette Enterprise Solutions is a content management system that includes two platforms: Vignette StoryServer 4 and Vignette Syndication Server Plus, a comprehensive set of tools (Production Center, Business Center and Development Center).

Visual Basic

Visual Basic is a programming environment from Microsoft in which a programmer uses a graphical user interface to choose and modify pre-selected chunks of code written in the BASIC programming language.

VRML Virtual Reality Modeling Language

A 3-D graphics language used on the Web. After downloading a VRML page, its contents can be viewed, rotated and manipulated. Simulated rooms can be "walked into." The VRML viewer is launched from within the Web browser.

Webmaster

A Webmaster is a person who either: creates and manages the information content (words and pictures) and organization of a Web site, manages the computer server and technical programming aspects of a Web site; or does both.

Web Site

A Web site is a related collection of Web files that typically includes, but is not limited to, a beginning file called a home page.

Windows® NT

Windows® NT is the Microsoft Windows® personal computer operating system designed for users and businesses needing advanced capability. Windows® NT is actually a combination of two products: Microsoft NT Workstation and Microsoft NT Server.

World Wide Web

The World Wide Web is defined as all of the resources and users on the Internet that are using the Hypertext Transport Protocol (HTTP).

eXtensible Markup Language

A subset of the SGML document language designed for use on the Web and sanctioned by the World Wide Web Consortium (W3C). It provides more flexibility for designing Web pages than HTML, which itself is a document type of SGML. Whereas HTML uses a fixed set of tags (codes) to describe the pages, XML maintains the flexible meta-language characteristic of SGML by defining the codes that will be used in each document.

Overview

The present invention is directed to a system and method for providing complete electronic commerce ("E-Commerce") transactions and solutions within a marketing system for a marketing company's products via a network generally accessible by the public, such as the World Wide Web. The present invention includes facilities for signing up or registering new customers with the marketing system and recruiting, training and supporting new Independent Business Owners (IBOs) through an interactive online process. In another aspect, the present invention relates to the combination of a marketing business with a membership buying opportunity using both electronic commerce and face-to-face transactions. Particularly, the present invention is directed to a system and method for combining a marketing business with a membership buying club. Independent Business Owners participating in the marketing plan can introduce customers to a membership buying opportunity and earn bonuses or commissions, which may alternatively be referred to as "income," based on the purchases by those customers. Members in the buying opportunity can consume products or, at their option, qualify to become Independent Business Owners. The categories of IBO, Member, Member Plus, and Client will be described in more detail below.

As used herein, a "marketing company" denotes a company that employs a distribution force of independent distributors. Such distributors can be compensated in a variety of ways including, but not limited to, multilevel compensation, which includes compensation on sales made directly by the distributor as well as sales made by others, commissions on sales made only directly by the distributor, or other suitable types of commissions or compensation.

As used herein, "bonus" can mean compensation or income paid to an IBO based upon, but not limited to, the following: sales of marketing system products and services to the IBO's personal group; sales of marketing system products and services to the IBO; and sales of marketing system products and services by the IBO and by the personal group; and sales of marketing system products and services to the IBO. In another embodiment of the present invention, the bonus may include compensation paid to an IBO based on the volume of product sales to that IBO and IBOs personally sponsored by that IBO and Members and customers serviced by that IBO. As used herein, "group" is used to, for example, describe all IBOs who have been personally sponsored by an IBO in addition to all IBOs sponsored by those people and so on. "Sponsoring" is the act of introducing others to the marketing company's business opportunity and having them sign up as, for example, but not limited to, a Member or a Member Plus.

Marketing system products and services can include, for example, all products and services available for purchase through the marketing system of the present invention. In one embodiment, marketing system products and services are made available from a marketing company associated with the marketing system. In another embodiment, marketing system products and services are made available from a merchant partner associated with the marketing system. In another embodiment, marketing system products and services are made available from both the marketing company and the merchant partner.

The present invention is also directed to a system and method for offering a single marketing distribution system for the products of several different sellers, which preferably include a marketing company and merchant partners, all distributed through the same independent sales network but with different levels and structures of compensation for different product lines. The present invention preferably allows shoppers to shop for and buy products from different sources, including a marketing company and merchant partners, preferably, in a single transaction. It allows Independent Business Owners to earn income under a single marketing plan for selling a variety of different product lines in combinations selected by each individual Independent Business Owner.

The present invention is also directed to providing Independent Business Owners in a marketing business with a "Virtual Office" feature that provides information vital to the operation of their business. Preferably, the Virtual Office feature is embodied in an office page web file associated with the web site of the present invention. The information provided includes, but is not limited to, information on different product offerings and compensation systems, training, financial information, marketing support, customer profiles, and other information. The information can also include information relating to sales of marketing system products and services to a personal group and sales of marketing system products and services by the personal group. The personal group preferably comprises at least one individual selected from the group consisting of a registered Client, Member, Member Plus, and an IBO. Alternatively, the information can include sales of marketing system products and services to the IBO and sales of marketing system products and services by the IBO. Additionally, the office page web file allows an IBO to view the total individual point value, total individual business volume, the IBO's total point value, and the IBO's total business volume. The total point values and total business volumes are calculated from the individual point values and business volumes assigned to marketing system products and services.

The present invention is also directed to a system and method for providing different levels of access to information about products, and "Virtual Office" functions to Independent Business Owners, so that each participant receives information and marketing materials targeted to their individual preferences and business situations.

The present invention is also directed to a system and method for facilitating an on-line shopping and rewards program through a network, the network comprising at least one server computer capable of communicating with a browser system located at a remote client computer. The present invention includes establishing an interactive online registration process between the client browser system and the server computer so that an individual may register with the marketing system as a Client, a Member, or a Member Plus, wherein a Client is not eligible to earn compensation and is eligible to buy products at a Client price, wherein the Client price is preferably less than or equal to a retail price, wherein a Member is eligible to buy products at a Member price, wherein the Member Price is preferably less than or equal to the Client price, and wherein the Member is not eligible to earn compensation, and wherein a Member Plus is eligible to buy products at a Member Plus price, wherein the Member Plus price is preferably less than or equal to the Member price or the Client price, and wherein a Member Plus qualifies to earn compensation by satisfying a sales qualification level and thereby qualifying as an IBO, and wherein each IBO is eligible to buy products at an IBO price, wherein the IBO price is preferably less than or equal to the Member Plus price or the Member price, and wherein the IBO is eligible to earn compensation.

The present invention further includes maintaining a catalog comprising marketing system products and services on the server computer. Additionally, the present invention includes: maintaining a rewards database on the server computer for storing reward points corresponding to a registered Member; assigning a rewards value to the marketing system products and services and storing the rewards value in the catalog; assigning a redemption value to the marketing system products and services and storing the redemption value in the catalog; providing on-line access to the catalog to a registered Member via an on-line order form; allowing the registered Member to submit an order for marketing system products and services via the on-line order form; providing on-line access to the catalog to a registered Member via an on-line redemption form; allowing the registered Member to submit a rewards exchange request for marketing system products and services via the on-line redemption form; and subtracting from the rewards database a redemption value corresponding to the marketing system products and services chosen by the registered Member.

System and Method of the Present Invention

An exemplary embodiment of the present invention is shown generally in FIG. 1.

As can be seen from FIG. 1, the present invention preferably includes a direct link between a marketing company 100 and an E-Commerce (E-Comm) Web Site 102. The E-Commerce Web Site 102 is preferably served up or displayed to shoppers or users differently, depending upon the membership or registration level or attributes of the shopper or user. In one embodiment of the present invention, one of the registered Client, Member, or Member Plus does not have access to all marketing system products and services. In a further embodiment of the present invention, only a registered IBO has access to all marketing system products and services. In an alternate embodiment, a different group of marketing system products and services is preferably presented to each of the registered Client, Member, Member Plus, and IBO.

The invention further preferably includes, for example, but is not limited to a shopping page Web file, which includes the following: "My Health" (Health 1300), "My Home" (Home 1210) and "My Self" (Self 1400). It should be apparent to one of ordinary skill in the art that each of the Health 1300, Home 1210, and Self 1400 may represent individual shopping page web files associated with the E-Commerce Web Site 102. The present invention is not limited to three such shopping page web files, and other shopping page web files could be included. Such other shopping page web files could be directed to other types of products, such as, but not limited to, travel-related products and sporting equipment.

Additionally, the marketing system's E-Commerce registered users can visit the "Member Perks" 1600 page web file and explore the number of features described herein available to Members. Preferably, an on-line form associated with the member perks page web file is supplied to a registered Client, Member, Member Plus, and IBO. The registered Client, Member, Member Plus, and IBO enters personal information onto the on-line form. Personal information is preferably stored on a server computer, as will be described in more detail below, for example, with respect to FIGS. 16-19 ("My Business") and thereafter. This personal information can be used to customize their E-Commerce environment. As used herein, "Member Perks" and "Member Benefits" or "Member Services" may be used interchangeably and should be construed by one having ordinary skill in the art as analogous terms.

In a preferred embodiment of the present invention, IBOs and Members Plus, which will be described in more detail below, can visit a "Virtual Office" 2100, or office page web file, to find information needed to efficiently run their E-Commerce business. An "Income Options" 140 site, or income options page web file, provides an area where a web shopper can find out more information about the E-Commerce business opportunity and can quickly and easily execute membership registration. In a preferred embodiment, the income options page web file comprises a multimedia presentation and information relating to the marketing system. such as through a slide-show presentation. Additionally, in the preferred embodiment, only a registered Client, Member, Member Plus, and IBO may view the multimedia presentation via the income options page web file.

As shown, the web site also provides links to affiliates 1500 (Merchants 1, 2, and 3) or merchant partner page web files of the marketing company, and new business ventures of the marketing company (NBV 1 and 2) Web sites 150. Each of these will be described in more detail below. In addition, in one embodiment, the web site also provides links to a "Store for More" 2950, which can comprise all marketing system products and services, or a subset thereof, and a customer service page web file 2300, which will be described in more detail below.

In addition, there preferably is a link to a site search page 155 from the primary navigational menu. Site search page 155 allows a user to enter common terms and/or phrases and attempts to locate those terms or phrases within the E-Commerce web site.

The E-Commerce web site 102 as embodied in the present invention has several primary audiences, each with different informational needs. The site provides IBOs with a new description for the marketing company's business and its objectives. Moreover, prospects with only a slight interest in the marketing plan can be signed up as Clients or Members. Web prospects who simply want to make some additional money can be referred to the site and signed up as a Member Plus. Additionally, users who are not registered with the marketing system, referred to herein as anonymous users, site visitors, surfers, or the like, can navigate through non-restricted portions of the web site and can select items for purchase. In a preferred embodiment, these anonymous users must register prior to purchasing the items selected for purchase. Additionally, the site provides the facilities for registered E-Commerce IBOs and Members Plus to manage and monitor their business, via the "Virtual Office" section of the site.

Prospective shopping leads typically and preferably come from Clients, Members, Members Plus, and/or Independent Business Owners. However, potential leads also may come from the marketing company, merchant partners, or other merchandising sources, or any other suitable source. A description follows of exemplary types of audience or participation categories and the exemplary benefits and services provided by the present invention to these audience members or participation categories.

Client

A Client describes a participation category in which an individual registers with the marketing system. A Client may purchase products or services directly from a registered IBO and be serviced by the IBO. In an alternative embodiment, the Client may purchase products or services directly from a registered Member Plus and be serviced by the Member Plus. In an alternative embodiment, the Client may purchase products and services directly from a marketing company. The Client preferably purchases products or services at a Client price, which is preferably less than or equal to a retail price. An Independent Business Owner, Member Plus, or in some cases another Member typically refer Clients to the E-Commerce Web site 102 embodied in the present invention.

In one embodiment, Clients purchase products from the marketing company at retail prices. A retail price is preferably greater than an IBO price, which is a price at which IBOs buy products and services from the marketing company. A Client is preferably not eligible to purchase marketing system products or services at an IBO price, wherein the IBO price is preferably less than the retail price. In other words, by analogy, a Client preferably purchase products or services at a retail price from, for example, a retail department store, whereas an IBO purchases products or services from, for example, a distribution warehouse at a wholesale price. A Client preferably has exposure to a subset of the total core product and catalog lines for browsing, but may be shown all products if the SKU or identification number, or the exact brand name is known for a particular product and is searched for. Moreover, a Client is preferably not eligible to earn compensation or bonus income. The site provides an amusing and efficient place for Clients to shop, as product favorites may be continually target-marketed to the Client based upon their buying habits. Further, a Client is preferably exposed to specials and other deals to entice them to become Members of the marketing system.

Member

The E-Commerce Web site is designed primarily, but not exclusively, for Members. A Member describes a participation category in which an individual registers with the marketing system. A Member is preferably a discount buyer with membership benefits. An Independent Business Owner, Member Plus, or in some cases another Member, typically refers Members to the E-Commerce Web site. A principal feature of a Member is that by paying an annual fee, the Member is entitled to purchase products and services for their own consumption directly from the marketing company at a price equal to or greater than the price paid by Independent Business Owners. This price is usually less than the retail price paid by Clients. The marketing company also offers direct marketing promotions targeted at Members. Members are also able to sign up online via the E-Commerce site or in person. Moreover, Members can place standing and recurring orders and may purchase products from an IBO or Member Plus.

Another feature of membership is complete access to the My Business area that provides benefits beyond those offered to clients. Personalized benefits, such as news, weather, sports, e-mail, as well as the E-Commerce Rewards Program, which is preferably designed exclusively for Members, are available.

The Member, however, is not entitled to a performance bonus nor is the Member authorized to recruit or sponsor other Members. Moreover, Members are not encouraged or authorized to resell products from the marketing company.

Member Plus

A Member Plus describes a participation category in which an individual registers with the marketing system. An Independent Business Owner or another Member Plus typically may refer a Member Plus to the E-Commerce Web site. A Member Plus is a person that is interested in purchasing products from the marketing company at Independent Business Owner prices as well as becoming an E-Commerce Independent Business Owner. A Member Plus is entitled to purchase products and services for their own consumption directly from the marketing company at a Member Plus price which may be the same as or less than a Member price. Some products and services available to IBOs are also available to Members Plus as described below. Members Plus are not entitled to a performance bonus. They are however, encouraged and authorized to resell the company's products as well as to generate new sales to direct-buying consumers such as Members. Moreover, a Member Plus can place standing and recurring orders for products in both eaches and bulk and can sponsor others into the marketing system.

In one embodiment, the Member Plus purchases an E-Commerce Business Kit, which gives them the ability to recruit, retail and receive a bonus, and pays a fee. This fee entitles the Member Plus to purchase products at Independent Business Owner prices. In a preferred embodiment, the E-Commerce Business Kit comprises products, videos, and literature used by the Member Plus to build and grow their independent business.

Moreover, a Member Plus has complete access to the Virtual Office site 2100 which is designed to provide tools to help manage and monitor an E-Commerce business. Access to personalized shopper information, Web-based e-mail, and great deals also are available to the Member Plus via the E-Commerce site. All point value/business volume point (PV/BV) (described in more detail below) that the Member Plus accumulates goes to the IBO until such time a performance bonus level has been achieved. The Member Plus qualifies as an Independent Business Owner upon achieving the specified performance bonus level.

Independent Business Owner

An IBO describes a participation category in which a registered individual participates in the marketing system. Alternatively, an IBO may describe an individual interested in earning income from the sale of products from the marketing company, although the IBO will also be entitled to purchase products for his/her own consumption. An IBO has the ability to recruit, retail, and receive a bonus, collect PV/BV, and participate in sales incentive programs. An IBO can purchase all products from the core product and catalog lines at the IBO price, which is preferably less then a retail price established for the products.

An Independent Business Owner can place standing and recurring orders for products in both "eaches" and cases. As used herein, "eaches" refers to purchasing products in single quantities rather than case quantities. Cases can refer to a group of products composed of units of products. In one embodiment, there is an additional charge when ordering products as an "each" compared to the unit cost of the item when ordered by the case. In addition, an IBO is entitled and encouraged to resell products to end-user consumers as well as to generate sales by the marketing company to such end-user consumers, including Members. Each IBO is entitled to charge any markup he or she chooses for products he or she resells.

To qualify to earn bonus income, each IBO must preferably generate at least 50PV of sales in a month to end-user consumers, either Members or individuals who are neither Members nor IBOs. Personal consumption by an IBO preferably does not count toward this qualification. It should be understood by one of ordinary skill in the art, however, that the personal consumption by an IBO could count toward the qualification but it is preferred that it does not. Each IBO thus qualified is entitled to earn a performance bonus based on the IBO's own purchases, the purchases of his or her personal group, sales made to/by the IBO, sales made to/by the personal group. These sales may include sales made to individuals outside the marketing system, such as neighbors. Each IBO is entitled, but not required, to sponsor other IBOs and to introduce new Members.

In addition, the IBO has complete access to the Virtual Office site 2100 to provide tools to help manage and monitor their E-Commerce business. Access to personalized information such as PV/BV, Web-based e-mail, as well as access to great merchandizing offers, is also provided to the IBO.

In one embodiment, the participation categories of the present invention can comprise IBOs, Members, Members Plus, and Clients. In an alternative embodiment, the participation categories of the present invention can comprise IBOs, Members, and Clients. It should be understood by a person having ordinary skill in the art that the present invention is not limited to a particular selection of participation categories and other categories with varying benefits, privileges, and characteristics could be used within the scope of the invention.

Figure 2:
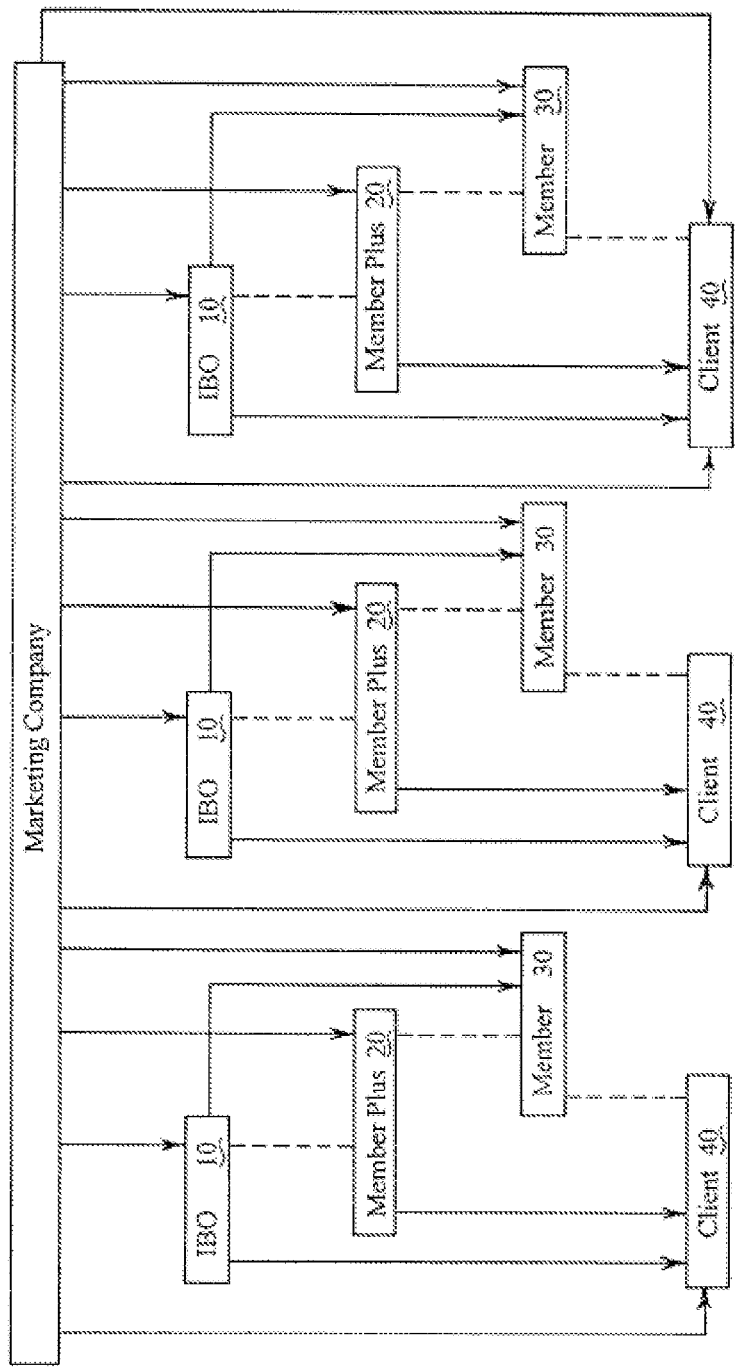
FIG. 2 shows a block diagram representing exemplary participation levels comprising the marketing system of the present invention.

Referring now to FIG. 2, there is shown an exemplary embodiment of the present invention. According to the present invention, it is preferred that a company's products and/or services are marketed and sold to customers (who may include, but is not limited to, Clients, Members, Members Plus, and IBOs) using an independent network of distributors in conjunction with direct retailing to the customer. As will be described in more detail below, each distributor within the distribution force may be compensated in a variety of ways including, but not limited to, multilevel compensation, which includes compensation on sales made directly by the distributor as well as sales made by others, commissions or retail markup on sales made only directly by the distributor, or other suitable types of commissions or compensation. Each distributor is preferably an Independent Business Owner (IBO), whose individual success depends upon that IBO's retailing efforts as well as the retailing efforts of those sponsored by the IBO in accordance with the present invention.

As shown in FIG. 2, the present invention preferably comprises four different participation levels or categories within the marketing company's 100 distribution system of the preferred embodiment (e.g., Client 40, Member 30, Members Plus 20, and IBO 10). The solid arrows in FIG. 2 represent the exemplary methods by which products and/or services may be sold in accordance with an exemplary embodiment of the present invention. The broken lines in FIG. 2 represent the relationship between the various levels within a particular IBO's 10 personally sponsored group. Each of these exemplary methods and relationships will be described in more detail below.

As noted above, a "Client" 40 is preferably a retail customer who may purchase products and/or services directly from the marketing company. Alternatively, Client 40 may purchase products and/or services from an IBO 10 or Member Plus 20 at a price established by the IBO 10 or Member Plus 20. The price established is preferably higher than the price paid by the IBO 10 ("the IBO price"), however, the price charged to Client 40 is preferably at the discretion of IBO 10 or Member Plus 20. Client 40 preferably purchases products at retail prices, wherein the retail price, which is set by IBO 10 or Member Plus 20, is preferably higher than the IBO price. Client 40 may also have exposure only to a subset of the total core product and catalog lines. Clients 40 may be personally referred by IBO 10 or Member Plus 20. Unsolicited referrals will be preferably be offered Client 40 status and assigned to the appropriate IBO 10 as will be described below. Clients 40 may be serviced either directly by IBO 10 or Members Plus 20 or alternatively may be serviced by marketing company 100 on behalf of IBO 10 or Member Plus 20, or a merchant partner.

A "Member" 30, by paying an annual fee, is preferably entitled to purchase products and/or services for their own consumption directly from the marketing company at a price equal to or greater than the price paid by Independent Business Owners (IBO's 10). Alternatively, Member 30 may purchase products and/or services from an IBO 10 or Member Plus 20. In a preferred embodiment, the price paid by Member 30 is less than the price paid by Client 40. The marketing company 100 may also offer direct marketing promotions targeted at Members 30. Member 30, however, is preferably not entitled to a performance bonus or commission, nor is Member 30 authorized to recruit or sponsor other Members 30. Moreover, Members 30 are not encouraged or authorized to resell products from the marketing company 100. Members 30, however, who refer other Members 30 will preferably receive referral incentives.

A "Member Plus" 20 is an individual who indicates an intention of becoming an IBO 10 but has not generated the requisite sales volume to end-user consumers in order to qualify. Member Plus 20 is interested in purchasing products from the marketing company 100 at IBO 10 prices, as well as in becoming an IBO 10. Member Plus 20 may also be entitled to purchase products and services for their own consumption directly from the marketing company 100 at the same prices as Members 30. Various products and services which are available to IBO's 10, but not to Members 30, may also be available to Members Plus 20. Members Plus 20 are preferably not entitled to a performance bonus or commission. In order to earn a bonus or commission, Member Plus 20 must first qualify as an IBO 10. Member Plus 20 transitions to IBO 10 by qualifying to earn bonus income. Members Plus 20 are encouraged and authorized to resell the company's products, as well as to generate new sales to direct-buying consumers such as Members 30 and Clients 40. Moreover, Members Plus 20 are authorized to recruit or sponsor other Members 30 into the organization.

In one embodiment of the present invention, upon notification of their intent to become an IBO 10, a Member 30 transitions to a Member Plus 20 by paying a fee and purchasing a Business Kit, which gives them the right to recruit and retail. The fee entitles Member Plus 20 to purchase products at IBO 10 prices. If Member Plus 20 fails to qualify as an IBO 10 within a stated period of time, for example, but not limited to, two years, Member Plus 20 shall preferably automatically revert to Member 30 status.

An Independent Business Owner (IBO 10) is an individual interested in earning income, which includes, but is not limited to, performance bonuses and commissions, from the sale of products from the marketing company. In addition, IBO 10 is also entitled to purchase products for his/her own consumption. IBO 10 may also be described as a Member Plus 20 who has received a Performance Bonus and therefore has qualified to become an IBO 10. BO 10 has the ability to recruit, retail, and receive a bonus. IBO 10 can purchase all products from the core product and catalog lines at the IBO 10 pricing level. IBO 10 can place standing and recurring orders for products in both unit and lot quantities. Moreover, IBO 10 is entitled and encouraged to resell products to end-user consumers as well as to generate direct sales by marketing company 100 to such end-user consumers, including Members 30, Members Plus 20, and Clients 10, and even to individuals who are not registered with the marketing company, such as neighbors of IBO 10. Each IBO 10 is entitled to charge any markup he or she chooses for products he or she resells at retail prices.

It is preferred that IBO 10 can earn bonus credit not only for sales to Members 30, Members Plus 20, and/or Clients 40 through IBO's 10 distribution network, but also for sales made directly by marketing company 100 to a customer that do not involve a resale by IBO 10. For example, IBO 10 may be authorized to earn bonuses from the direct sale of a particular product from marketing company 100 to the end user. Under such a system, IBO 10 earns a bonus payment from marketing company 100 based on the customer's purchases.

In order to qualify for bonuses from the direct sale of a product from the marketing company 100 to a customer who is not in the IBO's 10 direct line of sponsorship, an assignment of the customer to a particular IBO 10 must be established. In a preferred embodiment of the present invention, the customer is assigned to a particular IBO 10 based on one or more criteria, preferably to choose from a select group of IBO's 10. Such criteria can include, but is not limited to, the following: 1) The IBO is a Direct Fulfillment or Founders Direct IBO. A Direct Fulfillment IBO is one who preferably utilizes the company's direct shipment method by which products are drop-shipped directly to each Client, Member, Member Plus, or IBO, rather than being delivered exclusively through a Platinum IBO (an IBO who succeeds in sponsoring a personal group that generates a prescribed volume of business, for example, $15,000 per month, in 6 months of any fiscal year, which will be described in more detail below). A Founders Direct IBO is an IBO that has achieved a particularly consistent high level of business activity as an IBO; 2) The IBO is active, or maintains a specified level of activity; or 3) The IBO is in the geographic proximity to the Client based on postal or zip code.

In the preferred embodiment, the Client may then be given the IBO's contact information, with an option to indicate if the Client wishes the IBO to contact them. Otherwise, the entire assignment process is preferably transparent from the Client's perspective, and the particular IBO 10 only sees the volume associated with the direct sales to the Client.

In order to transition from Member Plus 20 to IBO 10, as noted above, each Member Plus 20 must qualify as an IBO 10 by earning a bonus income. To qualify to earn bonus income, each IBO 10 must preferably generate at least 50 PV of sales in a month to end-user consumers. Preferably, all products and services sold to end users are assigned two sets of numbers: Point Value (PV), which is used to determine the Performance Bonus bracket; and Business Volume (BV), which is a dollar figure established for each product which is totaled monthly to represent monthly sales. Alternately, IBO 10 can qualify by generating a specified level of sales to 10 different customers, including Members 30 and/or Clients 40. Personal consumption by IBO 10 preferably does not count towards this qualification. Each IBO 10 thus qualified is entitled to earn a performance bonus based on the IBO's 10 own purchases and the purchases of his or her personal group, plus the purchases of Members 30 introduced into the business by the IBO 10. Each IBO 10 is entitled, but not required, to sponsor other IBO's 10 and to introduce new Members 30. This is the preferred method by which IBO 10 may grow his personal group and thus his personal business. An exemplary personal group is shown in FIG. 3.

Figure 3:
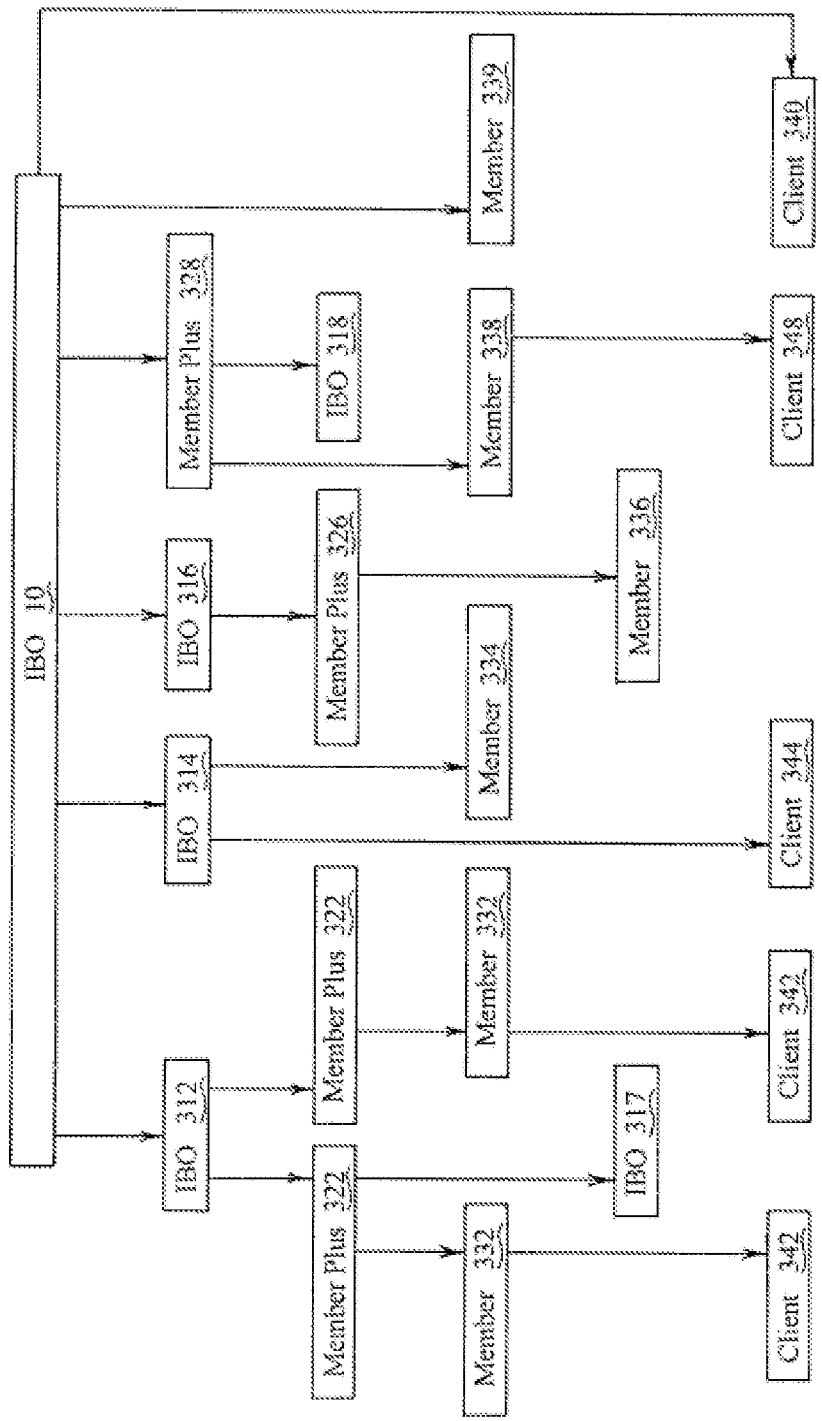
FIG. 3 shows a block diagram representing an exemplary personally sponsored group according to the present invention.

As can be seen in FIG. 3, an IBO's 10 personal group can comprise numerous subgroups which are linked to the original IBO 10 through various forms of sponsorship. One exemplary subgroup consists of the original IBO 10, a second sponsored IBO 312, Member Plus 322, Member 332, and Client 342. In an alternate subgroup, original IBO 10 sponsors Member Plus 328, who sponsors both Member 338 and second IBO 318. Likewise, Member 338 refers Client 348. Thus, it should be apparent to one of ordinary skill in the art that an IBO's 10 personal group may contain numerous subgroups, each of which can vary in the number and relationships between the different participation levels.

Moreover, a "Line of Sponsorship" or "LOS" refers to an IBO's direct heritage or "ancestry" in the marketing company business. In other words the LOS refers to an IBO's sponsor, the IBO's sponsor's sponsor, and so on. An exemplary LOS is shown in FIG. 3 with reference, for example, to IBO 10, IBO 312 and IBO 317. It can be said that the line of sponsorship is the linkage between all IBOs in a specific organization, similar to a family tree. In addition, IBO 10 may refer to IBO 312 and IBO 317 as IBO's 10 "downline." It should be apparent to one having ordinary skill in the art that such a reference would be to those IBOs sponsored by IBO 10. Likewise, IBO 317 may refer to IBO 312 and IBO 10 as IBO's 317 "upline," which would denote those IBOs who have sponsored IBO 317 into the marketing system.

In another embodiment of the present invention, when IBO 10 sponsors a new IBO 316 and begins to help IBO 316 create a group, that IBO's 316 personal group may be generally referred to as, for example, a "leg" in IBO's 10 business organization. An exemplary leg is shown in FIG. 3 (e.g., IBO 10, IBO 316, Member Plus 326, and Member 336).

In one embodiment, each of the different levels or membership types (Client, Member, Member Plus, and IBO) does not have complete access to all products and product lines. In another embodiment, only IBO's have complete access to all products and product lines. It is preferred that the particular level determines the degree of access to products and product lines. In one embodiment, the degree of access increases as the level transitions from Client to Member to Member Plus to IBO, and as the personal group of an IBO grows. In an alternative embodiment, a different product mix or group may be offered to persons based on their particular participation level through the use of, for example, but not limited to, product promotions. In an alternative embodiment, a product mix may be customized to tailor to different customers or groups of customers.

In a further embodiment of the invention, if a product or model number, or identification number, for a particular product is provided by the customer, then that customer can purchase that particular product, regardless of the customer's membership level. It should be understood that products may be presented to each of the levels through a variety of medium, including, but not limited to, written, oral, electronic, etc., such as through catalogs, product displays, cassette and video tapes, multi-media devices, and the Internet. However, it should be apparent to one having skill in the art that the present invention is not limited to any particular presentation method.

Referring now to FIGS. 4a-4f, there are shown six exemplary methods by which a new customer can become associated or registered with the marketing system of the present invention. As shown in FIG. 4a, one embodiment of the present invention allows the customer to sign up as a Member/Member Plus to immediately begin the qualification process to becoming an IBO. In such an embodiment, the customer bypasses the Client level to register as a Member. Thus, the registered customer immediately enjoys the privileges and benefits of the Member Plus as described herein.

As shown in FIG. 4b, a second embodiment of the registration process is shown. In this embodiment, the customer may register as a Member and enjoy the accompanying benefits and shopping privileges. The Member may subsequently at a point later in time choose to register as a Member Plus at which point the Member will begin the qualification process of becoming an IBO.

A third embodiment of the invention is shown in FIG. 4c. In this embodiment, a customer initially registers as a Client or retail customer serviced by an IBO. Subsequently, the Client may be prompted by another Member or the IBO to reconsider the benefits of Membership. If the Client chooses, the Client will then register as a Member/Member Plus to begin the qualification process of becoming an IBO. The Client can also subsequently at an independent stage register as a Member/Member Plus to begin the qualification process of being an IBO.

A fourth embodiment of the registration process is shown in FIG. 4d. This embodiment represents the longest route to becoming an IBO. In such an embodiment, the customer initially registers as a Client, and then subsequently, at independent stages, registers as a Member, Member Plus, and IBO respectively. It is preferred that as shown in FIGS. 4a through 4d, one must register as a Member prior to, or simultaneously with, registering to qualify as a Member Plus/IBO.

A fifth embodiment of the registration process is shown in FIG. 4e. This embodiment allows the customer to sign up as a Member to immediately begin the qualification process to becoming an IBO. In such an embodiment, the customer bypasses the Client level to register as a Member. Thus, the registered customer immediately enjoys the privileges and benefits of the Member as described herein.

A sixth embodiment of the registration process is shown in FIG. 4f. In this embodiment, a customer initially registers as a Client or retail customer serviced by an IBO. Subsequently, the Client may be prompted by another Member or the IBO to reconsider the benefits of Membership. If the Client chooses, the Client will then register as a Member. The Client can also subsequently at an independent stage register as a Member to begin the qualification process of becoming an IBO.

In the embodiments shown in FIGS. 4e and 4f, a Member is entitled to qualify as an IBO, and there is no separate transition Member Plus participation category.

Generally, it is preferred that each Member is initially sponsored into the marketing system by another IBO who can function as that Member's supplier and/or contact with the marketing company. Alternatively, the Member may purchase products directly from the marketing company at the specified Member price. The Members and Members Plus sponsored by an IBO are referred to as the IBO's "personally sponsored group" or "personal group." IBO's who both generate personal sales to Clients and/or Members and sponsor a personal group that generates a large volume of product purchases may receive a substantial income, including, for example, performance bonuses and commissions from the sales. In one embodiment of the present invention, the IBO's group volume is used to calculate the IBO's performance bonus. This group volume includes the IBO's personal volume, personal group volume, and all down-line non-direct (those IBOs not sponsored directly into the marketing company by the particular IBO in question, or in other words, IBOs sponsored by individuals within the IBO's personal group) IBOs' volume. An IBO's personal group volume preferably includes, but is not limited to, the IBO's personal volume as well as the volume generated by IBO's below the 25% bonus level in the IBO's down-line group. Personal volume can include, but is not limited to, volume from an IBO's own personal orders, PV/BV transfers and miscellaneous account adjustments. PV/BV transfers can include, but are not limited to, methods of adjusting PV/BV from one IBO to another. Transfer of such volumes assures bonus checks are paid correctly.

Under the marketing system of the present invention, IBO's earn income by generating sales of products and/or services. These sales may be made directly to end-users by the IBO or the marketing company, or may be made by Members Plus or other IBO's within the IBO's personal group. In addition, IBO's can profit from retail price increases, or "mark-up" on sales. It is preferred that IBO's are able to set their own retail prices. Moreover, an IBO can earn a monthly performance bonus based on the combined total volume of products and services moved by the IBO and his or her personal group. Alternatively, the IBO can also earn performance bonuses based upon direct sales made by the marketing company to customers who are linked to a particular IBO, which will be described in more detail below. It should be apparent to one of ordinary skill in the art, that the higher the sales volume for a particular month, the higher the percentage rate of bonus. An exemplary percentage rate of bonus is in the range of about 1% to about 25%, preferably between about 3% and about 25%, although other bonus ranges may be used. An IBO's sales volume will vary depending, in part, upon the sales volume of others in his personal group and the volume of direct sales from the marketing company to end users. If an IBO succeeds in sponsoring new IBO's who then generate large volumes of product sales, then the original IBO can earn additional bonus income.

If and when an IBO succeeds in sponsoring a personal group that generates a prescribed volume of business, for example, $15,000 per month, in 6 months of any fiscal year, that IBO may become a Platinum IBO. At this point, the Platinum IBO's sponsor no longer receives any Performance Bonus from the Platinum IBO's sales volume but may be eligible for other bonuses as described in further detail below. An IBO who sponsors IBO's can become eligible for higher bonuses and or commissions.

An exemplary bonus and commission structure is described herein below. It should be understood by one having ordinary skill in the art that numerous bonus and/or commission structures may be employed within the present invention and the following exemplary embodiments should not be construed as limiting the present invention to a particular structure.

An IBO's gross income can be based on immediate income, or a discount, from retail product sales and a Performance Bonus. As used herein, "gross income" preferably means the amount received from retail sales of products and/or services, either directly by the IBO, the marketing company, or the IBO's personal group, minus the cost of goods sold, plus the amount of Performance Bonus retained. Gross income preferably does not include deductions for business expenses which will vary according to the manner in which each individual IBO operates his or her own business.

Preferably, all products and services sold to end users are assigned two sets of numbers: Point Value (PV), which is used to determine the Performance Bonus bracket; and Business Volume (BV), which is a dollar figure established for each product which is totaled monthly to represent monthly sales.

In a preferred embodiment, every product is assigned a PV number including marketing company and merchant partner products. In an alternate embodiment, only marketing company products are assigned a PV number. An IBO's monthly PV total preferably determines the percentage used for Performance Bonus payments in accordance with a Performance Bonus Schedule.

In a preferred embodiment of the present invention, every product has an established BV number, a dollar figure which is multiplied by a percentage (for example, between 3% and 25%) to determine an IBO's monthly Performance Bonus. This percentage is determined by an IBO's PV total. All bonus payments are preferably based on a combination of PV and BV.

As noted above, the amount of Performance Bonus is preferably determined by a combination of PV and BV. In one embodiment, the PV/BV ratio is maintained in relation to the Consumer Price Index. Computing Performance Bonus on PV emphasizes units sold, not price. As inflation causes prices to increase, a larger bonus is earned from the same units sold.

In a preferred embodiment, each product sold is assigned a PV and BV. In one embodiment, PV is equal to approximately one-half of the IBO cost and BV is equal to approximately 1.15 times the IBO cost. The PV and BV values may vary from product to product. PV and BV can be earned in a variety of different ways, including, but not limited to the following: an IBO's personal purchases; the purchases of Clients, Members, and other IBO's in the IBO's personal group, including the purchases of Members introduced by the IBO; and the purchases of customers directly from the company.

The following Table 1 shows an exemplary Performance Bonus Schedule for use in the present invention.

TABLE 1

| Total Monthly Point Value | Performance Bonus |
|---|---|
| 7,500 or more | 25% of BV |
| 6,000 | 23% |

TABLE 1-continued

| Total Monthly Point Value | Performance Bonus |
|---|---|
| 4,000 | 21% |
| 2,500 | 18% |
| 1,500 | 15% |
| 1,000 | 12% |
| 600 | 9% |
| 300 | 6% |
| 100 | 3% |

Under the schedule shown in Table 1, the total Point Value of all merchandise purchased during a particular month determines the Performance Bonus percentage for that month. The greater the total monthly Point Value, the greater the Performance Bonus Percentage. In addition, an annual volume can be calculated based on an IBO's personal volume plus "pass-up" from non-qualified (less than 25%) legs. The volume for non-qualified Members Plus is preferably not included. "Pass-up," as used herein, generally refers to, for example, the PV/BV created by non-qualified IBO volume that continues to be passed up until combined volume reaches the 25% Performance Bonus level as noted above.

Having now generally described the bonus and commission structure of the present invention, the same will be more readily understood through reference to the following examples which are provided by way of illustration, and are not intended to be limiting of the present invention.

EXAMPLE 1

A particular IBO's sponsor group is made up of five Clients and five Members. As a portion of his or her income, the IBO receives the retail mark-up from purchases made by the Clients. Retail mark-up is the difference between the price normally paid for a particular product and the price actually charged to the customer. According to the present invention, IBO's are not obligated to charge a particular retail price, therefore, each IBO is entitled to independently determine the prices at which products will be sold to other IBO's, Clients, Members, Members Plus, or other customers. In addition, the IBO can receive a Performance Bonus which is calculated based upon the volume of sales made to the five Members within the IBO's personal group. The larger the sales volume, the larger the percentage of Performance Bonus the IBO can receive.

If each of the five Clients and five Members in the IBO's group purchase $50.00 worth of products in a given month, the total sales volume for the month is $500.00 ($50.00×10). If suggested retail for the products is $35.00, then the total retail mark-up for the month is $75.00 (assuming the five Clients pay a marked-up price of $50.00; i.e., total retail mark-up: 5 Clients×$15.00 retail mark-up=$75.00). The individual BV values assigned to the products purchased by the Members is $40.25BV (1.15×$35=$40.25). The individual BV values assigned to the products purchased by the Clients is $57.50BV (1.15×$50=$57.50). Thus, total BV values for all purchases is $488.75BV (5 Clients times the $57.50BV value added to 5 Members times the $40.25BV). Using Table 1 above, the Performance Bonus based upon the total sales volume for the month would be $14.66 (3% of $488.75BV). Accordingly, the IBO's monthly total income would be $89.66 ($75.00 plus $14.66). If such a performance level is maintained for 12 consecutive months, the IBO's total annual gross income would be $1,076.00.

EXAMPLE 2

The IBO of Example 1 may increase his or her income by growing the business through sponsorship of any number of others into the business. For example, if the IBO locates three individuals who become IBO's and they in turn develop 10 customers, each would contribute to the overall volume on which the original IBO's Performance Bonus is based.

In summary, assume the IBO's personally sponsored group volume generates $1,500.00 per month in total sales (3 groups of 5 Clients and 5 Members in each group purchasing a total of $500.00 worth of product per group). The IBO's direct customers are continuing to generate $500.00 in sales with a retail mark-up of $75.00 (see Example 1). Thus, the total group volume is $2,000.00 per month ($1,500.00+$500.00), resulting in a Net Performance Bonus of, for example, $131.97, calculated in a similar manner as in Example 1. Net Performance Bonus is the difference in Performance Bonus that is earned on the total sales by the total group and that earned by each of the sponsored IBO's. Therefore, the IBO's monthly income, Performance Bonus and retail mark-up, totals $206.97 ($131.97 (Performance Bonus)+$75.00 (Retail mark-up)). If this performance level is maintained by the entire group for 12 consecutive months, the IBO's annual income would be $2,483.64.

EXAMPLE 3

If each of the three personally sponsored IBO's described in Example 2, each personally sponsor two additional IBO's (resulting in sales of 6 groups×$500.00=$3,000.00) and the entire group continues to generate the same sales volume (i.e. $2,000.00), the original IBO's income will further increase as described below.

Each of the IBO's personally sponsored IBO's would continue to generate $1,500.00 in sales volume as shown above, while the IBO's direct customers are continuing to generate $500.00 in sales. In addition, the newly sponsored groups are each generating $500.00 in sales for a total of $3,000.00 (6 groups×$500.00/group=$3,000.00). Thus, the entire group would have sales totaling $5,000.00. The Net Performance Bonus based on this volume would be $337.25 (calculated in a similar manner to Example 1) which, in addition to the $75.00 retail mark-up, would result in monthly income of $412.25. Again, assuming that everyone in the group meets these performance levels for 12 consecutive months, the IBO's annual income is $4,947.00.

EXAMPLE 4

If each of two additional IBO's described in Example 3, each add one more IBO and everyone continues to generate the same sales volume, the original IBO's income will increase as described below.

Each of the IBO's personally sponsored IBO's now generates $2,500.00 in sales volume (5 groups×$500.00), while the IBO's entire group has sales totaling $8,000.00 (3 groups×$2,500.00 plus the IBO's direct sales of $500.00). The Net Performance Bonus based on this volume is $527.85 which, in addition to the $75.00 retail mark-up, results in monthly income of $602.85. Again, assuming that everyone in the group meets these performance levels for 12 consecutive months, the IBO's annual income is $7,234.00.

EXAMPLE 5

If three additional IBO's are added and each build similar organizations to those described above, then total group volume is $15,500.00 (6 groups×$2,500.00 plus the IBO's direct sales of $500.00). The Net Performance Bonus based on this volume is $1,725.29 which, in addition to the $75.00 retail mark-up, results in monthly income of $1,800.29. Again, assuming that everyone in the group meets these performance levels for 12 consecutive months, the IBO's annual income is $21,603.00.

EXAMPLE 6

If three additional IBO's are added to those described above who each sponsor two IBOs and each of those two sponsor another IBO, the total group volume is $23,000.00 (9 groups×$2,500.00 plus the IBO's direct sales of $500.00). The Net Performance Bonus based on this volume would be $2,981.38 which, in addition to the $75.00 retail mark-up, would result in monthly income of $3,056.38. Again, assuming that everyone in the group could meet these performance levels for 12 consecutive months, the IBO's annual income would be $36,676.00.

Such an organization would also qualify the IBO as a Platinum IBO if the IBO could maintain this group performance for a specified period of time, for example, but not limited to, 6 months. As a Platinum IBO, there may be additional methods by which income may be earned based upon certain qualification levels and standards.

As can be seen from the previous examples, as an IBO continues to develop his or her business, larger amounts of income may be obtained either from additional purchases by those within his or her direct sponsor group, direct sales made to end user customers, or sales made by the marketing company to the customers. Various scheduling rates could be used for apportioning such bonuses and commissions to the IBO and the present invention is not limited to any particular rate or system. In addition, the IBO may earn special bonuses or qualify for special status depending upon the size of his or her personal group and the total sales generated by that group, for example, when the IBO qualifies as a Platinum IBO.

Membership Chart

Shown in Table 2 below is a summary, including various aspects of the participation levels described above, of each audience segment or participation level, as well as the exemplary benefits that each receives.

TABLE 2

| E-Commerce Marketing Segment | Company |
|---|---|
| Client (C) | Buys product at retail price; Exposure to a subset of product lines; Limited access to "Member Benefits" part of Web Site. |
| Member | Buys product at Member (M) price; Exposure to a larger subset of core and catalog product lines; Online signup/renewal; Special targeted marketing offers; Complete access to "Member Perks"; and Frequent Buyer Program. |
| Plus (M+) | Buys product at IBO price; Online signup/renewal; Online Support Materials; Served up a complete line of core and catalog product lines; Complete access to "Member Benefits"; and Complete access to "Virtual Office"; and Frequent Buyer Program |

TABLE 2-continued

Independent Buys product at IBO price;
Business Online signup/renewal;
Owner Online Support Materials;
(IBO) Served up a complete line of
core and catalog product
lines;
Complete access to
"Member Benefits" and
Frequent Buyer Program
Complete access to "Virtual
Office"; and
Collects PV/BV.

Note:
All categories (C/M/M+/IBO) may not have complete access to all products and product lines. The category in which they operate will determine the manner with which they will be presented information. However, in a preferred embodiment of the present invention, if a particular SKU is provided, any product can be ordered regardless of the shopper membership type.

In a preferred embodiment of the present invention, each different type, model and style of product offered for sale has a unique Stock Keeping Unit ("SKU") number. Alternately, the SKU number may be referred to as an "identification number" associated with the product or service.

Software Implementation

An exemplary software suite or platform is employed in the present invention for carrying out the particular E-Commerce transactions within the marketing system and between the participation categories as described herein above and the marketing company. An exemplary software suite for carrying out the present invention preferably includes the items listed below. However, it should be readily apparent to one skilled in the art that the present invention is not limited to any particular software suite or implementation:

Windows® NT Server 4 with SP 4 applied (NTFS file structure) and containing the following exemplary software packages:

NT4 Option Pack (everything installed except Certificate Server);
Site Server v3.0, SP 1 (and SP 2 if SQL Server v7 is adopted);
Site Server Commerce Edition v3.0;
SQL Server v7.0 (or SQL Server v6.5, SP5a);
FrontPage Extensions for Microsoft Internet Information Server;
Microsoft Universal Data Access v2.1, SP1;
Disk-drive maintenance software (Executive Systems Diskeeper v4.0);
Anti-virus software (including e-mail protection);
Seagate Crystal Reports v7 (for the Web Report Service);
Microsoft Encryption 128-bit security; and
Visual Source Safe.

The development platform employed in the present invention preferably employs Windows® NT Workstation 4 with SP 4 applied (NTFS file structure). In addition, it is preferred that the following software packages be installed on the server computer:

Office 97 with SR-2;
FrontPage 98 with SP1;
Visual Studio 6 Enterprise Edition with SP 2 (install all options for SQL server development);
Microsoft Universal Data Access v2.1 (SP 1 when available);
NT Options Pack (everything installed except Microsoft Certificate Server);
Outlook 98 and/or a compatible SMTP e-mail Client;
Anti-virus software; and
Seagate Crystal Reports v7 (Report Designer Component).

The following exemplary client hardware and operating systems represent the minimum browser system requirements for accessing the E-Commerce Web site according to the present invention:

640×480 resolution;
256 colors;
Microsoft Internet Explorer 4.0 and Netscape® 4.0 or higher browsers; and
JavaScript® and Java® program execution enabled.

According to the present invention, it is preferred that a base level of browser system functionality be established to determine the impact on design and content deployment. It is preferred that the browser system employed in the present invention have a base level support of the following exemplary programs:

Microsoft Internet Explorer v4.01 SP 1;
AOL Netscape Communicator v4.5;
AOL Netscape Navigator 4.0;

Moreover, Site Server membership services preferably are used to track all persons who log onto the site. Microsoft Internet Information Server logging preferably facilitates Web-related navigation useful for analyzing the marketing company's marketing and promotional campaigns. Marketing effectiveness is also measured as a result of analyzing order trend information available from Legacy-based data.

Logical Architecture

Figure 5:
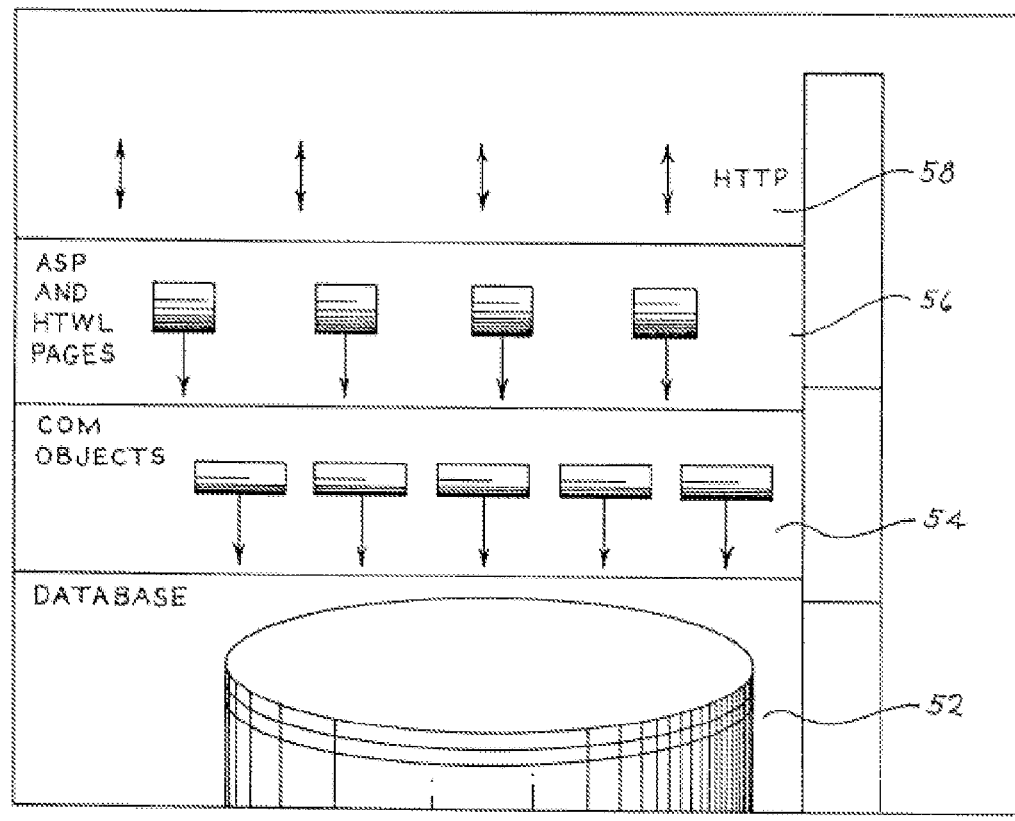
FIG. 5 shows an exemplary multi-tiered architecture system suitable for use in the present invention.

The logical architecture defines the preferred hardware and software components utilized to support the E-Commerce experience as embodied in the present invention. In a preferred embodiment of the present invention, a multi-tier system architecture is used based on logical tiers (best seen in FIG. 5).

A presentation layer 56 preferably provides the physical representation of the system to the user and is divided into two sections: the user interface (not shown) and the management interface (not shown). The user is able to browse marketing system product catalogs, manage their membership, and place orders by using the user interface of the presentation. The management tools provide groups within the E-Commerce Web Site to access the systems in a safe and structured fashion. The Active Server Pages ("ASP") and HTML pages allow the user and management interfaces to interact with the database and other programs. Moreover, Hypertext Transfer Protocol ("HTTP") 58 is the set of rules for exchanging files (for example, text, graphic images, sound, video and other multimedia files) via the user and management interfaces on the World Wide Web.

A business layer 54 is preferably a logical layer that enables the marketing system to disengage business logic and rules from the data or user interfaces. By disassociating business logic, the marketing system is better able to manage changes in the business that must be implemented at the system level. Further, business layer 54 can be used to serve multiple clients and purposes. For example, business logic residing in business layer 54 that validates an order on the E-Commerce web site could also be used to validate orders that are placed by non-web based systems. In one embodiment, business layer 54 is implemented through the use of COM objects that share information through defined interfaces. Preferably, each interface provides one or more functions that another object or a program can call, such as but not limited to, validating the orders as noted above.

A data layer 52 is preferably a logical layer where the data for the system is captured and preserved. Data layer 52 is preferably independent of the other layers and makes no assumptions about the existence of the other layers. The technology and design used to implement data layer 52 can be changed without causing the other layers to undergo a major revision (if any revision at all). Data layer 52 can be implemented by, for example, but not limited to, Legacy systems or SQL servers.

The software and hardware specified for the infrastructure configuration detailed above is the preferred underlying architecture for the entire E-Commerce network of the present invention. A combination of Microsoft BackOffice products are also preferably used to provide feature content as well as authentication of member users on the E-Commerce site. These exemplary products include the following:

Microsoft Windows NT® Server. Windows NT® is a registered trademark of Microsoft Corporation, Redmond, Wash.;
Microsoft Transaction Server;
Microsoft Site Server Commerce Edition;
Microsoft Index Server;
Microsoft Message Queue;
IBM MQ Series For NT; and
Microsoft Exchange Server The conventional Microsoft Site Server Membership Services model of authentication allows for a highly secure site with further ability to scale, audit and track users as site use flourishes. In one embodiment, the site co-exists securely with existing Legacy systems in a dual fire-walled "de-militarized zone" (DMZ) partition (best seen in FIG. 25). The E-Commerce servers are preferably logically separated from the existing mainframe environment as to minimize potential security risks and exposure to unauthorized access.

There are eight preferred components for the individual page web files or sites of the present invention (as shown in FIG. 1). These exemplary components include the following:

E-Commerce Main;
"My Home";
"My Health";
"My Self" (My Home, My Health, and My Self could alternately be referred to as "Exclusive Stores");
Member Perks;
Customer Service;
"Store for More"
"Virtual Office"; and
"Income options"

Supporting these sites requires the availability of content deployment that preferably includes the following exemplary items:

Catalog content;
Price and product content;
Language content;
Educational content;
Discussion content;
Promotional/Merchandizing content;
Customer Support content;
Marketing company business content;
Personalization content;
Independent Business Owner content; and
Merchant or Merchant Partner content E-Commerce Main Site Functionality The main area of the E-Commerce web site 102, as shown in FIG. 1, preferably provides Web shoppers with a starting point from which they can navigate through the site in a well-known manner. The navigation is provided by a plurality of web files associated with web site 102. In a preferred embodiment, the site is "served up" to shoppers differently depending on their membership or participation level. Merchandizing offers, for example, are targeted differently to each membership class (i.e., Client, Member, Member Plus, or Independent Business Owner (IBO)). The primary navigation features links to the following exemplary areas:

Income Options

There is a link to the "Income options" site, or page web file 140 which allows shoppers to find out more about IBO status and the opportunity to become an independent business associated with the marketing company. It also provides a quick and easy registration method for becoming an Independent Business Owner. This assumes there is an existing link with an IBO. In a preferred embodiment, the income options page web file comprises a multimedia presentation and information relating to the marketing system.

Go Shopping

A "Go Shopping" option can provide links to one of the stores within the marketing system (e.g., Health 1300, Home 1210, and Self 1400) or "Store for More" shopping site 2950, or any partner stores or the equivalent thereof.

Site Search

There preferably is a link to a site search page 155 from the primary navigational menu. Site search page 155 allows a user to enter common terms and/or phrases, and searches for those terms or phrases within the E-Commerce web site.

Contact Us

A customer service menu, for example, on customer service page 2300, features a link to a contact us page that features an e-mail form that allows shoppers to send in their comments about the Web site.

Member Sign-In

Existing registered Clients, Members, Members Plus, and IBOs are able to sign-in with a number assigned by the marketing company (IMC Number) and password from the primary navigation menu. When a non-referred customer (that is a customer that has not been referred to the site by a Member, Member Plus, or IBO) reaches the point in the site where they must be associated with an IBO, a leads generation module will be invoked. This process assigns the new customer to an existing IBO, if specified by the customer (the application will prompt for association to an existing IBO prior to invoking the leads generation module). If there is no existing IBO relationship, then the leads generation module will assign a customer to an IBO based on one or more criteria, preferably to choose from a select group of IBO's. As noted above, such criteria can include, but are not limited to, the following:

1) The IBO is a Direct Fulfillment, Founders Direct IBO. A Direct Fulfillment IBO is one who preferably utilizes the company's direct shipment method by which products are drop-shipped directly to the Client or Member, rather than being delivered through the IBO. A Founders Direct IBO is an IBO that has achieved a particularly high level of business activity as an IBO;

2) The IBO is active, or maintains a specified level of activity;

3) The IBO is in the geographic proximity to the client based on, for example, postal or zip code.

The customer will then be given the IBO's contact information, with an option (check box or suitable mechanism) to indicate if the customer wishes the IBO to contact them. Otherwise, the assignment is essentially transparent from the customer's perspective, and the IBO will only see volume on their monthly reports. A generic name like "web customer" or similar name is used to insulate the client information in this scenario.

Member Perks

There is preferably a link to the "Member Perks" site 1600 from the primary navigational menu. In a preferred embodiment, members are allowed to register within the member perks site 1600.

Virtual Office

There is preferably a link to the "Virtual Office" site 2100 from the primary navigational menu.

Merchant Partners

Exemplary merchant partners 1500 which may be included as a link from the E-Commerce Web site include, but are not limited to, the following:

Communications partners

Printing and publication partners

Financial Services

Customer Service

There is preferably a link to the "Customer Service" site 2300 from the primary navigational menu in addition to other areas associated with the web site. It is preferred that customer service option be available to all visitors to the web site.

"Store for More"

There is preferably a link to the "Store for More" 2950 from the primary navigational menu. The "Store for More" can comprise all marketing system products and services, or a subset thereof.

"New Business Ventures"

There is preferably a link to the "New Business Ventures" (NBV) 150 from the primary navigational menu. NBV 150 can comprise information regarding new business ventures between the marketing company and new business partners or alternatively could provide links to new business partner web sites for additional information.

"Income Options" Site Functionality

The "Income options" Web site, or income options page web file 140 preferably provides online material that describes the E-Commerce shopping opportunities to new shoppers and allows quick and easy IBO sign-up for prospects. The site serves as, for example, but not limited to, a recruiting tool for Independent Business Owners, giving them a place to send prospects for more information. In a preferred embodiment (shown in FIG. 7), the income options page web file 140 comprises interactive presentations 72 and a link to a process for signing up to qualify as an IBO 76.

The Income options page web file also preferably includes a collection of presentations and informational pages about the various marketing system opportunities. In a preferred embodiment, the presentation materials are in a multimedia format and the income options page web file includes an interactive presentation 72 that allows an individual, or prospective IBO, to view an income based on a quantity of sales of marketing system products and services sold through the marketing system. In other words, it allows a prospective Member to explore the business opportunity of becoming an IBO. In such an embodiment, the prospective Member is presented with, for example, a series of dialog boxes 81 (as shown in FIGS. 8a, 8b, and 8c) that allow the prospective member to enter the following four data items:

(1) Desired income level (81a);

(2) Number of potential customers (81b) interested in purchasing products and services;

(3) Estimated sales FIG. 81c), wherein the sales figure represents a dollar volume of sales to customer; and (4) Estimated sponsor group number (81d), wherein the sponsor group number represents a number of individuals to be sponsored by the prospective Member, or that the prospective Member could interest in becoming an IBO. It should be understood by one of skill in the art that each of dialog boxes 81a-81d could include a drop-down menu that would allow the prospective member to choose from a predetermined selection. These drop-down menus could be provided by various means which are well-known in the art.

Each of these four data items can be iterated by the prospective Member to evaluate various combinations. Subsequent screens presented to the prospective Member explain how a selected income level can be achieved based upon the number of customers, sales level to the customers, and sponsoring of other IBO's that in turn have customers and sponsor yet other IBO's. An exemplary screen is shown in FIG. 8b. In this manner, a prospective Member can see how the combination of data items 2-4 result in income (data item 1).

An exemplary iterative method based on the information provided by the prospective member is described below. It should be understood by one of ordinary skill in the art that such an iterative method comprises a large part of a sales and marketing plan (described in further detail below) which can be presented to users through use of the present invention. To begin, the number of potential customers 81b is multiplied by the estimated sales FIG. 81c to obtain a total sales figure. The number of customers 81b would also be multiplied by a retail price of the product or service to obtain a total retail price. The total retail price is subtracted from the total sales figure to obtain a total discount sales income. Next a total point value (PV) and total business volume (BV) are calculated based on the total sales figure. A performance bonus income is then calculated based on a combination of the total point value and the total business volume. The performance bonus income is next added to the total discount sales income to obtain a total income. This total income is finally presented to the prospective Member. The calculation shown in FIG. 8b is the same as that described above in Example 1.

These steps can then be repeated using the sponsor group information provided by the prospective Member to calculate total sponsor group bonus income which, when added to the total discount sales income noted above, would give the prospective Member a total sponsor group income. This total sponsor group income can then be recalculated based on a revised sponsor group number which would represent how the prospective Member's business would grow by adding more registered users to his or her own personal group. An exemplary screen presented to the user following the iterative process described above is shown in FIG. 8c. An example of how the data shown in FIG. 8c is calculated is shown above in Example 2.

As noted above, the income options page web file may also offer a link to a multimedia overview that provides further description of these opportunities and the marketing company's plan. Exemplary plans could include, but are not limited to, the Sales and Marketing Plan, or any other marketing company plan information.

In one embodiment of the present invention, the Sales and Marketing Plan is a marketing method by which an IBO builds an independent business. The Sales and Marketing Plan is unique and based on two fundamental concepts: selling, and sponsoring others who sell. In a preferred embodiment, the Sales and Marketing Plan of the present invention combines a marketing business with a membership buying opportunity. This is accomplished using either or both electronic commerce and face-to-face transactions. It should be understood that the present invention is not limited to any particular sales and marketing plan, or any particular method by which an IBO builds an independent business.

The primary navigation features within the income options page may also preferably provide links to additional exemplary areas, including the following:

Goals

The purpose of the Goals area 74 is to provide prospects with several reasons why they should become an Independent Business Owner. This section explains how to get started creating an E-Commerce business.

Electronic Retailing

Electronic Retailing is the selling of retail goods on the Internet. The Electronic Retailing section 78 provides facts, statistics and demographics of Electronic Retailing on the Internet in an effort to encourage prospects to sign up to become an Independent Business Owner.

Rewards

The rewards section 73 provides information about online marketing and promotions offered to members in an effort to encourage prospects to sign up to become an Independent Business Owner.

Resources

To encourage prospects to start their own Electronic Retailing business, the resource area 75 provides information about all of the online resources available to Independent Business Owners for managing a business. These resources include, but are not limited to, access to the Virtual Office, up-to-the-minute news and information about a business network, marketing tips, and business partnerships that are available.

Keep Me Posted

The "Keep Me Posted" area 77 is a form that shoppers can fill out to be notified of new products and business opportunities available from the E-Commerce site.

In an alternative embodiment of the present invention, shoppers can complete a quick and easy registration form to become a member or an Independent Business Owner within the Income options page. Clients and Members are preferably assigned a Marketing Company (IMC) number, either through an association with an existing Member Plus or Independent Business Owner, or through integration with the Leads Generation module. The IMC number establishes a profile and at the same time associates them with a Member Plus or IBO.

In a preferred embodiment, basic content available within the income options page web file does not change based on the user's registration or participation level. However, one's participation level (i.e., Client, Member, Member Plus, IBO) can affect access to some resources, for example, but not limited to, the interactive presentations. Each of the participation levels are discussed herein below with respect to its capabilities within the income options page web file.

A non-registered user who has found the income options page web file, independently or through referral from a Client, Member, Member Plus, or IBO, but has not yet initiated a transaction (e.g., become a registered Client) or become a Member may be curious about becoming an IBO, or may just be curious about how the business works. He or she preferably enters from the main web site page, or from the navigational bar on any E-commerce web page, to an opening page for the Income options area. The unknown prospect is preferably free to go to anywhere within the Income options area. Links to all areas are preferably visible.

If, upon perusing the site, the unknown prospect wants to become a member, the prospect may go to Sign-up 76, where the prospect may sign up as a Member or IBO. If the prospect does not indicate an IBO sponsor, then the Leads Generation module will assign the prospect to an IBO as described herein. However, the unknown prospect may also desire to know more about the business opportunity, and decide to view an online description of the Sales and Marketing Plan. Upon clicking on the appropriate link, the prospect is presented with a logon screen. If the prospect has been referred by an IBO, the prospect simply types in the required information, for example, but not limited to, an IBO number and access code, and is redirected to a multimedia presentation and other supporting materials. This form will then pass through the Leads generation program or module. The leads generation program will respond with contact information to an IBO who can explain the Sales and Marketing Plan, or enable the prospect to view the Sales and Marketing Plan online.

A registered Client preferably has the same use options and patterns, which are not that different from that of the unknown prospect. The Client may have come to the Income options area from curiosity, or may have been referred to this section by a sponsoring IBO. The Client's experience with the Income options module will differ from that of the unknown prospect in that the Client is an authenticated user with an existing profile. If the registered Client wants to become a Member, Member Plus, or IBO, the sign-up function will lead them through a process to enable them to view the Sales and Marketing Plan online and sign up as either a Member, Member Plus, or IBO as applicable, through their existing sponsoring IBO.

A Member preferably has the same use options and patterns as a Client. The Member may have come to the Income options area from curiosity, or may have been referred to this section by their sponsoring IBO. The goal of the Income options page web file is different, however, with the Member. The goal is to entice the existing Member, who is already familiar with the marketing system, into the business opportunity. If the Member wants to become an IBO, the sign-up function will lead them through an appropriate process.

An IBO comes to the Income options module as an authenticated user. The IBO is preferably able to access any material within the page web file, and is able to view the online Sales and Marketing Plan without having to authenticate again. The IBO is allowed to use an additional piece of functionality: an on-line form that allows the IBO to add or change access codes to be given to prospects or existing Clients and Members for access to the online Sales and Marketing Plan. The link to this function is preferably not shown to users who are not IBOs.

General Shopping Functional Specifications

The General Shopping section preferably provides the user interaction associated with all of the E-Commerce features.

Once a WWW shopper has entered the marketing company E-Commerce site 102, they are able to shop in a convenient and efficient manner provided by one or more shopping page web files associated with the web site. In one embodiment, the system initially checks to determine if the shopper has ever been to the site before. This check is performed by the system, through the use of, for example, identifying "cookies" left on the shopper's personal computer from the most previous shopping session. If it is determined that the shopper has been to the site before, the shopper is prompted to confirm their identity. The system then recalls any existing site personalization and proceeds with membership authentication, as described in more detail below. Greetings from the server computer using the user's stored last and first names may also be presented to the user following log in and authentication procedures. In an alternate embodiment, the user simply enters his or her user name and password and the system checks the information for authentication of the user.

In a preferred embodiment, membership authentication and personalization information is stored in a central repository on the server computer. This information is passed from the server computer to an associated membership server computer via a Secure Socket Layer (SSL) connection by any method known to those having skill in the art.

If the WWW shopper has been authenticated, the system then automatically determines the shopper's membership type and personalization, for example, a Client, Member, or IBO. In a preferred embodiment, this profile determines how the site is rendered to the registered shopper, including what product, price, services and merchandizing the shopper sees. For new unregistered shoppers, the navigational menu provides registration and membership opportunities.

New user registration or authentication may also occur at other areas within the E-Commerce web site of the present invention. Exemplary areas in which registration or authentication may occur are when an unregistered user (i.e., "Surfer") attempts to link to a merchant partner, attempts to enter the member perks page web file, attempts to enter the Virtual Office web page, or attempts to redeem a digital coupon. When a user reaches a URL for which they do not have access, a typical web server's default behavior is to display a generic error page. In order to provide a seamless experience, however, the present invention replaces the default error page with a customized authentication redirector ("AR") page.

Figure 6:
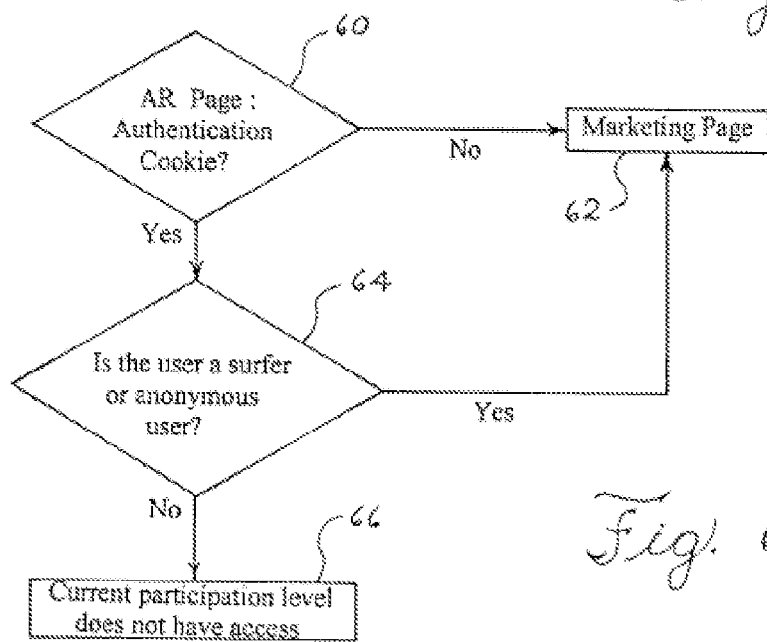
FIG. 6 shows a flow chart depicting exemplary steps for administering authentication.

Referring now to FIG. 6, a flow chart depicts the functionality of the authentication redirector page. At the AR page in step 60, if a user does not have an authentication identifier, such as an authentication cookie, the AR page will redirect the user to a marketing page 62 web file associated with the web site. Marketing page 62 web file describes the benefits of different levels of membership, etc. If in step 60, the user has an authentication cookie, then in step 64 it is determined if the cookie identifies the user as a surfer, or anonymous user. If the user's cookie identifies the user as a surfer or anonymous user, then the page will again redirect the user to marketing page 62. If the user has a cookie but is not a surfer or anonymous user, e.g., the user is a registered customer, then the AR page will determine a participation level of the user (i.e., Client, Member, Member Plus, or IBO, for example). If the participation level of the user meets a predetermined access level for a given web page file which the user wishes to access (e.g., access is given to IBOs and Members Plus, but not Members or Client), then the user is granted access to the web page file. If the user's participation level does not meet the predetermined access level (e.g., a user who is a Client in the above-noted example) then the authentication redirector directs the user to a web page file 66 explaining that the user's current membership level does not have access to the resources or web page file requested. Preferably, page 66 also includes marketing information to encourage the user to upgrade to a higher membership level. It should be apparent to one having ordinary skill in the art that the above-described authentication redirector functionality is different than merely a registered user improperly entering his or her username or password, wherein the user is redirected back to the user sign-in page, as is known in the art. The authentication redirector functionality of the present invention navigates the user through the site based upon the user's participation level and access rights. If the user is denied access, the AR functionality of the present invention allows the user to change their participation level and access rights by presenting an appropriate web page to the user. This functionality provides a user-friendly improvement over conventional systems that display an "error" page web file to a user when access is denied.

In general, WWW shoppers are able to browse through the product hierarchy and/or search for items using the E-Commerce product search component. As part of the main navigation, a general E-Commerce search icon is available on all E-Commerce screens. Shoppers are able to type in the SKU or identification number, or product names across all products available. The feature will search for SKUs or product names across all web stores presented to the user. Each match will be displayed on a single line that preferably contains the product long name, price and a link to the full product page. An appropriate message will be displayed if no items are found. In a further embodiment of the present invention, this search feature is extended to include non-commerce-related items. In yet a further embodiment, custom queries on the database are generated to determine aspects such as common customer searches.

WWW shoppers are also preferably able to search and add to their shopping cart specific product SKUs, or identification numbers. This search feature takes the consumer to the associated product page. Here, the consumer finds, for example, a product picture, description, educational and use content, as well as price. An icon in the general navigational menu also allows them to add the item to their standing order (based on membership type). From the main product page, users can click to other main product pages for products in the same category.

Shown in FIG. 9, a product list 90 is used for product browsing and shopping. Product list 90 is preferably built and maintained at the server computer. A preferred product list 90 includes, for example, but is not limited to, a product name 90a and price 90b, and PV 90c and BV 90d for each product. In a preferred embodiment, only IBOs will see PV 90c and BV 90d for each product. Clients preferably see an additional piece of information called Member cost 90e. Member cost 90e is used to entice the Client to become a registered Member. Member cost 90e is typically less than a retail price paid by the Client (Member Cost 90e less than Your Cost 90b). As shown, a product image link 90f is also provided. Product image link 90f preferably provides a link to a product image and detail page (not shown) which preferably includes a picture and details about the specific product. A link, "View Next 25 Products" 90g, is also provided which allows the user to view the next 25 items appearing in product list 90 via the user's browser.

Again referring to FIG. 9, in order to select a product for purchase, a user fills in a quantity 92 on product list 90. Upon selecting the quantities for purchase for a plurality of products, the user can then initiate the Add to Basket link 94, by double clicking a mouse, for example, to add the selected products to a shopping basket.

An exemplary shopping basket display page 110 is shown in FIG. 10. As can be seen in FIG. 10, shopping basket display page 110 includes information about particular products and services selected for purchase including, but not limited to, quantity 110a, SKU 110b, product name 110c, PV 110d, BV 10e, Member cost 110f, Your cost 10g, and total price 110h. Preferably, Member cost 110f is only available to Clients from shopping basket page 110. In addition, it is preferable that only IBOs be able to view PV 110d and BV 110e from shopping basket page 110. In order to update a desired quantity 110a, the user must enter a new quantity in one of the quantity fields and click the "Update Basket" button 111.

Shopping basket page 110 preferably includes additional links to "Return" 113, "Continue Checkout" 115, and "Standing Order" 116. By choosing Return 113, the user is returned to the preceding page from which the user chose to view shopping basket page 110. Exemplary preceding pages could include but is not limited to, for example, a product image and detail page or the product list page of FIG. 9. By choosing Continue Checkout 115, the user is presented with Shipping info (see below). If the user has not authenticated at the time of choosing Continue Checkout 115, then the user is forwarded to a login/create new user page (not shown).

By choosing Standing Order 116, the user is forwarded to a screen that allows the user to create a new standing order profile. Typically, a standing order profile allows a user to set up an automated order system that sends products and/or services to the user at regular intervals, which are selected by the user. Such standing orders provide an efficient method for establishing long-term orders of products and/or services from the marketing system. All items in shopping basket page 110 are placed in the new profile. User then has the option of removing items from the newly created profile.

In a preferred embodiment, a billing/shipping page (not shown) is presented to the user upon the user's selection of Continue Checkout 115 from shopping basket page 110 as described above. Shipping page preferably includes an area allowing the user to enter shipping and address information. As noted above, users must be authenticated to view this page. In the preferred embodiment, the billing/shipping page includes all profile information "pre-populated" into the appropriate fields of the page. If necessary, the user may overwrite this information. Additionally, users have the option of having the shipping information the same as, or different from, their profile information stored at the server computer. Like shopping basket page 110, the shipping page includes links similar to Return 113 and Continue Checkout 115 as described above. In addition, conventional information fields can be made available for weight-based shipping.

Figure 11:
FIG. 11 shows an exemplary order preview page.

Once a user proceeds to checkout, the registered user is forwarded to an order preview page. An exemplary order preview page 1100 is shown in FIG. 11. As can be seen in FIG. 11, order preview page 1100 includes information about particular products and services purchased including, but not limited to, quantity 1100*a*, SKU 1100*b*, product name 1100*c*, Stock Status 1100*d*, PV 1100*e*, BV 1100*f*, Your cost 1100*g*, and total price 1100*h*. Stock Status 1100*d* presents information relating to the availability of the products and services purchased. Such information can include, but is not limited to, whether the product is "in stock" or on back order. The purpose of order preview page 1100 is to show the total of the order 1102 with shipping and tax and to allow the input of the various payment method and related information 1104. As shown, the user may proceed with the order, if all information is correct, by selecting the "Purchase" button 1106.

Upon selection of the purchase button 1106, a confirmation page (not shown) is then displayed which includes a "Thank You" for the order and an order identification number. The confirmation page also reminds the customer that a confirmation electronic notification (e.g. email) with order confirmation/invoice number will be sent.

The present invention also provides the ability for those who order online to complete their order and call an 800 number to provide their credit card information in a well-known manner.

The present invention also provides the ability to provide automatic shipments. Automatic shipments are preferably used to instruct the marketing company to automatically ship product to make up a lack of volume (up to a specific percent) for certain qualifications. If the marketing company determines the IBO, for example, has missed the specified qualification as well as incentive program qualifications if applicable, an order is prepared from a list of predetermined product, shipped and billed by electronic bank draft or credit card.

The E-Commerce shopping page web files of the present invention preferably also include help pages to assist users unfamiliar with the online shopping process. In addition, all order-related pages provide customer service contact information as will be discussed in more detail below.

As noted above, authentication is preferably necessary to place an order, in addition to such information as name, bill to, ship to, payment, or other similar information. There is registration information that is required regardless of the particular membership type. This information includes, but is not limited to, the following:

Personal information;
E-Mail;
Password;
Password hint;
Assignment of IMC number (done transparently for the Client); and
Assignment of PIN (Personal Identification Number) (done only for Members and IBOs).

There are also a variety of optional registration features for each membership type, exemplary of these types of features include the following:

Personal Preferences;
Business Preferences;
Shopping Profiles; and
Download and print documents.

The E-Commerce site of the present invention is available to any WWW shopper (general Web Surfer, Client, Member, Member Plus, or IBO). As noted above, the user's membership type preferably determines the level of access to products and services that will appear during the shopping experience. The particular shopper is able to access the site using any of the following exemplary methods:

Via the main E-Commerce page. The standard navigation throughout the entire E-Commerce site provides links to all web shopping sites presented to the user;

Unique URL for each shopping site. Each web shopping site has a unique URL which a user can type directly from a browser window to access the site;

IBO links. IBO sites provide links to specific shopping sites or product pages for their Members. An IBO may provide an individual web page for his or her own business or group that allows the members of the IBO's group to access the web site. The site preferably provides information and other services to the members.

Preferably, this site is distinct from site 102;

Electronic or digital coupon e-mail links. Electronic or digital coupons are delivered to WWW Shoppers as an e-mail message. These coupons can also have links to product pages or special deals.

As noted above, the site preferably appears differently based on the particular user's type (i.e., Web Surfer, Client, Member, Member Plus, Independent Business Owner). The site first checks for a cookie, as described above, when a user enters to determine if they are a registered user. If the user has visited the site before, the system will automatically pull up their profile.

If the system cannot determine if the user has been to the site before, then the user will be able to register either as an existing or new user from the general navigation bar. Registration is optional until checkout; at which time, the system forces the user to register as an existing or new user. Users who have forgotten their password are able to request forgotten password hint information from a help page. The online registration process can be integrated to an existing marketing company computer system for assignment of IBO numbers and integration to an Automated Lead Generation Program module. Mainframe transactions are interfaced to obtain IMC number.

With regard to new user registration, the present invention requires a minimum amount of information to be provided. Exemplary information includes, but is not limited to, a valid e-mail address, user specified password, home address and phone number. Upon registration of new users, an IMC number and/or IBO number is assigned to the new user.

Existing users who have already registered on the site, but are not automatically known by the system, are able to register by entering their username and password. Incorrect passwords or forgotten usernames will direct users to a help/password hint HTML page which will prompt the user to enter his or her last name and email address. The e-mail address must be valid. When this information is looked up and verified in the member database, the user's password hint is displayed and a form field is displayed for the user to enter his or her password hint answer. Once this form is submitted, the password hint answer is compared. If it matches, the user id and password are displayed on the user's browser system screen. Alternatively, this information is sent to the user via an email message. If it is not correct, the user has the option of calling customer support. The data is preferably passed over a secure connection, such as secure sockets layer (SSL).

Once a user has registered, they may administer their own registration information. This includes changing a password and other registration information. Access to this registration information is through the "Member Benefits" section.

Registered users are transparently assigned a profile that holds contact information such as address, phone and e-mail address. Users are asked for additional information in each main store to build on their perpetual profile. Profiles contain any information filled out on-line or through specific questionnaires and purchasing habits. Member profiles also determine how the site appears to the user, what products can be purchased, product prices, special deals, purchasing incentives, etc. In addition, real time click-stream information is collected and maintained, such as, but not limited to, purchase histories and page web files visited.

In this regard, shoppers are presented with an incentive to personalize the site. When a registered shopper comes to the site, they can change the default personalization/profile features such as e-mail reminders. To help the shopper understand how profile/personalization works and how it will benefit them, there is a link to a profiling assistant. Each registered user has a profile for the primary member. The primary member has the option of setting up and administering additional profiles (i.e., for family members). Once a user has registered, they are also able to modify their profile information. It is preferred that the profile information is passed back to the host system or server computer for retention, however, other well known retention systems may also be employed.

Core Shopping Functions Common to all Shopping Stores

As noted above, as part of personalizing the site, a personal greeting is generated from the information in the member profile. The personal greeting welcomes new users to the site once they have registered and also welcomes previous users back to the site. The personal greeting also can point out new products or special offers.

From the main product pages, users can browse other main product pages in the same category. The main product page contains an image of the item, a two or three paragraph description of the product, retail and member pricing, and an optional link to a complete product page description that includes usage and educational content. Typically, consumers navigate to the main product page through the product hierarchy or the product search.

Various product pages have a link to a more descriptive product page. This page may contain multiple images as well as more detailed product text. In some instances, this link may reference the MSDS (Material Safety Data Sheets) sheets and other product information sheets in the Virtual Office download area.

Shoppers are able to select products for purchase by placing them in their electronic shopping cart in a similar fashion to retail shopping carts. However, in contrast to conventional retail shopping carts, a shopper can add items to a single shopping cart from multiple stores within the E-Commerce site. A single shopping cart and single checkout can be used for purchasing items from the marketing company stores and from the merchant partner sites. It should be apparent to one having ordinary skill in the art, however, that any number of shopping carts can be used in the present invention, but a single shopping cart is preferred.

A product may be added to the shopping cart by selecting a button from the main product page. Consumers may add, modify and delete items in their shopping cart. As part of the selection, the consumer is able to specify an item quantity or place the item on a standing order. When viewing the shopping cart, the consumer is able to see the long name, price, and quantity of the particular product. Clicking the long name preferably provides a link to the product page. In one embodiment of the present invention, the shopping cart comprises a list of marketing system products and services selected for purchase by a Client, Member, Member Plus, and IBO via a shopping page web file. Preferably, the list is maintained at the server computer and is updated each time a new product or service is selected for purchase by the Client, Member, Member Plus, and IBO.

WWW shoppers are alerted in the shopping cart, preferably after checkout, when a particular item can be placed on standing order. This feature is dependent upon the particular membership type. Shoppers have the option to put an item on standing order from the shopping cart.

According to the present invention, there is a "persistent" shopping cart for the web shopping stores (shopping page web files allowing registered users to purchase products and services from the marketing company, i.e., Home, Health, and Self) as well as the "Store for More" store. In a preferred embodiment, there is a persistent shopping cart for the web stores and the merchant partners. This means that a shopper can add items to a single shopping cart from multiple stores within the marketing company E-Commerce site. Products from both the web stores and the "Store for More" store are then processed and fulfilled via one order. This adds to the overall efficiency of the present invention and provides a user friendly environment for the web shopper. The persistent shopping cart also transverses the sites of other sellers participating in the E-commerce facility, so a shopper can buy multiple product lines from multiple suppliers in a single virtual shopping transaction.

As marketing system products and services are selected for purchase by the registered Client, Member, Member Plus, and IBO, a list is accumulated and maintained at the server computer. An exemplary list includes information included on shopping basket page 110 shown in FIG. 10. As each subsequent request for a marketing system product and service is received at the server computer, the product or service is added to the list to create an updated list of marketing system products and services selected for purchase. As such, as the user adds products or services to the shopping basket, the server computer maintains an updated list so that all products may be purchased from multiple sources in a single virtual shopping transaction.

It is envisioned by the present invention that there may be times when the consumer adds items to a basket and then leaves the site before checking out. In such cases, the present invention can purge or "clean out" orphaned shopping carts or preserve the contents of the shopping cart and contact or email the particular shopper to inquire whether they wish to complete the purchase.

Accordingly, in a preferred embodiment, a session is established when a registered user accesses the E-Commerce web site. Likewise, the session is terminated when each registered user terminates access to the E-Commerce web site. At the server computer, the updated list of marketing system products and services selected for purchase via the plurality of shopping page web files is maintained for a holding period that begins when the registered user terminates the session with the E-Commerce site without purchasing the contents of the shopping basket (i.e., the user "abandons" the cart). In the preferred embodiment, the list is maintained at the server computer for a holding period of at least 30 days. It should be apparent to one of ordinary skill in the art that the holding period can be less than or greater than 30 days depending upon the particulars of the marketing system and the economics of maintaining "orphaned" carts.

According to the preferred embodiment, a dormant period is tracked, preferably by the server computer. The dormant period preferably begins when the registered user terminates the session. If no marketing system products and services are added to the updated list during the dormant period, then an electronic notification, for example, an email, is sent to the registered user at the expiration of the dormant period. It is preferred that the electronic notification includes a message to the user that the marketing system products and services in the updated list (i.e., the shopping basket) will be deleted following a deletion period if no additional products and services are added to the updated list or a purchase is not made by the user. The deletion period preferably begins at the expiration of the dormant period. In the preferred embodiment, the dormant period and the deletion period are each at least 15 days. It should be apparent to one of ordinary skill in the art that the dormant period and the deletion period can each be less than or greater than 15 days depending upon the particulars of the marketing system and the economics of maintaining "orphaned" carts.

In a preferred embodiment, if a registered user at some point during the dormant period adds any number of marketing system products and services to the updated list, then the dormant period is preferably reset, for example, to zero or zero days to the beginning of the period, at the end of the user's session. This reset dormant period can be referred to as a second dormant period. The second dormant period can have the same or different duration that the original or first dormant period. Again, if no marketing system products and services are added to the updated list during the second dormant period, then an electronic notification is sent to the registered user at the expiration of the second dormant period. As described above, the electronic notification includes a message notifying the user that the marketing system products and services in the updated list will be deleted following a deletion period if no additional products and services are added to the updated list or a purchase is not made by the user. If a user does add a product to the list during the deletion period, then preferably both the dormant period and the deletion periods are reset. Alternately, only the deletion period is reset.

In a preferred embodiment, the dormant period can be reset, for example, three times before the cart is emptied and the periods canceled. It should be apparent to one skilled in the art that the dormant period could be reset any number of times.

Moreover, if the user, at any time during the dormant period or the deletion period, chooses to purchase the items in the list, then, in a preferred embodiment, both the dormant and deletion periods pertaining to the particular "orphaned" cart are stopped or canceled. It should be apparent to one having ordinary skill in the art that various adjustments can be made to the holding, deletion, and dormant periods to accommodate numerous variations of time periods depending, again, upon the particulars of the marketing system and the economics of maintaining "orphaned" carts.

As part of the main navigation of the present invention, a general E-Commerce search icon is available on all shopping page web files associated with the E-Commerce web site. The search feature allows shoppers to type in the particular SKU number of a product or the product name for all products available. Alternatively, users can enter free form text into an HTML form. The feature will search the SKU, product name, and a keyword column across all shopping page web files associated with the E-Commerce web site. The search is preferably designed to use SQL-like syntax so that exact, as well as similar, matches can be made. The keyword column is preferably a variable character field that contains comma-separated keywords. These keywords are setup at the same time a product is setup on the server computer.

The search is preferably accessible anywhere in the E-Commerce site. In a preferred embodiment, users can restrict the search scope to cover a current category (for example, "category pages" 1200a-1200g shown in FIG. 12b) and products in all sub categories, which include products under category pages 1200a-1200g. It is also preferred that the search includes products sold by the marketing company that are not featured on generally accessible product pages. Another feature of the search system is that users may enter a particular shopping site, search for a particular product, and place an order without having to navigate throughout the entire site.

If a Client or Member searches for a specific SKU or product name, the search will display the product matches. In one embodiment, each match is displayed on a single line that contains the product long name, price, and a link to the full product page. An appropriate message is displayed if no items are found. The marketing company may generate custom queries on this database to determine aspects such as common customer searches. Users can enter a shopping site, search for a product and place an order without navigating through the site.

Merchandizing Functions Common to all Shopping Stores

There are several exemplary merchandising initiatives or functions common to all shopping stores. These include, but are not limited to, electronic gift certificates, online coupons, deals of the week, special promotions, cross selling and up selling. There are also several preferred marketing and promotional functions for the E-Commerce sites of the present invention. These are described in more detail below.

In one embodiment of the present invention, cross selling and up selling are used to increase sales revenue and to aid shoppers with purchasing decisions. An up sell will offer the shopper a product with more features at a slightly higher price. A cross sell will offer the shopper a related item when a user adds something to the shopping cart and will be shown on the SKU (Stock Keeping Unit) page. For example, on a laundry detergent purchase, an up sell would offer an enhanced version of the detergent, whereas a cross sell would offer a list of complementary products, such as softener and bleach to add to the shopping cart.

In one embodiment of the present invention, electronic or digital gift certificates are used to allow shoppers to purchase and send certificates electronically. Preferably, certificates are available in several dollar amounts.

Some exemplary products of the present invention may offer a competitive matrix of product information to aid shoppers with purchasing decisions. The preferred bridal and gift registry area allows shoppers to reserve items from any of the shopping areas as well as catalog items. The "What's New" feature shows and describes new core-line products.

In addition, a personal profile input form may be included within each of the shopping page web files associated with the E-Commerce web site. This form can be a questionnaire or other suitable form that a shopper completes and submits that provides information about their lifestyle, shopping, or product preferences. The system reviews the form and provides product recommendations to the customer throughout the individual shopping page web files, including, for example, the "My Home," "My Self," and "My Health" pages, which will be described in more detail below.

The information is preferably collected using a dynamically generated questionnaire. The responses are subsequently associated with a person's profile. Questions may be shared between different questionnaires, such that an answer to a questionnaire in one location can be used in any other questionnaires that share the same or similar question. The result of completing a questionnaire is a list of recommended products generated on a report, which displays a photo, description, pricing, and option to add any of the products to the shopping cart in the manner described above.

In addition, as a subset of personalizing the site, shoppers can be provided with an e-mail notification with a digital coupon. The email contains an explanation of the coupon and a link that brings the user to the E-Commerce web site. It can also automatically add the item to the shopping basket and apply the coupon against the shopping basket. In an alternative embodiment, the user is able to add a SKU or product identifier to the basket and enter the coupon manually to redeem the coupon. The coupon is thus validated in the basket. Each coupon has an associated identifier. The identifier is related to an IMC number to ensure authenticity and uniqueness. When an IBO, Member, Member Plus, or Client redeems the coupon, the redemption date is filled in. If the redemption date is already filled in, then the coupon is invalid.

Each shopping site also provides product "deals of the week" and other special promotions. These promotions are customized according to a user profile. The ability to show or not show specials to all non-direct fulfillment IBOs, Members, and Clients is also provided.

Preferably, products are grouped together into product clusters. These clusters are then offered as a set, possibly at a discounted price. When orders for these clusters are viewed by the shoppers, the individual SKU numbers will be exploded for customer viewing (i.e., a gift set that contains three items).

As part of the site personalization feature, a shopper can request to receive e-mail notifications of product specials. This request can be turned on or off from a link in the navigation menu, or with instructions sent with every e-mail notification.

Each shopping store also provides a Help and/or Ask the Expert area where a user can receive, for example, but not limited to, expert advice, virtual interactive consultation, how-to text-based or interactive demonstrations, referral service, and up-to-the-minute information. Multimedia demonstrations using animated GIF images may also be offered within the store using streaming video or other suitable graphical systems.

Shopping Functions Specific to "My Home"

Figure 12A:
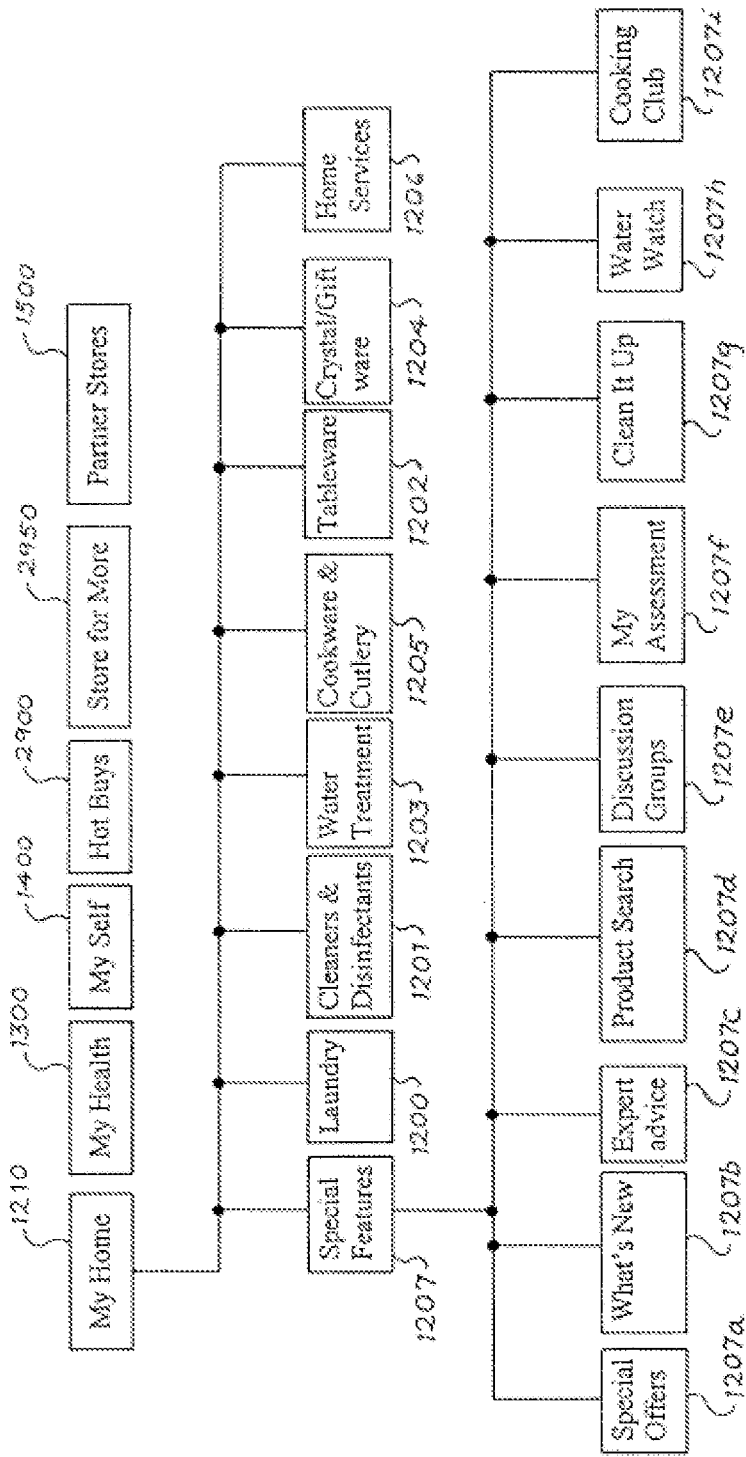

In one embodiment of the present invention, the marketing company may offer an extensive selection of one type of product via a shopping page web file. For example, the marketing company may offer an extensive selection of home cleaning products in the E-Commerce site of the present invention to the Web consumer. As shown in FIG. 12a, exemplary products offered by the present invention, include but are not limited to, the products described below for laundry 1200, cleaners and disinfectants 1201, water-treatment 1203, cookware and cutlery 1205, tableware 1202, crystal/giftware 1204, and home services 1206 as shown in FIG. 12a. Each of these exemplary products and an exemplary layout of the My Home store can be seen with reference to FIGS. 12a-12h. In addition, the site may provide numerous links to merchant partner sites 1500, providing other products and services.

As shown in FIG. 12a, the My Home site 1210, in addition to the product areas described above and described further in detail below, the site preferably includes a link to a special features area 1207 which preferably includes links to special offers 1207a, a what's new section 1207b, expert advice 1207c, product search 1207d, discussion groups 1207e, a my assessment area 1207f, clean it up 1207g, which can provide cleaning tips, water watch 1207h, which can provide further links to government web sites, such as the EPA, and cooking club 1207i.

Exemplary laundry products are shown in FIG. 12b and include core-line home products such as concentrated detergent 1200a, stain treatments 1200b, bleaches 1200c, fabric softeners & finishes 1200d, water softeners 1200e, fabric protector 1200f, and combination packs 1200g. Exemplary merchandizing initiatives that are common to the Laundry Product area include, but are not limited to, the following:

Stain Remedies for Laundry/Home—This interactive page asks the shopper the stain type and fabric type and displays the most suitable product for removing the stain.

Stain Stories (Moderated Bulletin Board)—This is an area where the shopper can enter (e-mail) a story about a stain challenge and the solution using products from the marketing company. This information is handled in the form of a moderated bulletin board where input will be reviewed prior to posting on the site.

Laundry 101—This feature provides information on the lost art of laundry care—"what your mother never told you." The feature also provides instructions on how to do laundry, how to read clothing laundry instruction labels, and other laundry issues.

Personal Laundry Prescription—This is a user-specific survey that will assess the shopper's laundry style and provide a product recommendation based on input received. Typically, users provide profile information and, based on answers provided to questions, the survey displays a unique recommendation to the particular user.

Time Saving Tips—This is a list of laundry-related time saving tips.

Figure 12C:
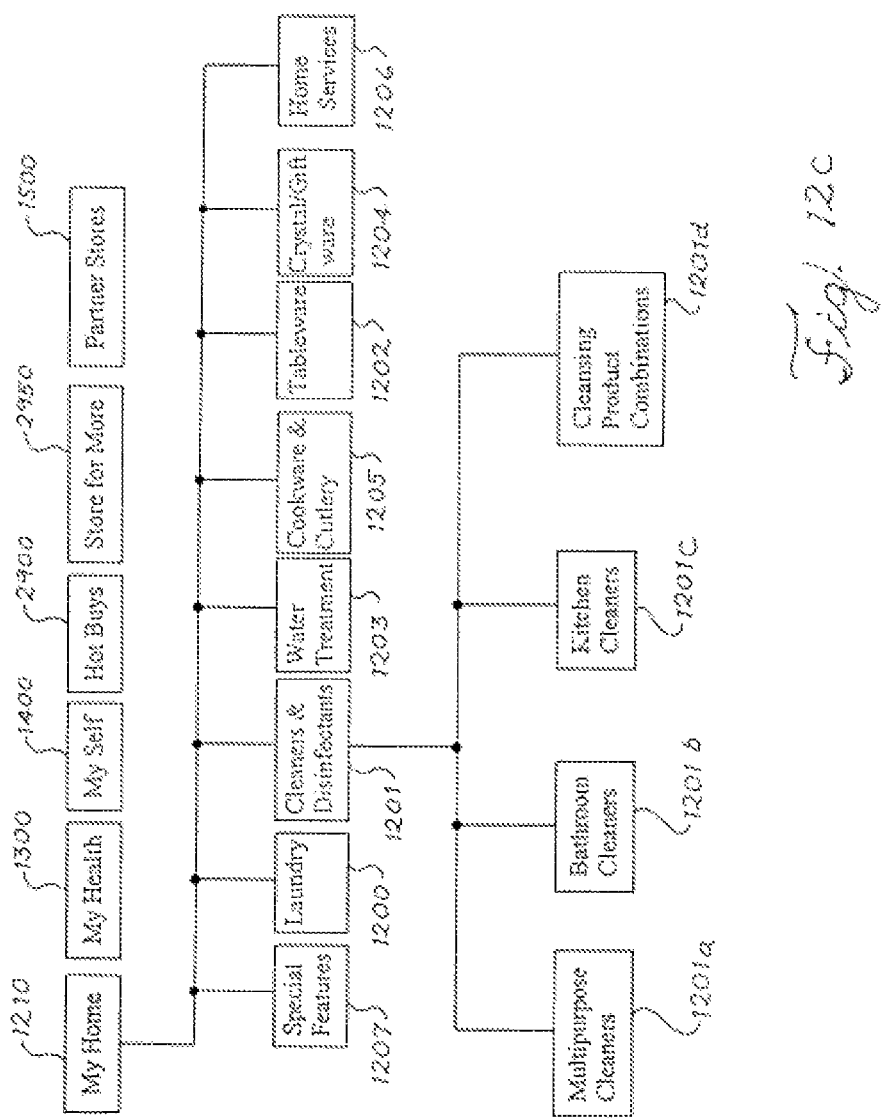

Exemplary cleaners and disinfectants 1201 are shown in FIG. 12c and include core-line house products such as multipurpose cleaners 1201a, bathroom cleansers 1201b, kitchen cleansers 1201c, and cleaning product combinations 1201d. Exemplary merchandising initiatives that are common to the House Cleaning Product area include, but are not limited to, the following:

Personal Cleaning Plan—This is a survey that the shopper completes which asks for a description of cleaning products used and provides a product recommendation based on input received. This is similar to the Personal Laundry Prescription described above. Users provide profile information and a recommendation will be returned. Direct links to product pages are also offered.

Time Saving Tips—This is a list of cleaning-related time saving tips.

Figure 12D:
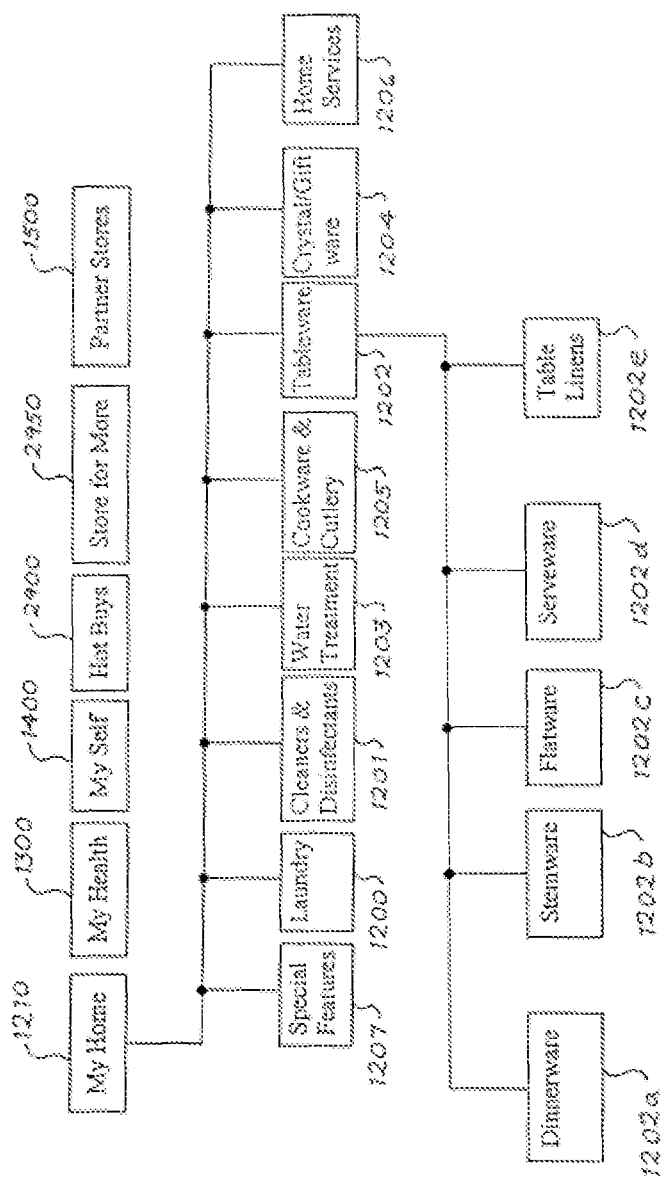

Exemplary tableware products 1202 are shown in FIG. 12d and include core-line tableware products such as dinnerware 1202a, stemware 1202b, flatware 1202c, servicewear 1202d, and table linens 1202e. Exemplary merchandizing initiatives that are common to the Tableware area include, but are not limited to, the following:

Decorating for the Seasons—This section provides tips and decorating ideas for seasonal table, mantle and flower treatments.

Decorating and Entertainment Tips—This is an informational etiquette section.

Shoppers receive tips on information such as setting up a table, folding napkins, setting up a buffet and icebreakers.

Decorating Style Quiz—Shopper picks a decorating style from different predetermined style profiles. The style profile defines the shopper as transitional, traditional, casual, or formal and the system provides product recommendations that fit the shopper's style.

Interactive Table Top—This feature allows the shopper to select products and display them on an online virtual tabletop.

Figure 12E:
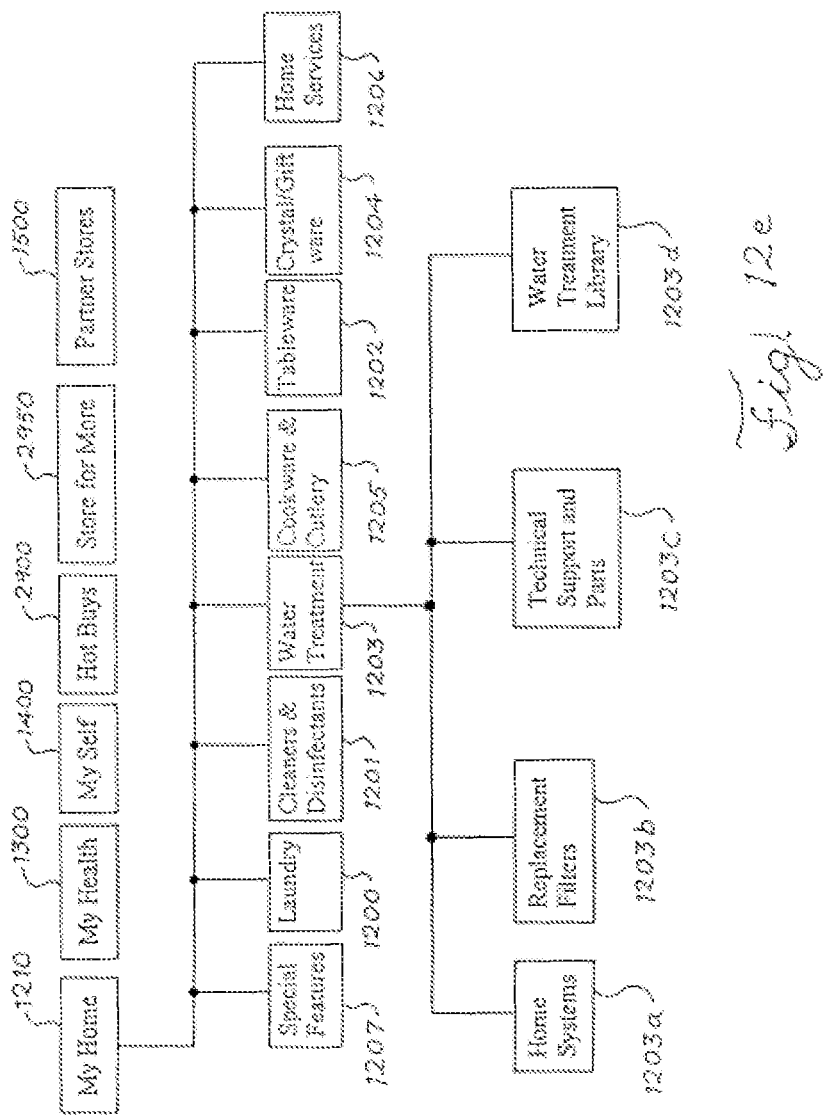

Exemplary water-treatment products 1203 are shown in FIG. 12e and include water treatment products and services including home systems 1203a, replacement filters 1203b, technical support and parts 1203c, and a water treatment library 1203d. Exemplary merchandizing initiatives that are common to the Water Treatment products area include, but are not limited to, the following:

Water Safety Facts—From this page, a shopper can find information on water safety facts in their residential area by entering their zip code. There also are links to localized water safety reports and water facts. If requested, proactive e-mail can be sent to those requesting the latest news on water safety issues.

Water Safety Reports in the News—From this page, a shopper can find information on water safety news reports and sign up to receive e-mail with water safety reports.

Figure 12F:
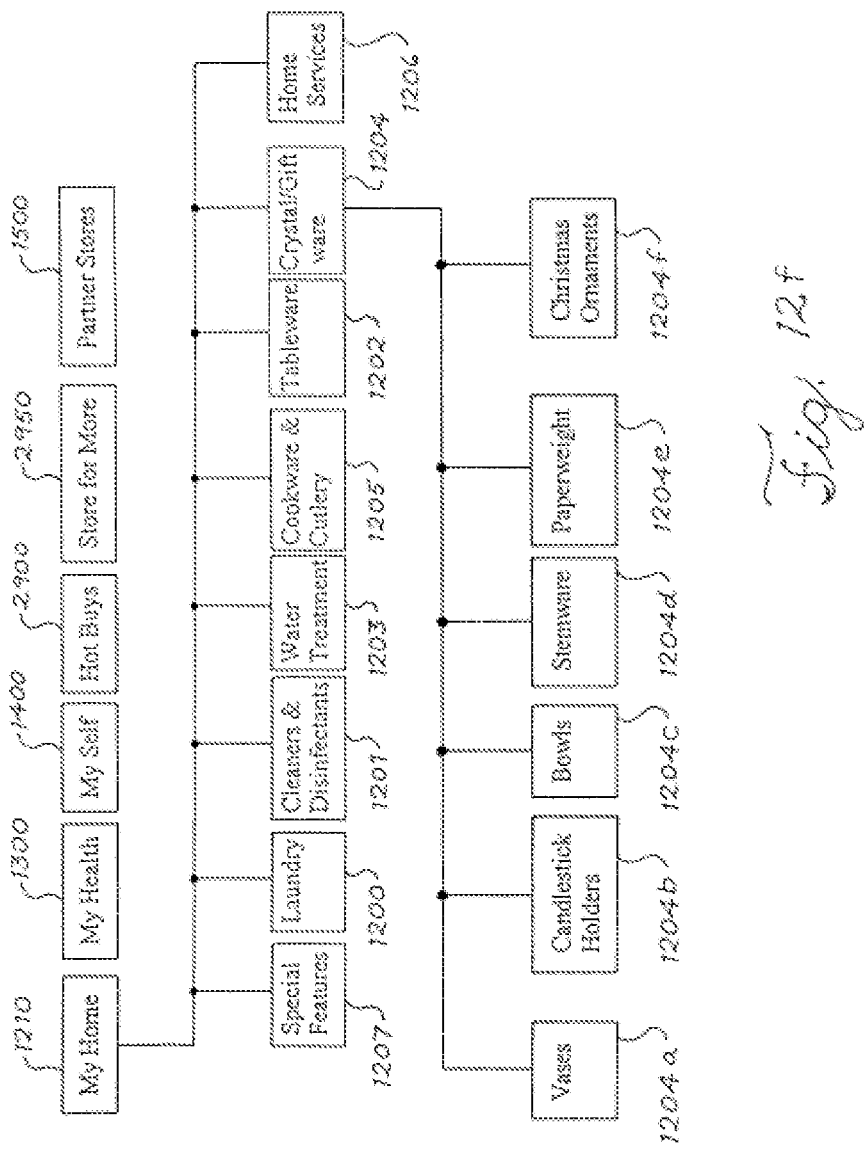

Exemplary crystal/giftware products 1204 are shown in FIG. 12f and include vases 1204a, candleholders 1204b, bowls 1204c, stemware 1204d, paperweights 1204e, and Christmas ornaments 1204f.

Exemplary cookware and cutlery products 1205 are shown in FIG. 12g and include core-line cookware 1205a, create your own cookware set & accessories 1205b, cutlery & shears 1205c, replacement parts 1205d. Exemplary merchandizing initiatives that are common to the cookware and cutlery products area include, but are not limited to, the following:

Cooking Club—This feature provides a recipe exchange area, database of Cooking Club members, profiles of long-time members, special offers to members, lists of recipes of the month, and links to other recipe Web sites.

Streaming Video—The streaming video features stories about cookware and cooking.

Recipes—This feature provides a recipe exchange area where shoppers can post a recipe to the site.

Figure 12H:
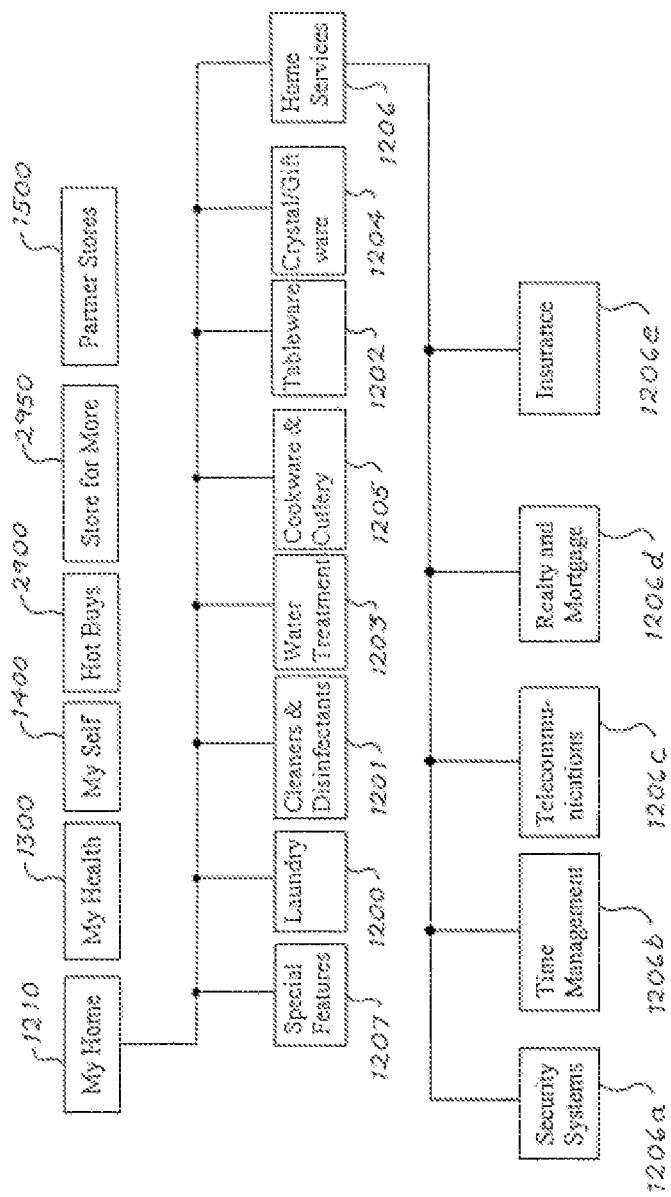

Exemplary home services links are shown in FIG. 12h and include security systems 1206a, time-management systems 1206b, telecommunications 1206c, realty and mortgage services 1206d, and insurance services 1206e. In a preferred embodiment, realty and mortgage services 1206d and insurance services 1206e are only available to Members, Members Plus, and IBOs.

Shopping Functions Specific to "My Health"

The "My Health" store is a single source for traditional and alternative health solutions including natural products tailored to the Web shopper's personal needs. This store offers a variety of health care products such as vitamins and dietary supplements. The site also offers consumers a source for personalized, credible, comprehensive and up-to-date information services about natural and alternative health solutions.

Figure 13A:
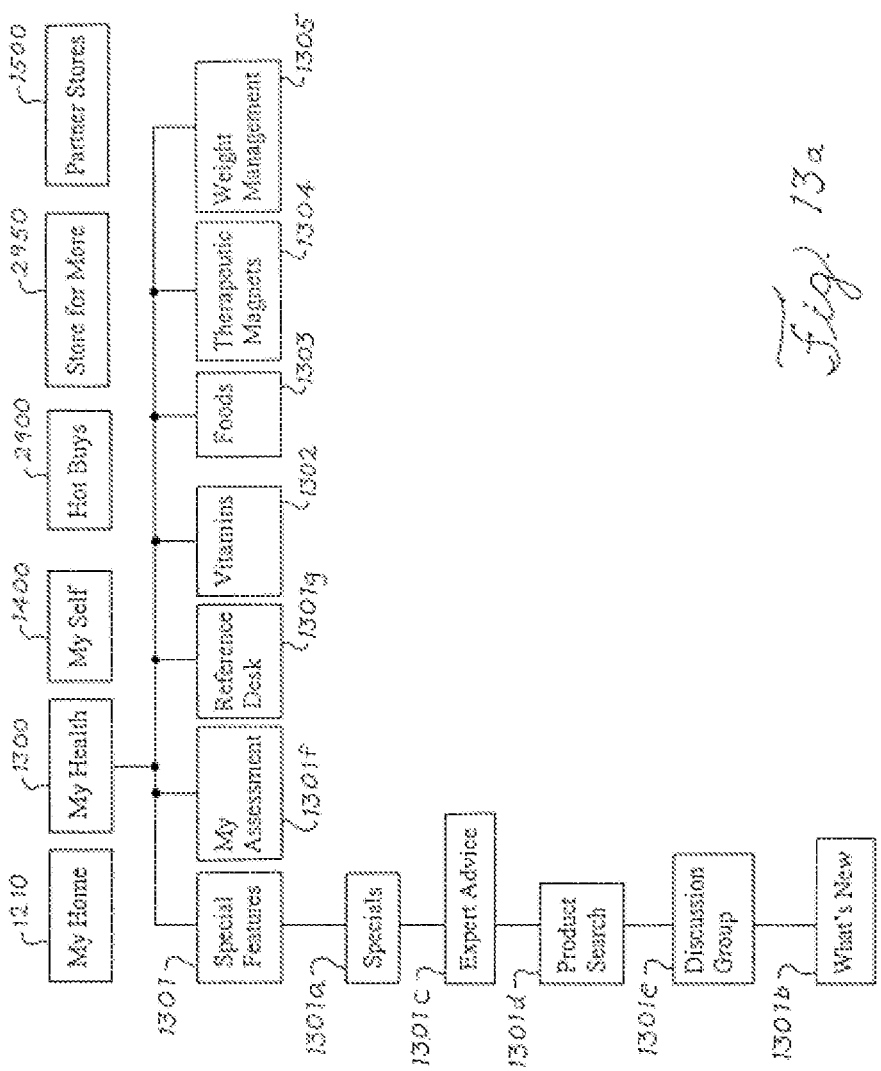
FIGS. 13a-13e show an exemplary layout of a second exemplary shopping page web file of the present invention.

The site is preferably organized into the following exemplary logical areas which are shown in FIGS. 13a-13e: Vitamins 1302, Foods 1303, Therapeutic Magnets 1304, and Weight Management 1305 page web files or sites. As shown in FIG. 13a, in addition to the logical areas noted above, the site 1300 also includes a special features area 1301 which can include links to specials 1301a, a "What's New" section 1301b, Expert Advice 1301c, Product search 1301d, a discussion group 1301e for shoppers, a "my assessment" area 1301f, and a reference desk 1301g, which can provide information relating to various products and services.

Figure 13B:
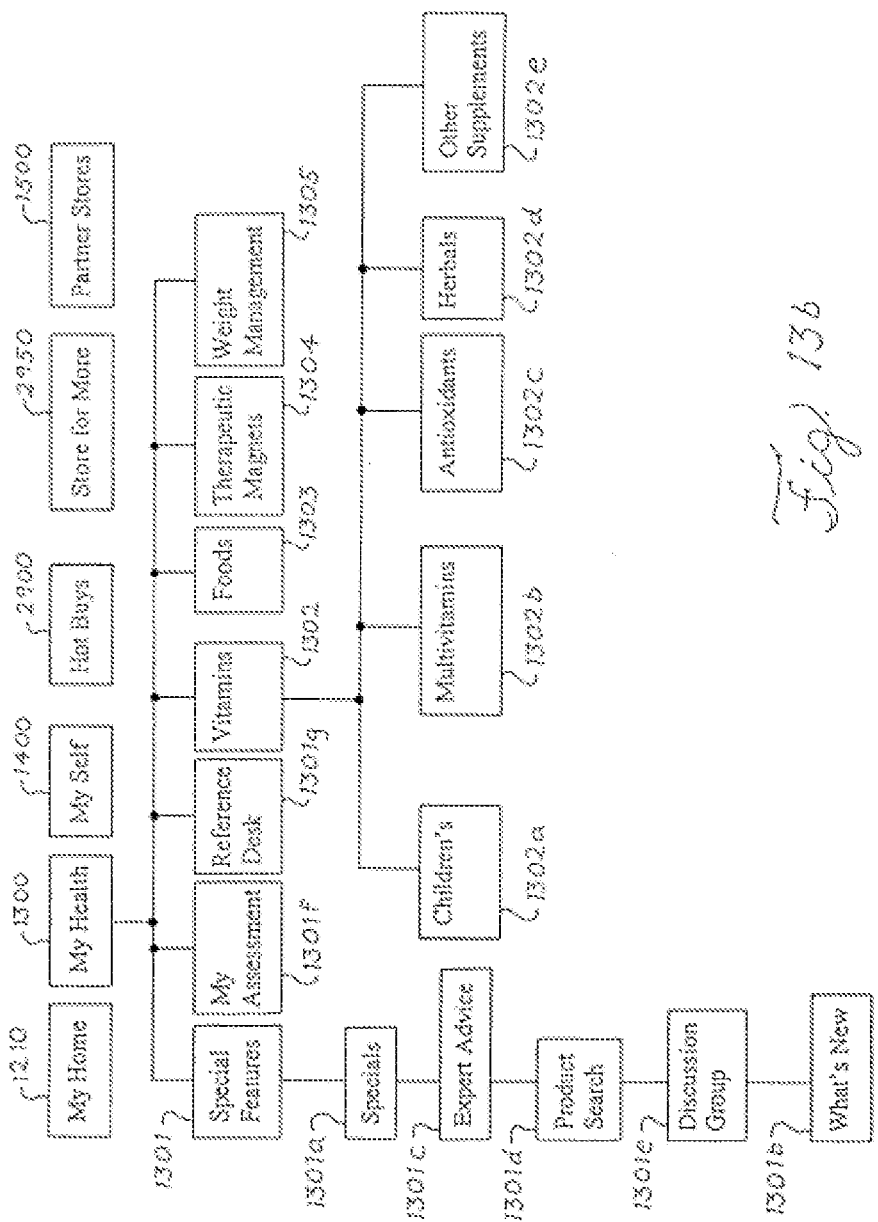

Referring to FIG. 13b, the vitamins page 1302 preferably includes exemplary core-line products including children's vitamins 1302a, multivitamins 1302b, antioxidants 1302c, herbals 1302d, other supplements 1302e, and additional support materials. Exemplary merchandizing initiatives that are common in the vitamins area include, but are not limited to, the following:

Library of Health-Related Issues Link—This is an in-depth and extensive library that is searchable by symptoms with links to product information and recommendations. The presentation of Library choices may be based on personal profile information provided by the user (i.e., if the primary concern is heart disease, a user can personalize the site to highlight the current news in areas of interest). In an exemplary embodiment, a link is provided to a health education organization that acts as a resource for IBOs and other customers.

Link to Product Information for Physicians—This is a downloadable area where physicians can come to find out technical information on a marketing company's health care products. Information is targeted to physicians but is open to viewing by all site users. This information may be modified by geographical area as would be apparent to one of ordinary skill in the art.

Links to Other Health Sites—The store provide links to other health sites, such as, for example, Magnabloc.com, Trimadvantage.com, blionline.com, and NUTRILITE.com sites.

Figure 13C:
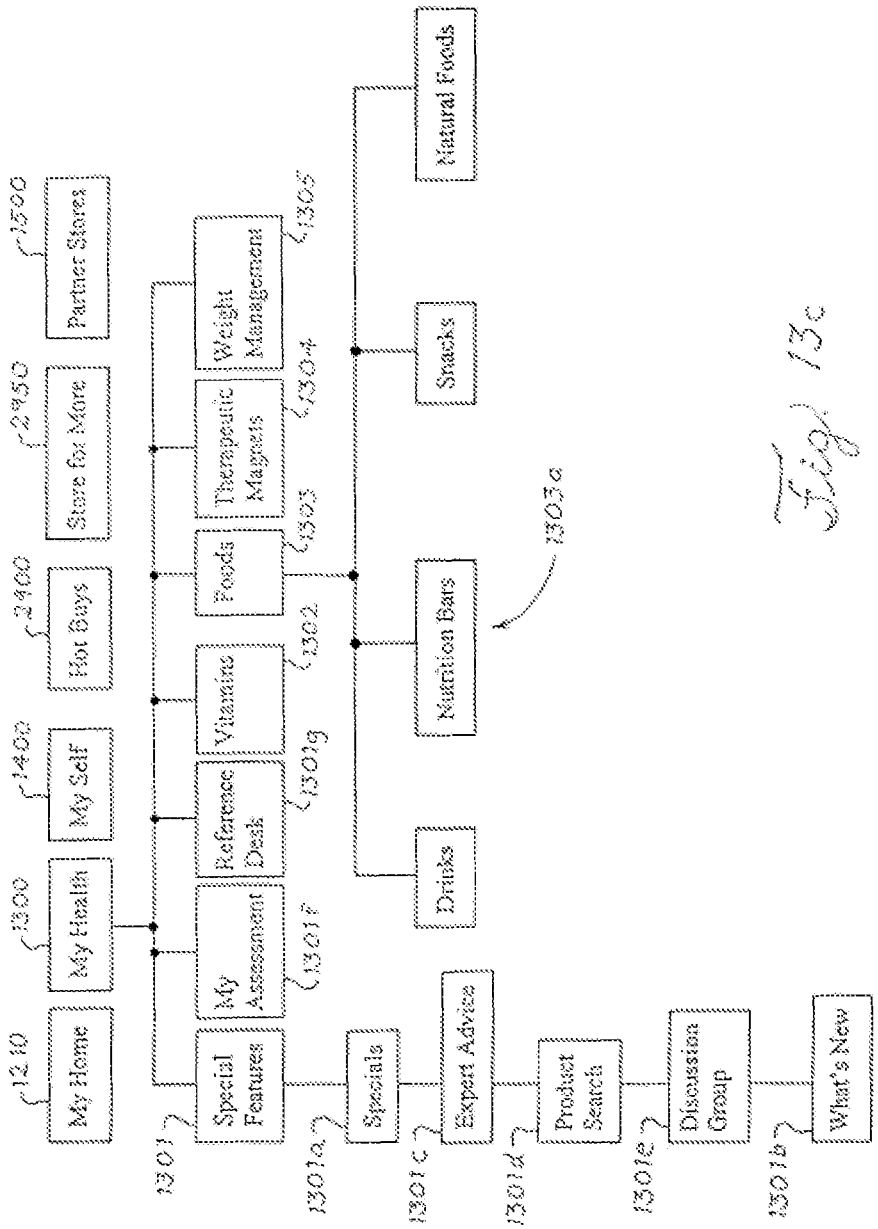
Figure 13D:
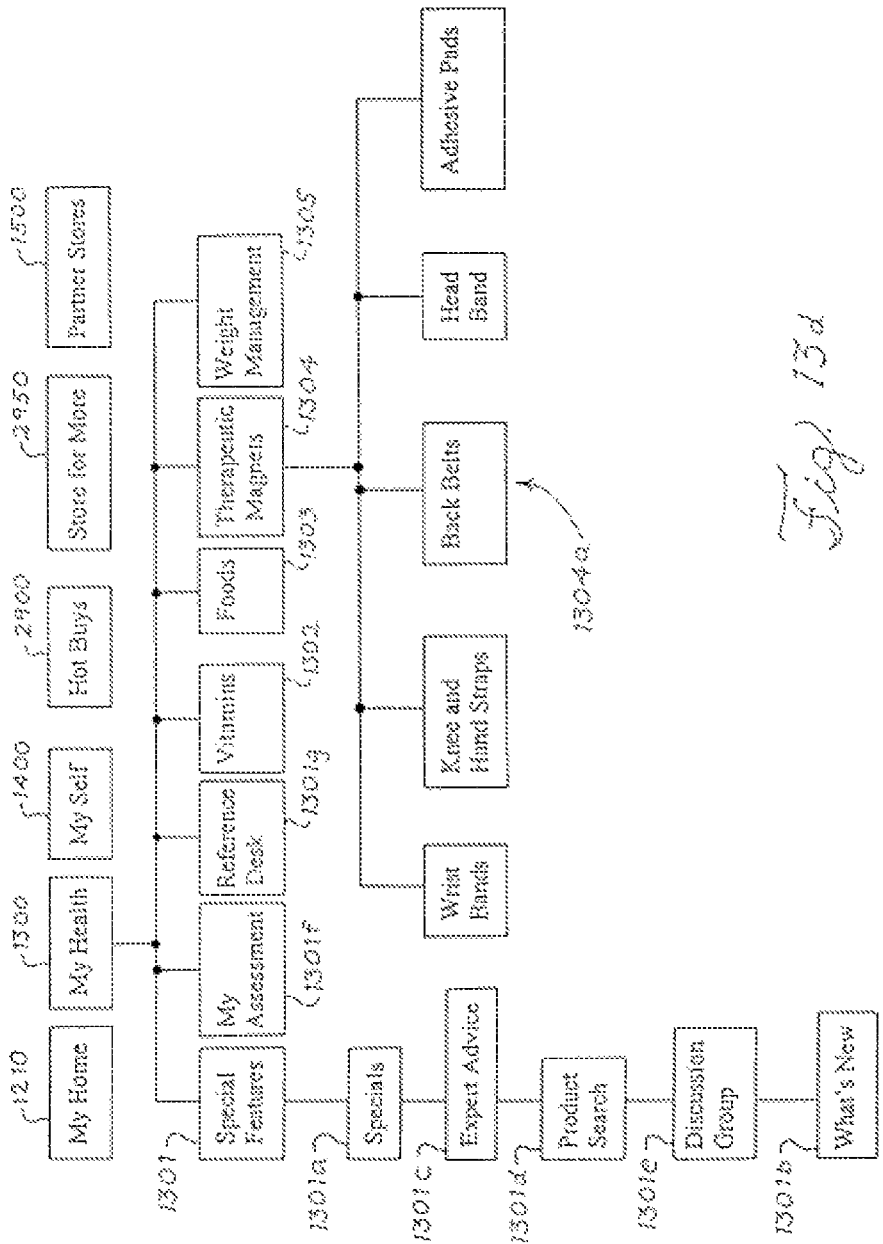
Figure 13E:
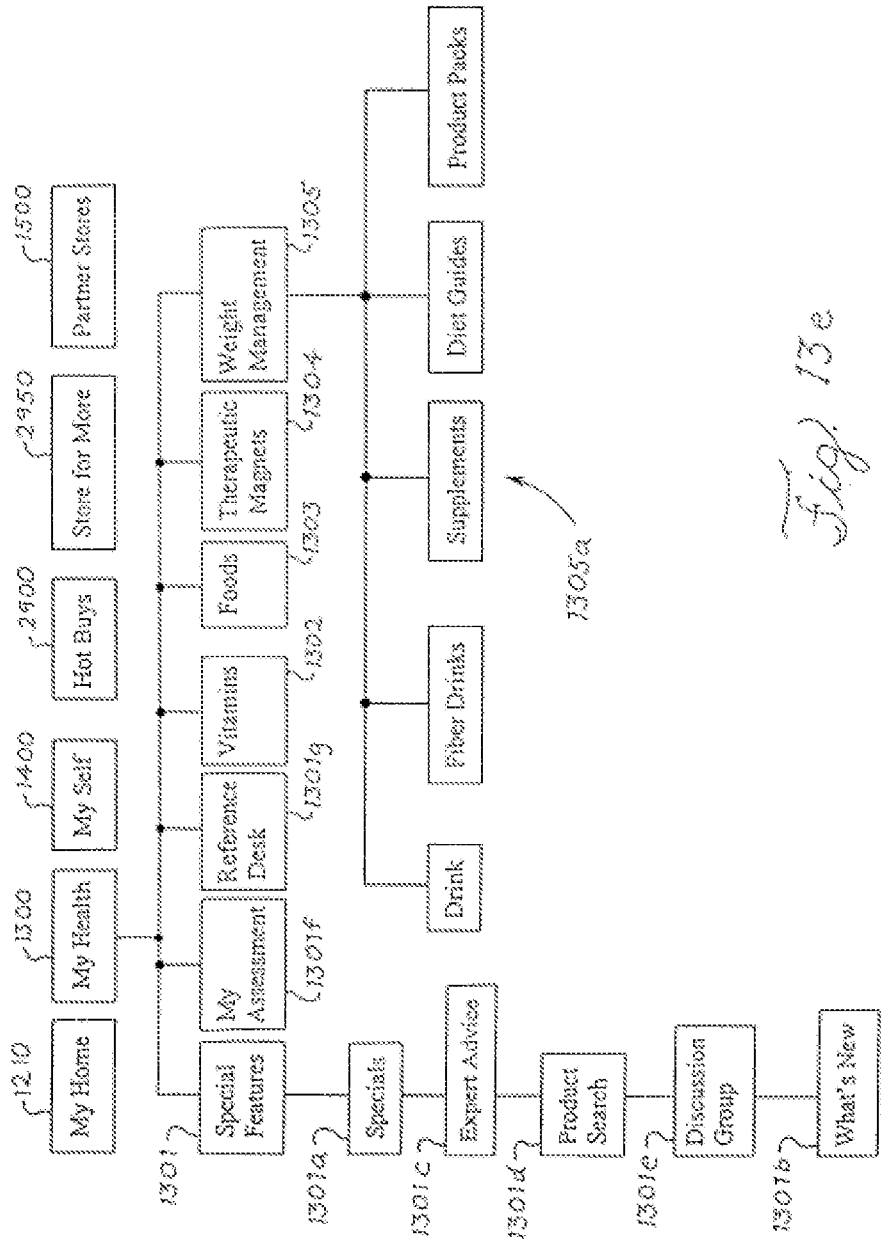

The Foods page web file 1303 preferably includes a plurality of exemplary food products 1303a as shown in FIG. 13c. The Therapeutic Magnets page web file 1304 preferably includes products relating to various magnetic products 1304a sold, for example, under the Magna Bloc title as shown in FIG. 13d. The Weight Management page web file 1305 preferably includes dietary supplements and other weight loss related products 1305a as shown in FIG. 13e.

Shopping Functions Specific to "My Self"

The "My Self" store is a virtual spa service that provides information about current trends, skin care/cosmetics, hair care and aromatherapy product categories. Each of the exemplary page web files associated with the My Self page web file 1400 are shown in FIGS. 14a-14e. The stores offer time conscious Web consumers customization, expert advice, virtual interactive consultation, how-to demonstrations, referral service, and up-to-the-minute information.

Figure 14A:
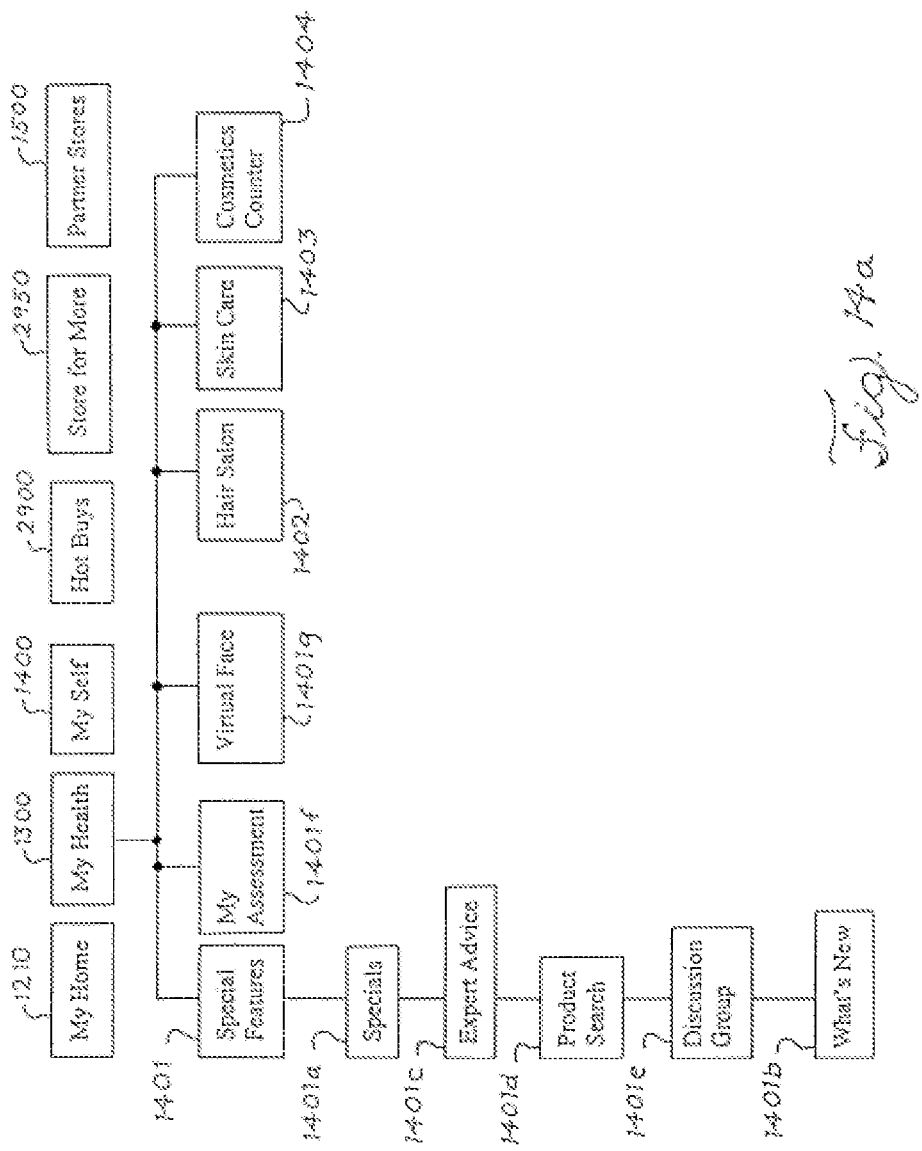
FIGS. 14a-14e show an exemplary layout of a third exemplary shopping page web file of the present invention.

The site 1400 is preferably organized into the following logical areas as can best be seen in FIG. 14a. These include the special features 1401 including: Special offers 1401a, What's New 1401b, Expert Advice 1401c, Product Search 1401d, Discussion Group 1401e, My Assessment 1401f, and Virtual Face 1401g. In addition, the site further includes links to the Hair Salon 1402, Skin Care 1403, and Cosmetics Counter 1404. Exemplary products include hair care, skin care, color cosmetics and aromatherapy products.

Figure 14B:
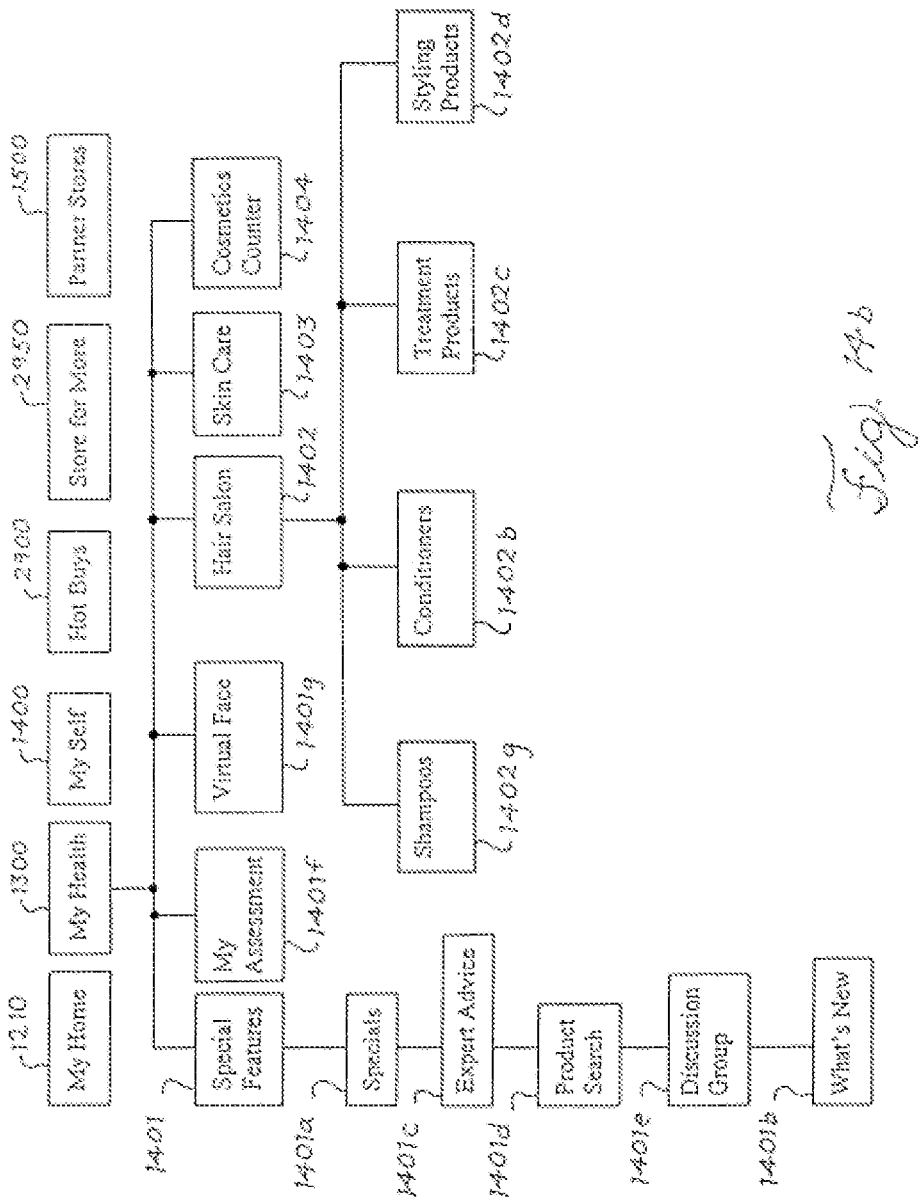
Figure 14C:
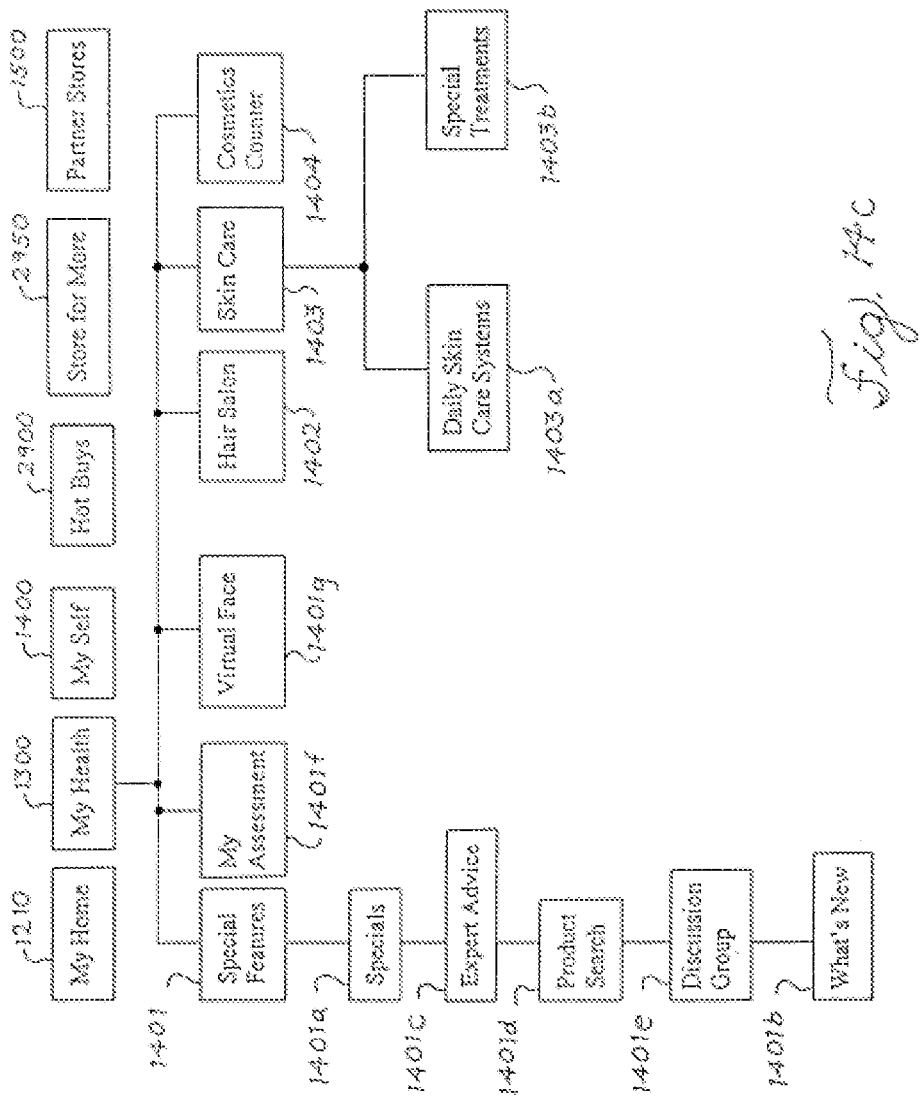
Figure 14D:
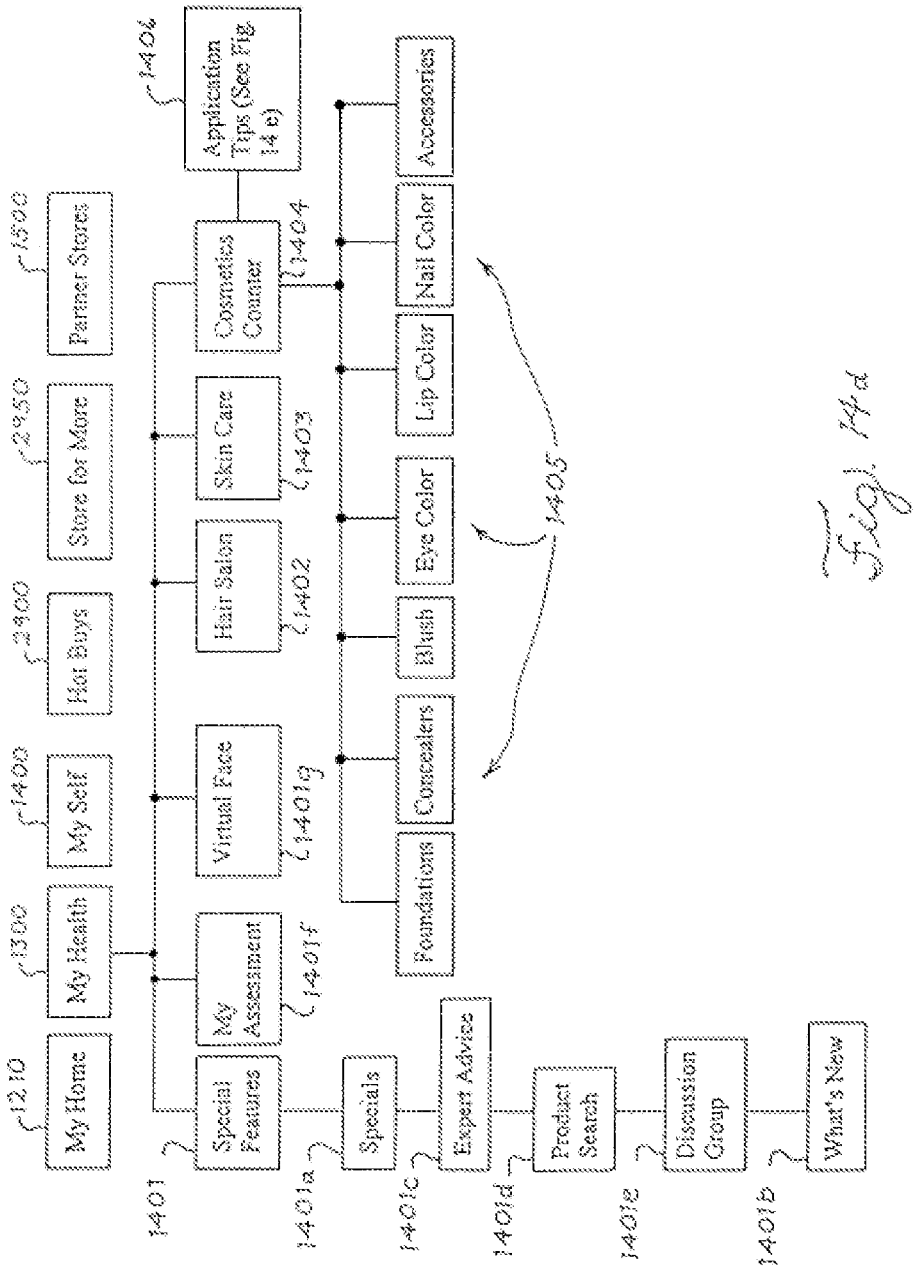
Figure 14E:
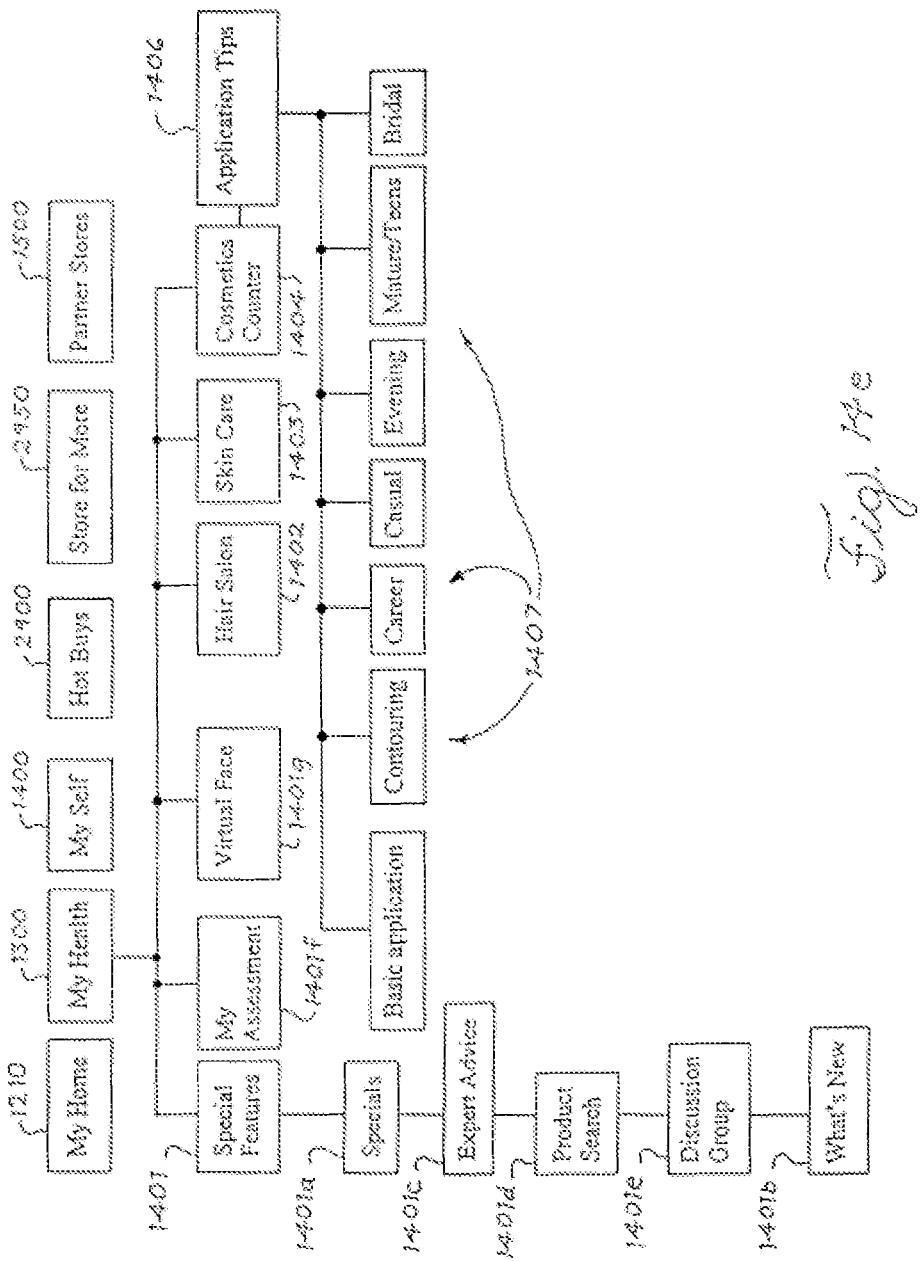

The Hair Salon page web file 1402, as shown in FIG. 14b, preferably includes core-line products such as shampoos 1402a, conditioners 1402b, treatment products 1402c, styling products 1402d, and other support materials. The Skin Care page web file 1403, as shown in FIG. 14c, preferably includes core-line products such as daily skin care systems 1403a, time defying products, supplemental skin care, special treatment products 1403b, and support materials. The Cosmetics Counter page web file 1404, as shown in FIGS. 14d and 14e, preferably includes core-line products such as face, eyes, cheeks, lips, nails, accessories and support materials 1405 as well as an application tips area 1406 including a plurality of information 1407 regarding advice for beauty applications. An exemplary area preferably includes core-line products such as calming and energizing products as well as support materials. Exemplary merchandizing initiatives that are common in the cosmetics counter page web file 1404 include, but are not limited to, the following:

Virtual Face—The "Virtual Face" feature allows a shopper to experiment with different hair colors and makeup styles. Multiple, finite combinations may be shown based on user input of profile information. These will preferably be static images. In another embodiment, this feature allows users to scan in their own face and try different product combinations in a fully interactive mode. As would be readily apparent to one skilled in the art, this scanning could be achieved, for example, by scanning in a photograph using a scanner, such as the 9100C Flatbed Digital Scanner produced by Hewlett Packard™ of Palo Alto, Calif., and forwarding the scanned image via, for example, email. Alternatively, a digital image, such as obtained using a digital camera, can be used. A digital image from a CD-Rom or other storage media could also be used.

What's New—The "What's New" feature shows the latest trends in cosmetics, skin care, and hair and how to create trendy looks using the product line. It also provides the most up-to-date information regarding scientific discoveries and demographic trends in the skin care industry. This feature also links to product pages.

Links to Merchant Service Partners

Figure 15:
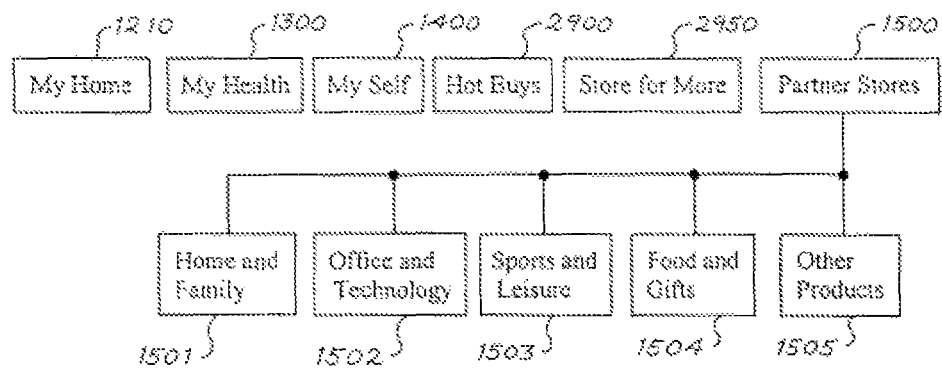
FIG. 15 shows an exemplary layout of a fourth exemplary shopping page web file of the present invention.

According to the present invention, and as shown in FIG. 15, the marketing company preferably has several merchant partners or partner stores 1500 that participate and are affiliated with the E-Commerce site of the present invention. Exemplary partners provide products and services in a number of areas. Exemplary product and service areas include, but are not limited to, home and family services 1501, office and technology 1502, sports and leisure 1503, food and gifts 1504, and "other products" 1505 which can include flowers, computers, books, apparel, and home and garden, for example.

Links to these merchant partner sites are preferably provided to shoppers based on their membership level (i.e., Client, Member, Member Plus, IBO). In the preferred embodiment, a user must be authenticated as a registered Client, Member, Member Plus, or IBO to have access to the merchant partner links. Each of these relationships with the exemplary merchant partners are described in more detail below.

Security—there is a link to a security company Web site. In addition to this link, facts and figures on home security as well as free security consultation may be provided.

Energy—there is a link to an energy company Web site. In addition to this link, tips on how to save money on an energy bill may be provided.

Telecom—there is a link to a telecom company Web site. In addition to this link, tips on saving money on a monthly phone bill may be provided.

Time-Management—there is a link to a time-management company Web site.

Realty and Mortgage—there is a link to a Realty and Mortgage company Web site. Access to this site is preferably limited to Independent Business Owners.

Universal IBO Benefits—there is a link to the Universal IBO Benefits Web site. Access to this site is preferably limited to Independent Business Owners.

Auto Network—there is a link to information pertaining to an auto network.

Shopping Specific to Other Products

The Store for More site 2950 provides an area for products that do not fall within the parameters that define the "My Home", "My Health", and "My Self" shopping sites. These products may include catalog items as well as a link to the marketing company-sponsored Internet Service Provider.

Members have the opportunity to sign up for the Internet Service Provider. It is a fee-based service. Preferred categories within the Internet Service Provider include, but are not limited to, custom set-up software, e-mail, personal home pages, etc.

In one embodiment of the present invention, a separate store "Hot Buys" 2900 is included offering a subset of the "Store for More" 2950 (see FIG. 1) merchandise. This store may include 25 to 30 products with a particularly good price/value relationship. These items may be added to the perpetual shopping cart for ordering. The products will be fulfilled on one order with "My Home," "My Health" and "My Self" products.

The Store for More site 2950 allows users to browse for products by categories. The main page lists the categories and when a user selects a category, the user sees either sub categories or product lists. When the user selects products from the list they are then taken to a product detail page. At the product detail page the user can add the product to their shopping basket or view more information about the product as described above.

In addition, a search function is provided allowing Clients, Members, Members Plus, and Independent Business Owners to seek out known "Store for More" products and add them to their order in a manner similar to the search function described above. An Independent Business Owner preferably has access to a text listing of products for ordering.

Order Fulfillment Process

The E-Commerce site according to the present invention features an order management system that includes, but is not limited to, the following: changing orders; canceling orders; support for recurring orders; and handling back orders. Business-to-business capabilities are taken into design considerations. Miscellaneous items such as gift certificates also may be handled by the system of the present invention. Entry of custom instructions for personalized items, such as monograms, are available to the shopper as well.

Exemplary payment methods that may be employed by the present invention include credit card processing or automatic bank drafts. As used herein, bank drafts are preferably payment option for warehouse-authorized IBOs that allows them to order by mail or telephone and pay for the order by having the marketing company draft from their checking account. When the marketing company receives the IBO's order and PIN (Personal Identification Number), the marketing company sends the billing information to the IBO's bank, which then produces a transaction that will be drawn on the IBO's bank account. Both the IBO's bank and the marketing company must approve the authorization for drafts against the IBO's account. The PIN, as used in the present invention, is preferably a four-digit personal identification number that uniquely identifies each IBO. In one embodiment, the PIN is assigned randomly by computer to all bank draft authorized IBO's. This is preferably a confidential number known only to the IBO and is used to generate a bank draft payment or to obtain PV/BV estimates.

Other mechanisms may be employed to provide receipt and notification events throughout the order cycle. The ability to provide month's sales volume and order history is also available.

As described above, at any point during the shopping process, a user can view the contents of their personalized shopping cart. From the cart, the user can perform the following exemplary functions: change quantities; remove items; clear the basket; add or delete an item; indicate whether an item should be added to the user's standing order list; checkout; or continue shopping. The user is also able to mark individual items or complete standing orders. Upon completion of his or her shopping experience, the user proceeds through the checkout process. Each of these options have been described above.

When a shopper selects the check out link, the system first determines if they are registered. If the shopper is not registered they must register before checking out. If the shopper has been authenticated, they will have the opportunity to review and confirm their personal information.

The registered shopper then proceeds to complete information such as billing, shipping, and payment information. The shopper also has the opportunity to redeem coupons or digital gift certificates on the payment information page. When a shopper is ready to check out, depending on the items placed in their cart, they may be able to access the financing page. The financing page provides sign-up information and static forms that tie in with the order processing system. Alternatively, an interactive form allowing online signup may be provided to the shopper.

Users may also place individual products or an entire order on a standing order quickly and easily through the present invention. Users may also have multiple standing orders and the ability to add an item to a standing order on a one-time basis. In a preferred embodiment, the standing order program (SOP) profiles are maintained on the mainframe. IBO's are able to access and maintain SOP profiles via the Virtual Office. In a preferred embodiment, the standing order functionality can access the information maintained in the SOP profiles but it should be apparent to one of ordinary skill in the art that information contained in the standing order is not limited to that information maintained in the profiles.

As part of the delivery information, the Web consumer also has the option of indicating whether an order should be sent as a gift. This means the order will be shipped without an invoice containing pricing information. Otherwise, the order will generally be shipped with an invoice which is a computerized printout of an order issued to an IBO. It provides the IBO and the marketing company with an accounting of the merchandise ordered, PV and BV, IBO Cost, retail, tax, postage, redeemed vouchers/coupons, shipping information and IBO information.

It is preferred that the order delivery mechanism be able to handle non-direct fulfillment orders. Non-direct fulfillment orders are, for example, orders that are placed directly by the IBO for the Member or Client and are personally delivered by the IBO to the respective Member or Client. If a Member or Client in a non-direct fulfillment group comes into the site, they will shop just like everyone else, and the order will be invoiced and fulfilled by the marketing company. When an IBO in a non-direct fulfillment organization shops on the site and the order is submitted, the IBO will get a notice indicating the "passing on" of the order to the Platinum IBO or Ordering IBO. The Ordering IBO then pays the marketing company, receives the merchandise, and resells it to the customer. The person ordering will also be sent a confirming email. Information in the shopping cart (i.e., the order) will be e-mailed to the Platinum IBO or Ordering IBO.

Once a shopper completes the payment information, the shopper has an additional chance to review the shopping cart before submitting the order. If the user chooses to submit the order, the user will subsequently receive an order confirmation notice by e-mail. E-Mail notifications are sent to the customer at various points throughout the order life cycle, including, but not limited to the following: order processed/failed on host; order extracted for warehouse (non-cancelable), and order shipped. Details included on the email notification include order status, order number, line item details, sub totals, tax shipping, service charges, and a grand total. The notification also includes shipping/billing information. It also preferably contains a link that allows the user to view order history details.

In a preferred embodiment, a user may request information regarding the status of the order at any time after initial processing and before receipt of the products. Such a request could be fulfilled electronically, for example, but not limited to, by email, or by any other well-known methods, such as but not limited to, telephone or mail.

A process for handling returns in compliance with the marketing company's guarantee policy is also preferably included. The satisfaction guarantees are clearly stated at key decision making points in the ordering process, such as when viewing product information and at checkout. Procedures for returning a product for refund are posted and return forms are made available to download and print. Requests for exchanges/replacements are preferably handled via an online form. The user will enter his/her invoice number, item(s) and quantity(s) to exchange/replace, reason for exchange (e.g. damaged, shorted, broken, wrong size, etc.) and any additional comments in the appropriate fields located on the form. The form will be e-mailed to customer service, which will then process the request.

In a particularly preferred embodiment, the present invention provides a pre-paid postage label to be used in conjunction with returns or exchanges of products. A flow diagram depicting the process by which a user administers the pre-paid postage label in product exchanges and/or returns is shown in FIG. 27. As shown in FIG. 27, the system presents the user with a copy of the satisfaction guarantee 2702. It should be apparent to one of ordinary skill in the art that the satisfaction guarantee is presented to the user via, for example, a web page or text box preferably associated with the shopping page web file. After the user has a chance to review satisfaction guarantee 2702, the user selects whether the user wishes to "return" or "exchange" (box 2704) an item or plurality of items.

If the user selects "return," an on-line return form 2706 is presented to the user. The user is then requested to enter a plurality of information (box 2708) on return form 2706, including, but not limited to, quantity, stock number or SKU, the reason for the return, product description, and an invoice number. Additionally, it is preferred that a comments section is provided on return form 2706 so that the user can supply feedback to the marketing company or merchant partners. As should be apparent to one of ordinary skill in the art, a plurality of products and/or services can be listed on return form 2706.

After the information has been added to the return form and accepted by the user, the return form is then presented to the user in a format (box 2710) that can be printed on a conventional printer connected to the user's computer, for example.

The user is requested to print the form and include the form in the box containing the product or products to be returned. Finally, a pre-paid postage label used in conjunction with, for example, the United States Postal Service, is presented to the user's computer (box 2712). The user can print out the pre-paid postage label and include it with the package of products to be returned to the marketing company. In this fashion, the marketing company pays for the cost of mailing the returned items.

If the user selects to "exchange" a product or products, the user is presented with an exchange form 2714. The user is then requested to enter a plurality of information (box 2716) on exchange form 2714, including, but not limited to, quantity, stock number or SKU, the reason for the return, product description, and an invoice number. In addition, exchange form 2714 preferably includes an additional field which shows the user those items available for exchange. In a preferred embodiment, products or services which are less than or equal to the price of the article to be exchanged will be available for exchange. The present invention, however, is not limited to such restrictions.

After the information has been added to the exchange form and accepted by the user, the information is sent to the marketing company (box 2718). The marketing company completes the exchange processing. The exchange form may be forwarded to the marketing company by any method, including, but not limited to, email, regular mail, or telephone. It is preferred, however, that the exchange form is sent to the customer service representative via email.

"Member Perks" Site Functionality

Figure 16:
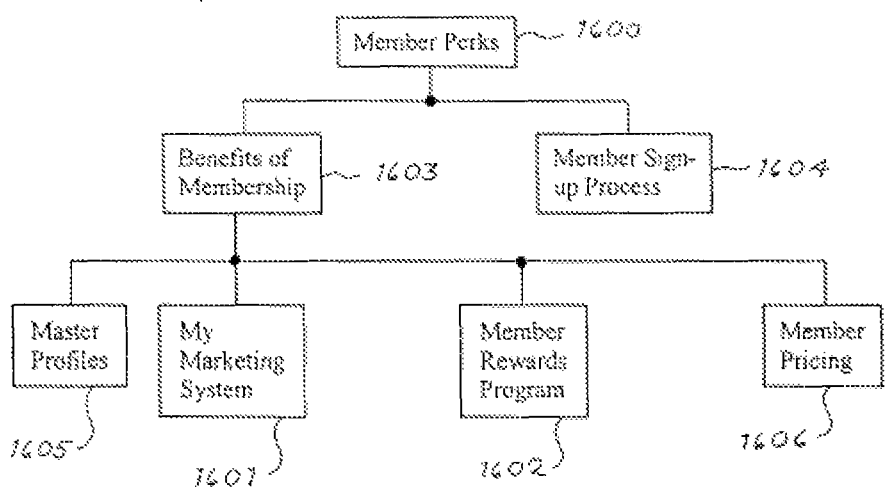
FIG. 16 shows an exemplary layout of a "Member Benefits" page web file of the present invention.

The "Member Perks" or "Member Benefits" page web file or site 1600, as shown in FIG. 16, is directed towards allowing a Member to customize personal information for both the shopping and business environment. Personalization is preferably provided via a link on the "My Business" or "My Marketing System" page web file 1601. Profiling is the central component of the E-Commerce site of the present invention which offers advantages and extra incentives to promote Member loyalty. Much of what makes member benefits significant is the total package of services available to Members (i.e., access to services, etc.) rather than the "Member Perks" section of the site itself.

Personalization in the "Member Perks" site is preferably implemented in two ways: 1) linking to existing Internet portal services and 2) developing a customized control panel. Exemplary links to existing Internet portal services include, but are not limited to, the following: links to online national news; weather; sports; and stock quote feeds. This offers Members a customizable experience.

The second version of personalization employs the notion of a customizable control panel. On a limited basis, this site offers links to current interne service feeds along with other select personalization features that are offered within the E-Commerce shopping modules. Personalization can also include availability to PV/BV information for Members Plus and Independent Business Owners. The Frequent Buyer Program, or Member Rewards Program 1602, preferably designed exclusively for Members, is also personalized.

The "Master Profiles" 1605 preferably contain a business profile, family member profiles, shopping profiles, and other frequently accessed services.

Membership benefits 1603 are displayed within the Member Perks 1600 page web file to attract potential customers to the opportunities of the marketing company business partnership. To entice visitors to sign up for site membership via, for example, the Member Sign-up process 1604, an online gift certificate may be offered that can be applied to future purchases. Moreover, Membership pricing 1606 allows visitors to view the benefits of membership through reduced pricing structures.

In a preferred embodiment of the present invention, an on-line form associated with the member perks page is supplied to a registered user. The user then enters the user's personal information onto the on-line form and this information is stored on a server computer. This information is subsequently used to customize the layout of the plurality of web files based on the personal information supplied by the user.

Figure 17:
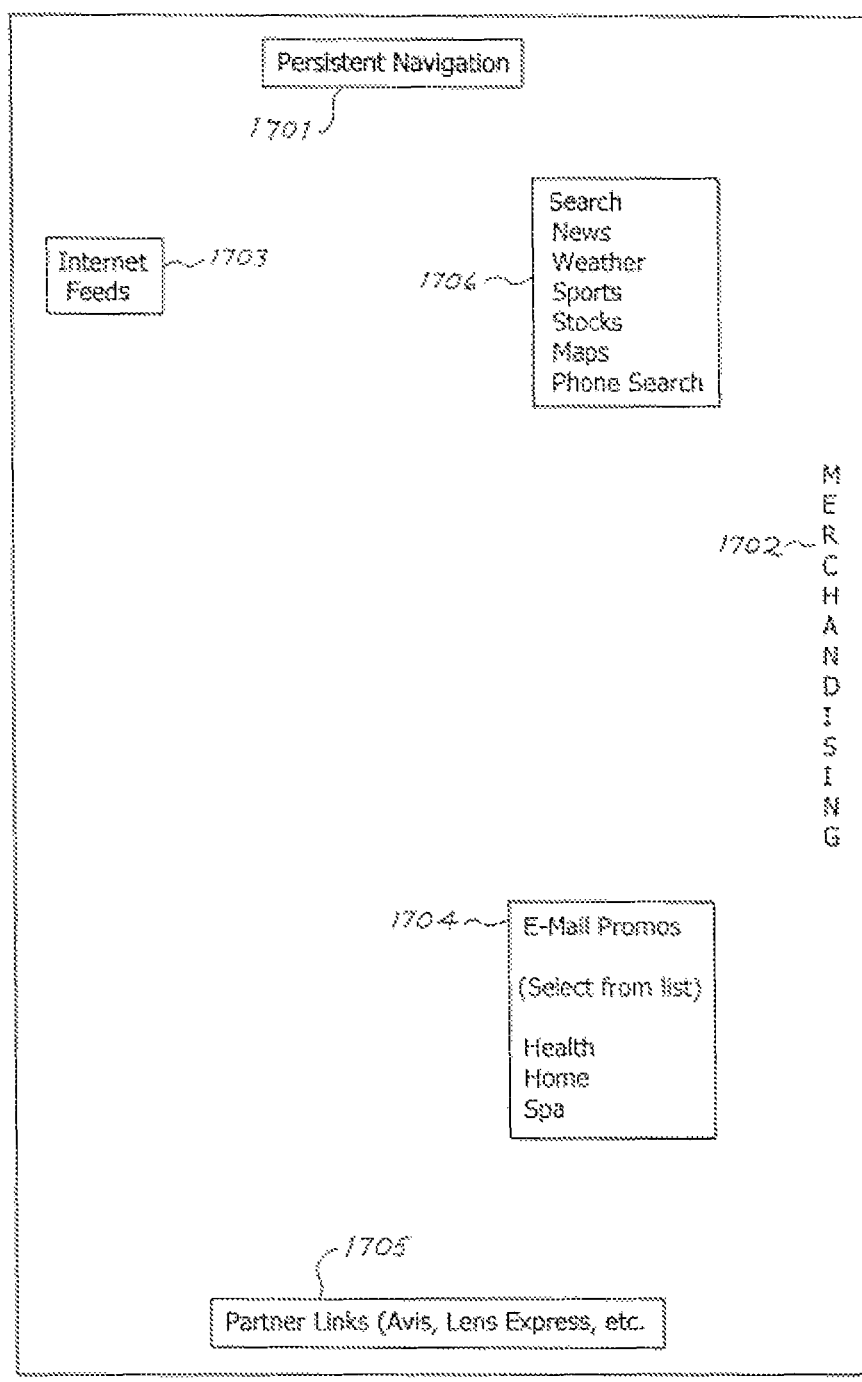
FIG. 17 shows an exemplary page web file including those features available to a Client within the "My Business" page web file of the present invention.
Figure 18:
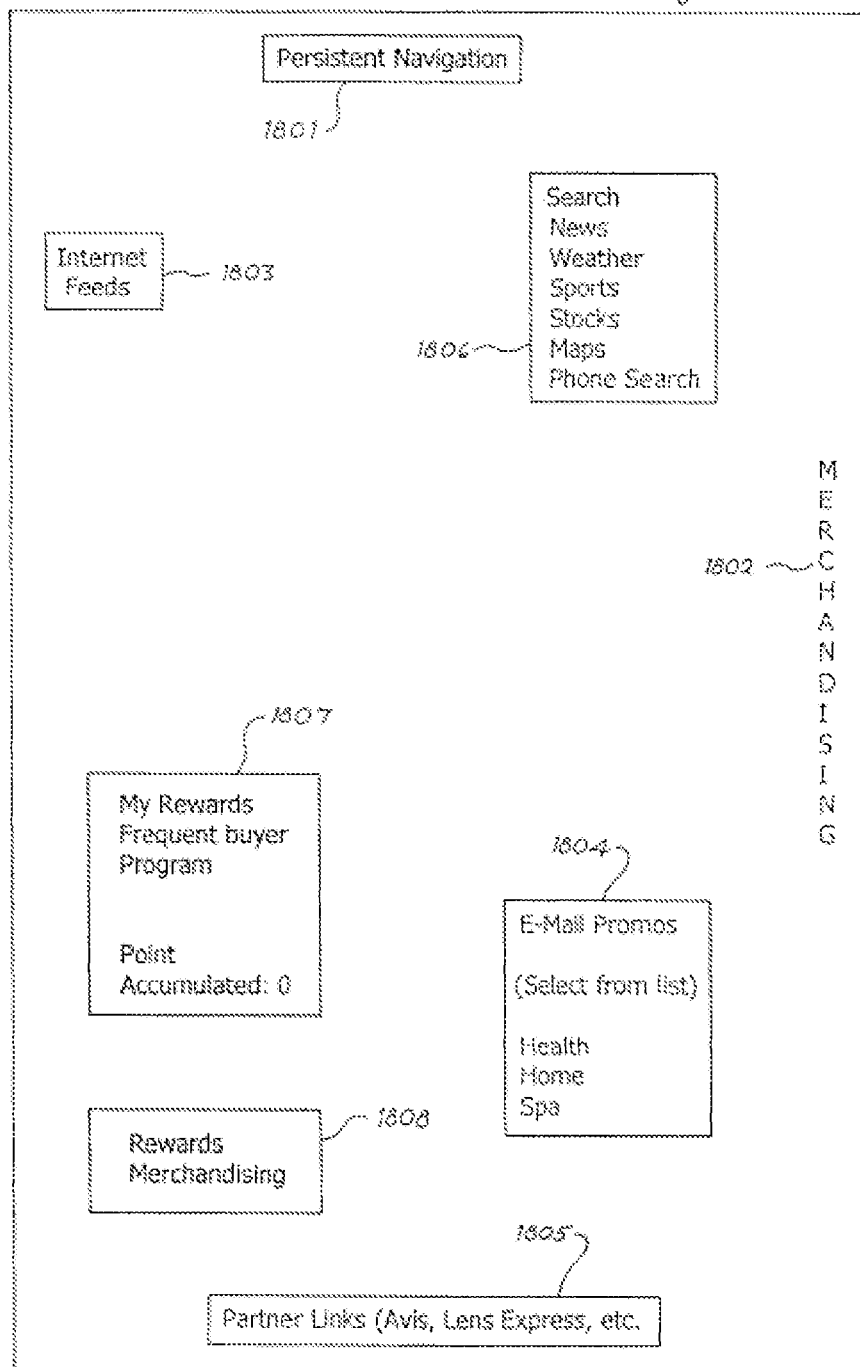
FIG. 18 shows an exemplary page web file including those features available to a Member within the "My Business" page web file of the present invention.
Figure 19:
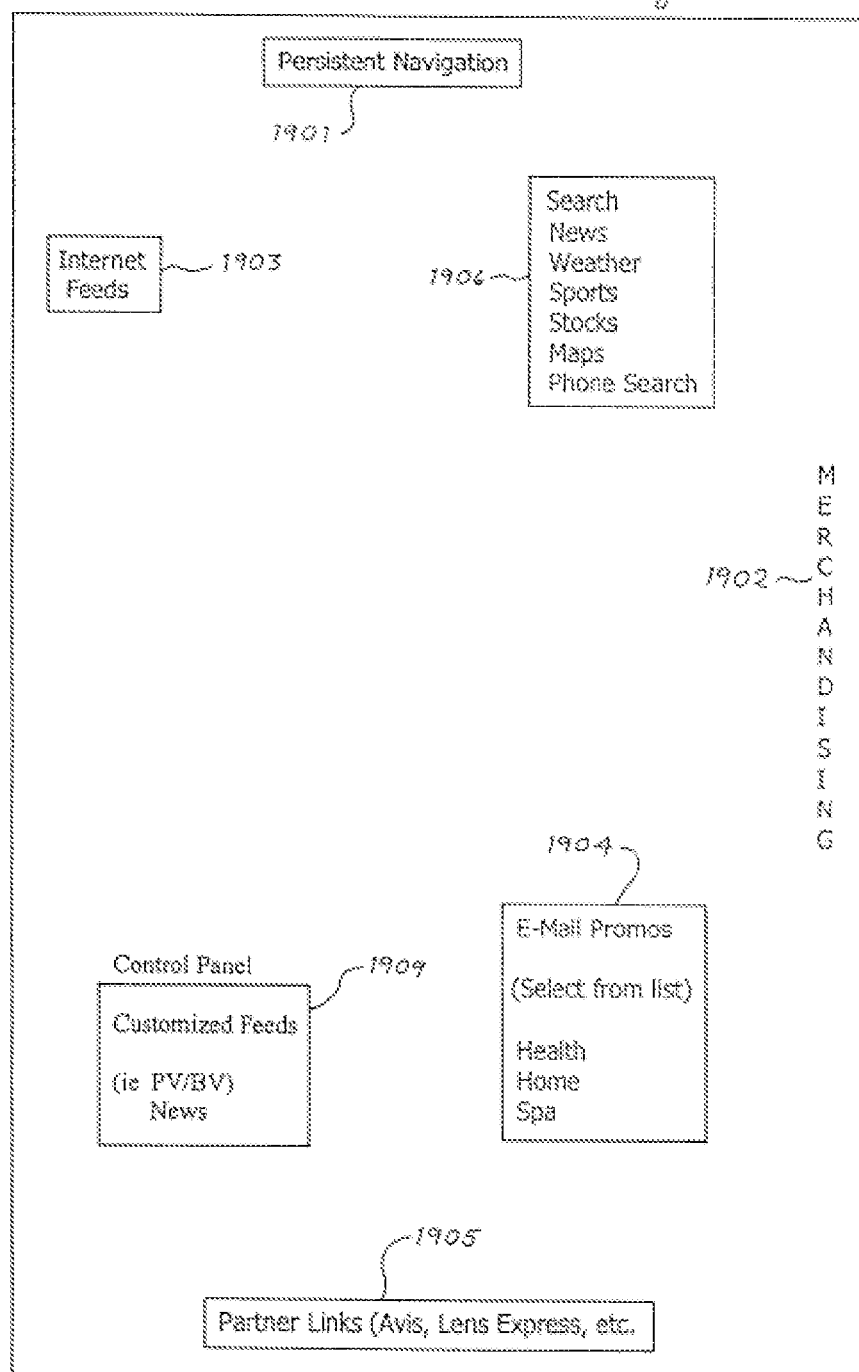
FIG. 19 shows an exemplary page web file including those features available to an Independent Business Owner within the "My Business" page web file of the present invention.

In the preferred embodiment, access to the Member Service page web file is based upon the participation level of the individual. It is preferred that surfers, or non-registered users may not access the Member Perks page. Clients preferably have access to limited personalization and features within the Member Perks page. As shown in FIG. 17, exemplary features available to Clients include persistent navigation 1701, which allows Clients to conveniently access a plurality of web pages associated with the marketing system via the Member Service page web file, persistent merchandizing 1702, internet service feeds 1703, promotional email lists 1704, links to merchant partners 1705, and a number of products and services 1706. As shown in FIG. 18, Members preferably receive all the features available to a Client, including persistent navigation 1801, persistent merchandizing 1802, internet service feeds 1803, links to merchant partners 1805, and a number of products and services 1806, plus the rewards of the Frequent Buyer Program 1807 and the Rewards Merchandizing feature 1808 that complements the program. These will be described in more detail below. IBOs and Members Plus preferably receive all the benefits of a Member, plus the benefits of customized feeds 1909, such as PV/BV inquiry and business news (see, for example FIG. 19). News feeds are preferably created and maintained by a marketing group associated with the marketing company.

In addition, the Member Perks area provides Member-only products and services designed to encourage Member loyalty and make becoming a Member attractive and exciting. At each membership level, shoppers are provided significant content and business value to encourage them to return often to the site. Additional benefits and services are offered at each level of membership, making the upgrade from Member to Member Plus to Independent Business Owner an easy and exciting decision. The following exemplary features are preferably implemented in this site:

Frequent Buyer/Rewards Programs—this program tracks a Member's shopping history. Frequent buyers receive discounts and other incentives to keep them coming back to the site.

Internet Service Feeds—Members have the option to customize their environment by selecting from a variety of Internet service feeds such as news, weather, sports, electronic greeting cards, maps, horoscope and financial information.

In one embodiment of the present invention, the following exemplary services are available in the Member Benefits section:

Rental Cars: Direct link to shop and book rental cars at a preferred price.

Hotels: Direct link to shop and book room reservations at a preferred price.

Eye products: Direct link to shop and order eye products at a preferred price.

Computer Products: Direct link to shop and order computer products at a preferred price.

Universal IBO Benefits: Direct link to get quotes and apply for Insurance products at a special price.

As noted above, the preferred embodiment of the present invention preferably includes a method and system for facilitating an on-line shopping and rewards program. Such a program rewards frequent buyers with purchasing opportunities based upon the volume of marketing system products and services purchased by that particular customer.

Figure 20:
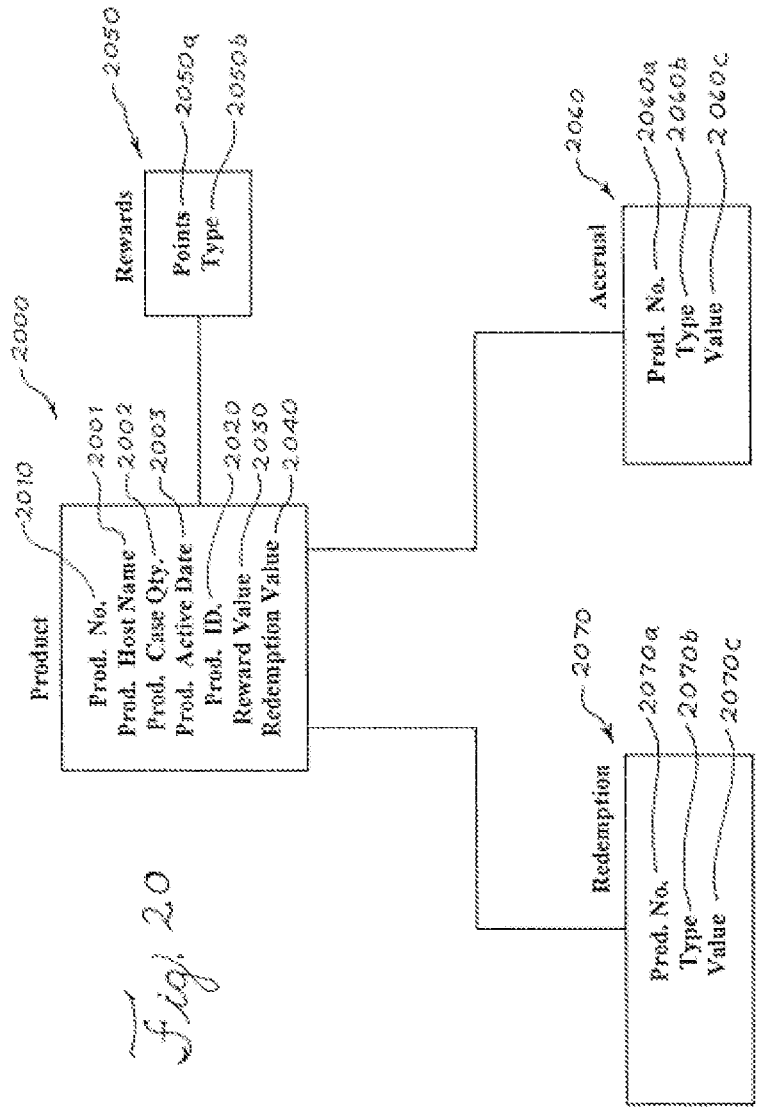
FIG. 20 shows an exemplary catalog of products and services used in the on-line shopping and rewards program of the present invention.

According to the preferred embodiment, the method comprises maintaining a catalog which includes marketing system products and services on a server computer. An exemplary catalog 2000 is shown in FIG. 20. As can be seen in FIG. 20, catalog 2000 preferably includes a plurality of information relating to the marketing system products and services, including, but not limited to, a product number 2010 ("PROD. NO.") associated with a particular marketing system product or service. In a particularly preferred embodiment, catalog 2000 also includes a marketing products and services index which includes a product identifier, or "PROD. ID." 2020 for each of the marketing system products and services. In addition, each of the marketing system products and services are assigned a corresponding rewards value 2030 and a redemption value 2040. These values are also preferably stored in the catalog. The rewards value 2030 for a particular product or service may have the same or different value than the redemption value 2040 for that product or service.

In the preferred embodiment, a registered Client, Member, Member Plus, or IBO is provided with an on-line order form (which can be the same as or similar to the form described above with respect to shopping) which allows purchase/redemption from the catalog. In addition, a registered Client, Member, Member Plus, or IBO is also provided with an on-line redemption form which also allows purchase/redemption from the catalog. In this fashion, the user is allowed to purchase or redeem items from the catalog using the payment method described above or using points, which have been earned from previous product purchases.

Each of the on-line order form and on-line redemption form can be in the form of the shopping basket form described above with respect to shopping and as shown in FIG. 10. It should be apparent to one of ordinary skill in the art that any suitable on-line form may be used in the present invention as long as the form provides a convenient method for allowing a registered Client, Member, Member Plus, or IBO to purchase products and redeem points for products. Likewise, it should be apparent to one of skill in the art that separate on-line forms can be used to carry out the purchase/redemption function or a single form can be used.

When a registered user submits a rewards exchange request for marketing system products and services via the on-line redemption form, a redemption value corresponding to the marketing system products and services chosen by the registered Client, Member, Member Plus, and IBO is preferably subtracted from a rewards database 2050. Rewards database 2050 is preferably maintained on the server computer for storing reward points 2050*a* corresponding to a registered Client, Member, Member Plus, and IBO and a type identifier 2050*b*. Type identifier 2050*b* is preferably a value associated with one of a Client, Member, Member Plus, and IBO. An exemplary type identifier 2050*b* is a string selected from the group consisting of Client, Member, Member Plus, and IBO. As such, the rewards database allows the system to keep up with the total number of rewards points accumulated by the registered user.

In a particularly preferred embodiment of the present invention, catalog 2000 includes an accrual record 2060 and a redemption record 2070. Accrual record 2060 preferably includes a product number 2060*a*, a type identifier 2060*b*, and an accrual value 2060*c* for the product number. Type identifier 2060*b* is preferably a value associated with one of a Client, Member, Member Plus, and IBO. An exemplary type identifier 2060*b* is a string selected from the group consisting of Client, Member, Member Plus, and IBO. In the preferred embodiment, accrual record 2060 comprises an accrual value 2060*c* for each type identifier. In this fashion, as a registered Client, Member, Member Plus, and IBO purchases products, he or she will accumulate accrual values differently based upon the particular participation level. These accrual values are then transferred into rewards points 2050*a* and stored in rewards catalog 2050.

Likewise, redemption record 2070 preferably includes a product number 2070*a*, a type identifier 2070*b*, and a redemption value 2070*c* for the product number. Type identifier 2070*b* is preferably a value associated with one of the Client, Member, Member Plus, and IBO. An exemplary type identifier 2070*b* is a string selected from the group consisting of Client, Member, Member Plus, and IBO. In the preferred embodiment, redemption record 2070 comprises a redemption value 2070*c* for each type identifier. In this fashion, as a registered Client, Member, Member Plus, and IBO purchases products, he or she will use redemption values differently based upon the particular participation level.

The following illustrates an exemplary purchase and redemption as set forth by the present invention. It should be understood by one of ordinary skill in the art, that the example that follows is for illustrative purposes only and should not be construed to limit the present invention. A registered customer purchases a product, which for the sake of simplicity will be referred to herein as "product A," from the marketing company. Product A has an accrual value 2060*c* equal to, for example, 150 points for a type corresponding to a Member. Alternatively, for example, product A can have an accrual value 2060*c* equal to 200 points for a type corresponding to a Member Plus or 100 for type corresponding to a Client. This accrual value is added to the rewards points 2050*a* value maintained in rewards database 2050, thereby increasing the user's rewards points 2050*a* by 150 points. If the user later wishes to redeem the 150 points for another product or service having a redemption value 2070*c* of 150 points or less, the user initiates the process as described herein above. In response, redemption value 2070*c*, which may be less than or equal to 150 points, is then subtracted from rewards points 2050*a* in rewards database 2050. In an exemplary embodiment of the present invention, redemption value for the redeemed product, may be, for example, 150 points for a Member, 100 points for a Member Plus, and 200 points for a Client. This process may then be continued for subsequent purchases and/or redemptions.

"Virtual Office" Site Functionality

Figure 21:
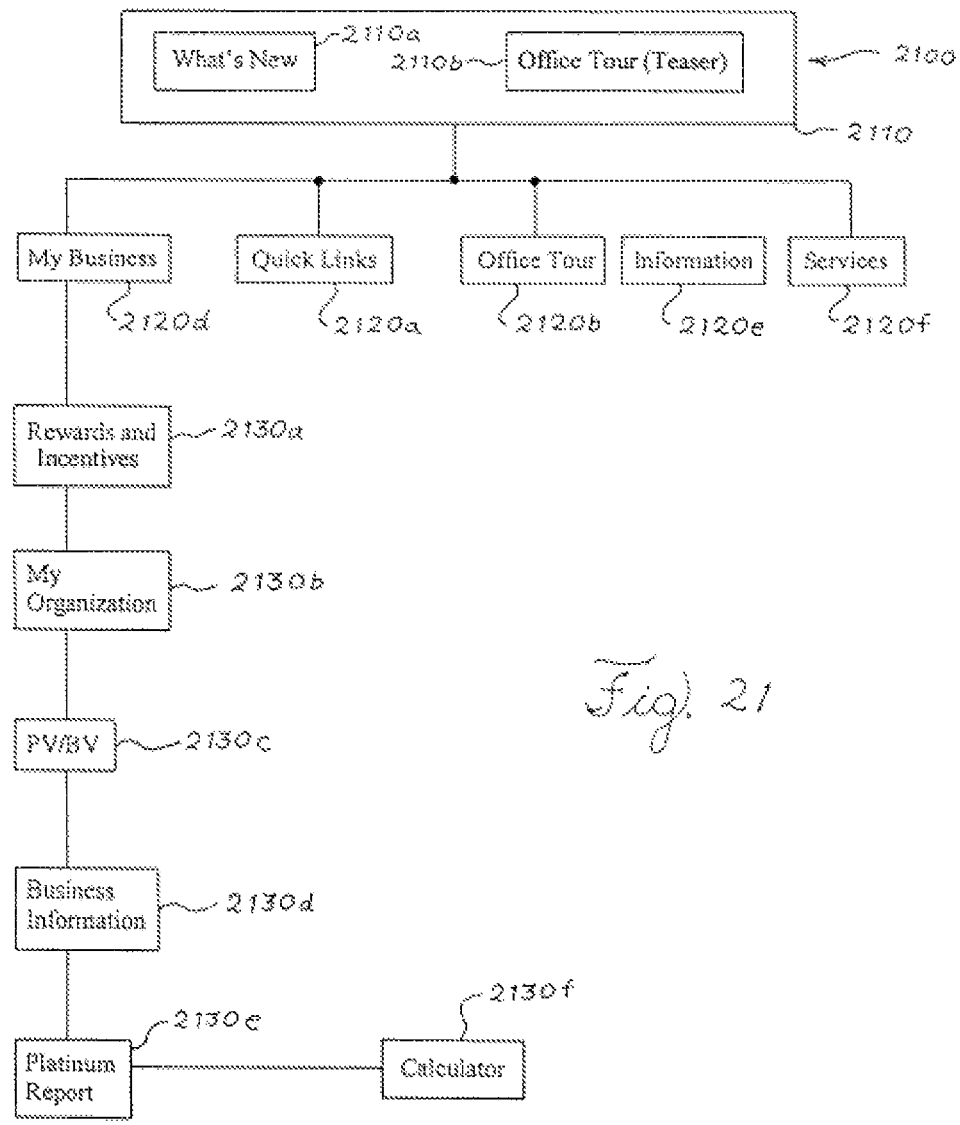
FIG. 21 shows an exemplary layout of a "Virtual Office" page web file of the present invention.

The "Virtual Office" site, or office page web file 2100 preferably contains the tools and information needed to build a successful and prosperous marketing business. An exemplary Virtual Office Site Map is shown in FIG. 21. The site 2100 preferably includes a virtual office home page 2110. Office home page 2110 includes a "What's New Content" link 2110*a*, which provides links to new items within the office page web file and a "Virtual Office Tour" 2110*b*, which allows an individual to tour the capacities of the office page web file.

From the virtual office home page 2110, a user can navigate to one of several associated page web files. Exemplary associated page web files include, but are not limited to, a quick links page 2120*a*, a virtual office tour page 2120*b*, a "My Business" page 2120*d*, an information page 2120*e*, and a services page 2120*f*.

The site 2100 provides a virtual office for Independent Business Owners and Members Plus on the Internet. The Virtual Office provides Members Plus and IBO's with up-to-date business-related information as well as the tools needed to run, plan, and grow a successful E-Commerce business. Qualified users can find items such as volume information, sponsoring information, new products and services, reports and business support materials. Additionally, this area of the site offers interactive features, such as online business transactions.

As noted above, there is also a link to a business transaction service area or "My Business" page 2120*d*. Preferably, page 2120*d* includes the following exemplary links: rewards/incentives 2130*a*, my organization 2130*b*, PV/BV 2130*c*, business information 2130*d*, and a Platinum Only exclusive page 2130*e*, which allows IBOs who have qualified for a Platinum level to view certain information about their businesses. In one embodiment, a Platinum Level is an IBO who has met certain qualification levels, such as but not limited to, sponsoring at least six groups producing at a 25% performance bonus level (see Table 1) for at least six consecutive months.

The PV/BV page 2130*c* preferably allows Independent Business Owners to perform Point Value and Business Volume (PV/BV) transfers from one IBO to another or perform PV/BV inquiries about their personal group. In addition, the IBO can view rewards and incentives available based on product sales and business growth via the rewards and incentives page 2130*a*.

In the "My Organization" page 2130*b*, an IBO or Member Plus may view the line of sponsorship including a personal group comprising at least one individual selected from the group consisting of a registered Client, Member, Member Plus, and a second IBO.

It is preferred that a calculator 2130*f* is available in the Virtual Office site. The calculator can be used as a demonstration tool for Independent Business Owners to show prospects how they can reach their own business goals. The calculator can also be used to determine growth needed to reach certain pin levels, growth needed to reach incentive trips, sales volume needed to qualify for an incentive trip, and level of business needed to produce certain income. Pin levels generally represent, for example, the highest award level an IBO has attained.

The "What's New" link 2110*a* is preferably part of the Virtual Office home page and highlights and provides the links to any new information in the Virtual Office section of the site.

The site also contains a business information area 2130*d* which contains business forms, such as registration and renewal forms, that members may access. It is also preferred that the Virtual Office site contain suitable reports accessible by Members and IBO's within the Virtual Office site. One example of such a report is a PV/BV status report. From the PV/BV status report, an Independent Business Owner can access their PV/BV monthly totals. IBO profile information is also available showing a profile of the IBO's business. The IBO profile information may be limited by level. Independent Business Owners can also access information on their down-line that indicates which individuals need to renew their membership. As used herein, down-line refers to those IBOs who make up an individual IBO's personal group. This group could include people the IBO personally sponsors into the marketing system as well as IBOs that the down-line IBOs have sponsored.

The business information link 2130*d* also preferably has links to several additional areas that include forms, policies, business practice information and tax information. All forms are preferably available in PDF format in the download area, these may include: order; deposit; financing; membership; renewal; special order; affiliate; bank drafts; electronic deposit forms; warehouse authorization.

The information page 2120*e* features several publications that include, for example: recognition pages and product news.

In one embodiment of the present invention, the following exemplary services 2120*f* are made available to IBOs in the Virtual Office area:

Credit Cards—Information on the program and on-line application for credit cards. This is preferably a direct link to a merchant bank.

Tax Audit—Information on the program providing tax audit representation to IBO's with links to providers In the preferred embodiment, the My Organization page 2130*b*, as noted above, allows an IBO to view information regarding the IBO's line of sponsorship (LOS). The IBO is preferably given various options as to what information the IBO would like to view. Exemplary options are set forth below:

1. Flag all of my immediate down lines, including my immediate sponsor and my immediate upline.

2. Flag down lines that have entered my organization 7 or fewer days ago. (in one embodiment, a limit of 1 to 30 days is provided)

3. Flag down lines (excluding down line PD organizations) whose renewal fee is 10 or more days late. (in one embodiment, a limit of 1 to 90 days is provided)

4. Flag down lines with a 'last name' or 'member number/IBO or IMC number' of _____.

This information is derived from queries into a Member Summary Table preferably established at the server computer. Item 1 above allows the IBO to begin what is referred to as "LOS Surfing" without any filters being applied. Items 2 through 4 places a flag next to a list of down lines meeting the specified criteria. For Platinum IBOs this is a list from within their direct distributorship. For other IBOs this is a list from their immediate down lines. As used herein, a Platinum IBO is an IBO who has successfully satisfied sales performance criteria and is considered the leader of a group of other IBOs he or she has directly sponsored, and of those who these IBO's have sponsored, and so on down-line.

As noted above, LOS information is derived from the Member Summary Table. This allows an IBO to surf or navigate through their organization. An organization is navigated one level at a time (e.g., from Platinum Distributor to Platinum Distributor or Member Plus to Member Plus).

Figure 22:
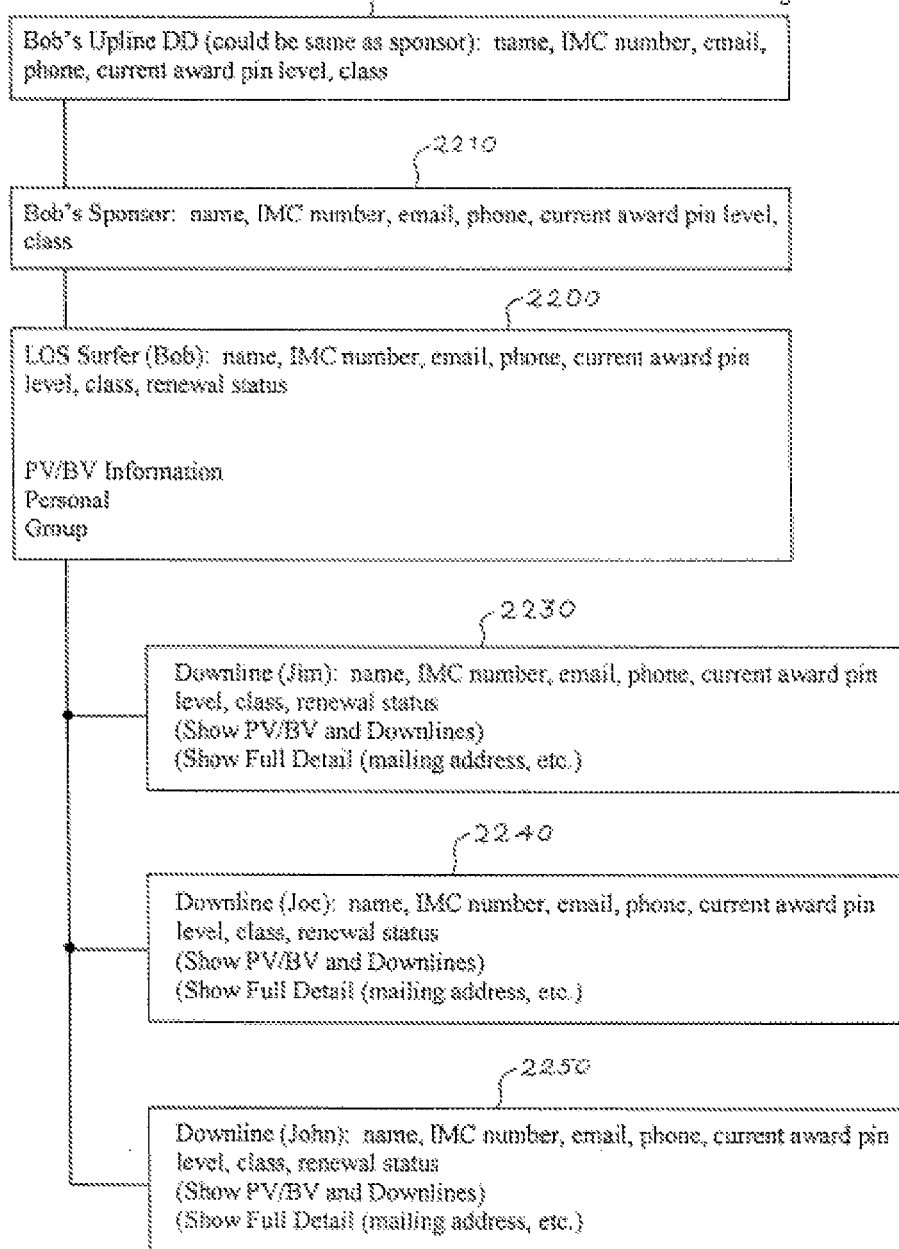
FIG. 22 shows an exemplary display of the structure and content of LOS (Line of Sponsorship) information for an IBO of the present invention.

Referring to FIG. 22, there is shown an example of the structure and content of LOS information for an IBO named "Bob" 2200. FIG. 22 shows what an exemplary initial display of Bob's organization would look like if option 1 above was selected on the "My Organization" page 2130*b* of FIG. 21. The display shows Bob's 2200 immediate sponsor 2210, immediate upline 2220, and down lines (Jim 2230, Joe 2240 and John 2250). The phrase "upline" generally refers to, for example, but is not limited to, those IBOs in a line of sponsorship who were sponsored before a particular IBO, in this case Bob. Only if Bob selects Jim's organization, will he see Jim's down lines. Bob could continue to select down lines as desired.

In addition to LOS surfing, an IBO has access to information relating to the sales of marketing system products and services to, and by, both the IBO and the IBO's personal group via the Virtual Office site. Again, the IBOs personal group, like the LOS, preferably includes at least one individual selected from the group consisting of a registered Member Plus, and IBO. Information that is supplied to the IBO may include sales of marketing system products and services to the personal group and sales of marketing system products and services by the personal group. Additionally, information relating to sales of marketing system products and services to the IBO and sales of marketing system products and services by the IBO can be provided to the IBO.

Additionally, many IBOs prefer to view the total point values and business volumes being generated by individuals in their personal groups. In order to accomplish this, the present invention totals individual point values (PV) assigned to the marketing system products and services sold to and by one of the registered users to achieve a total individual point value. The invention further totals individual business volumes (BV) assigned to the marketing system products and services sold to and by one of the registered users to achieve a total individual business volume. The IBO can then view the total individual point value and the total individual business volume via the virtual office page web file.

In another embodiment, the present invention allows the IBO to view the total PV associated with sales made by and to the IBO and the total BV associated with sales made by and to the IBO. As described above, the total point values for each product sold by and to the IBO is added to the total business volumes for each product sold by and to the IBO. These values are then added together to allow the IBO to view his own personal total PV and BV values.

In another embodiment, the present invention allows the IBO to view the total PV associated with sales made by and to the IBO's personal group and the total BV associated with sales made by and to the IBO's personal group. As described above, the total point values for each product sold by and to the IBO's personal group is added to the total business volumes for each product sold by and to the IBO's personal group. These values are then added together to allow the IBO to view his personal group's total PV and BV values.

In another embodiment, the present invention adds the IBO's personal group's total PV and BV values to those of the individual IBO to obtain a total group PV and a total group BV. This of course would contain all products and services sold to and by the IBO and sold to and by the IBO's personal group. These values are then presented to the IBO upon the IBO's request to view his or her total group PV and BV.

In another embodiment, the present invention establishes a plurality of escalating levels, wherein the escalating levels are preferably a function of sales and marketing products and services. For example, a level may be based on a total volume of sales of marketing system products and services. Therefore, as more products and services are sold, the higher the level can be attained.

Within the office page web file, as noted above, an interactive calculation method, for example, an electronic calculator, is preferably provided. The interactive calculation method allows the IBO to determine a quantity or volume of sales needed to reach one of the plurality of escalating levels. In a preferred embodiment, the IBO can use the interactive calculation method to determine a quantity or volume of sales needed by one of the individuals in the IBO's personal group to reach one of the plurality of levels. This information can then be used by the IBO to help each of the individuals in the IBO's personal group meet the next sales challenge and to provide them with the help that they need. In this fashion, each of the pieces of information provided by the office page web file 2100 aids the IBO in growing the IBO's personal business via the E-Commerce web site of the present invention.

Customer Service Functionality

The E-Commerce Web site of the present invention also preferably provides a variety of customer service functions in order to minimize the need for shoppers to make a phone call for assistance. Exemplary functions are described hereinafter.

In the preferred embodiment, customer service is an option from the main navigation in the E-Commerce web site and is available in all areas associated with the web site. It is preferred that customer service option be available to all visitors to the web site.

Figure 23:
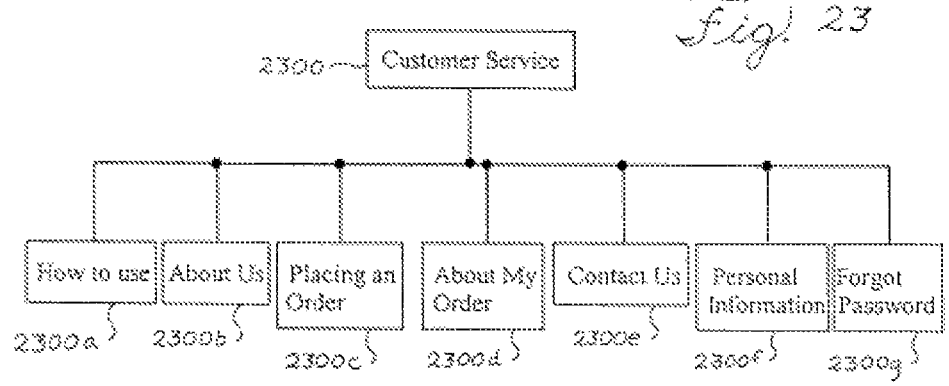
FIG. 23 shows an exemplary layout of a "Customer Service" page web file of the present invention.

A layout of an exemplary customer service page web file 2300 is shown in FIG. 23. In a preferred embodiment, customer service page web file includes a plurality of associate page web files including: a "How to use" file 2300*a*; an "About Us" file 2300*b*, which describes, for example, the marketing company of the present invention; a "Placing an Order" file 2300*c*, which describes how to place an order; an "About My Order" file 2300*d*, which includes information about prior or existing orders; a "Contact Us" file 2300*e*, which includes contact information for the marketing company; a "Edit Profile" file 2300*f*, which allows the user to edit their personal information which has been previously provided by the user, and a "Forgot Password" file 2300*g*, which allows the user to lookup their password in case they have forgotten it.

Figure 24:
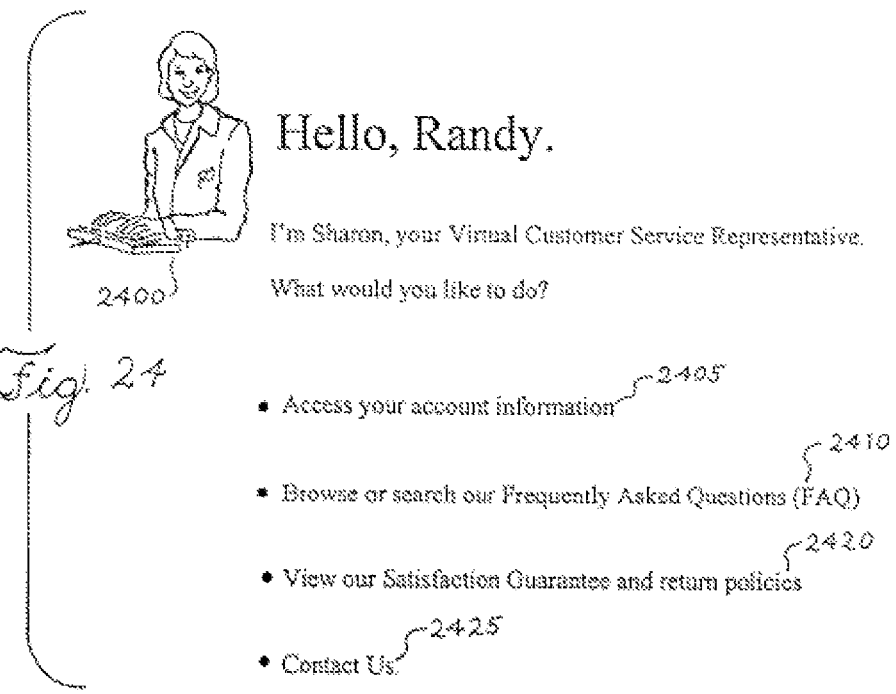
FIG. 24 shows an exemplary display of a Virtual Customer Service Representative of the present invention.

In a preferred embodiment of the present invention, when a user selects the Customer Service file 2300 from within the web site, the user receives a personal greeting from a Virtual Customer Service Representative 2400 ("VCSR") (as can best be seen in FIG. 24). VCSR 2400 is preferably an image of an individual portrayed as a Customer Service Representative ("CSR") on a helpline. As the user selects areas of Customer Service to view, the same CSR will remain with the user, but new images of the same CSR appears. The VCSR provides the user with information and choices while guiding them through their experience within the web site. Repeat visits to Customer Service preferably gives a different CSR on a rotating basis.

Exemplary choices, as shown in FIG. 24, include, accessing account information 2405, using a searchable FAQ of common questions 2410, review the Satisfaction Guarantee information 2420, and "Contact Us" or contact the marketing company 2425. These choices will be discussed in more detail below.

"Contact Us" 2425 preferably comprises of one or more e-mail contact methods. Online e-mail forms for sending questions or requests are provided where appropriate. The general "Contact Us" form handles all general customer service-related and feedback questions in addition to requests for exchanges and refunds of products. In addition to e-mail communications, phone numbers and postal addresses for written communication are provided.

The satisfaction guarantees accessible by the view satisfaction guarantees link 2420 are also clearly stated at key decision making points in the ordering process such as viewing product information and at checkout. Procedures for returning a product for refund is posted in simple terms. In the United States, a pre-paid postage label is provided online for returning items.

The searchable Frequently Asked Questions (FAQ) area 2410 is also available for each section of the E-Commerce site. The marketing company preferably provides the initial list of FAQs for each section and then maintains it once users pose questions.

A customer is also able to pose a product usage related problem or question and receive recommended products and instructions (e.g., "How do I get grass stains out of blue jeans?"). Product support spans both customer service and the shopping experience and is coordinated between the two functional areas.

The site can also include an online pop-up (tool-tip) help for various functional, membership, shopping and navigational items.

Content Management and Maintenance

Content management and maintenance of the E-Commerce site of the present invention allows suitably privileged users access to management functions on the product catalog and merchant information database on the server computer. Particular areas of the site are the responsibility of the content owners regarding ongoing maintenance. All site content is preferably copyrighted and owned by the marketing company. These areas are identified to assist with resource planning.

In terms of user access, access to the content management and maintenance will be restricted. Employees of the marketing company are able to add, delete and modify items in the product catalog database. The typical use of the item management tool is to modify item attributes such as long and short description, and item images. The management system tracks basic audit information such as the time, date and user who made the last change to an item. Exemplary attributes include, but are not limited to the following:

General Shopping

Product information consists of complete and partial product descriptions, product images in multiple sizes and translations;

Supports multi-currency payment options;

Product selection determined by target group. Products are flagged according to membership type, country of origin and language;

Deals of the week and promotions;

Product/SKU search function across all stores, delineated by target group;

E-Mail alert of product specials;

Online content and maintenance of a list of Frequently Asked Questions;

Cross-selling and up-selling;

Competitive matrix of information where content exists;

Product clusters, ability to purchase multiple products;

Animated gifs, including multimedia demos;

Links to other merchant sites and services;

Content outside of product content such as order processing, e-mail correspondence to support multilingual requirements; and All features, static navigation images and text and links to support multilingual requirements.

"My Health" Store

Online technical product information for physicians; and

All features, static navigation images and text and links to support multilingual requirements.

"My Self" Store

Online content for the "What's Hot" in hair and color area;

Online content for the "What's New" area; and

All features, static navigation images and text and links to support multilingual requirements.

"My Home" Store

Online content for stain remedies for laundry and home;

Online content for Laundry 101 feature (how to do laundry, read labels, etc.);

Online content for different holiday decorating tips;

Online water safety facts organized by country zip code or postal code;

Online "My Home" store testimonials;

Online content for the range of personal laundry prescriptions;

Online content for the range of personal cleaning plans;

Online content and product images for the range of decorating styles;

Online content and product images for range of interactive tabletop options; and All features, static navigation images and text and links to support multilingual requirements.

"Member Benefits"

Online content needed for frequent buyer reward programs; and

Online content needed for certificates and any sign-up benefits;

All e-mail, features and links to services such as News, Sports, Weather and Stock Information, support multilingual and multinational requirements.

"Virtual Office"

All features, static navigation images and text and links to support multilingual requirements.

Customer Service

Online content for product warranties, service contracts and registration forms;

Online content for pop-up helps descriptions;

Reply to online multilingual inquiries;

All features, static navigation images and text and links to support multilingual requirements; and Online content and maintenance of a list of Frequently Asked Questions.

Income Options

Online content for Sales and Marketing Plan and/or any other business materials provided to shopper; and All features, static navigation images and text and links to support multilingual requirements.

The management system also provides an interface to create, modify and delete product categories as well as place items in a product class hierarchy. The management system also provides an interface to create, modify and delete product item shipping information. This includes being able to create, modify and delete shipping types and assign prices for shipping types for a given item. In addition, for each item, a default shipping method can be specified. This also includes specifying valid ship to regions for the specified items.

Use Scenarios with Management Content

1. Managed Content with Generated Page

In this scenario, there is preferably a management template and a display template associated with each page type. A content manager needs to open a browser system from his/her workstation and go to a special internal web site that is used to manage content associated with the web site. The content manager logs on, and selects an operation from a list of links to include: check in-box (workflow), and a link to administration for each section the content manager is allowed to work with. (Users, groups and permissions are set up and maintained in a manager). Administration for each content section entails adding a new content page using a simple data entry form or selecting an existing page from a list, pulling up the data in that form, and saving changes. The entire application is operating inside a navigation program, such as Internet Explorer 4.x.

Behind the scenes, the workflow application and the content administration pieces reside on a server computer. The application server component (which displays the pages to the internet user) pulls these records off of the same database that the server computer is managing.

2. Content Management with E-Commerce Server/ASP Page Delivery

This scenario applies to catalogs associated with one or more of the plurality of shopping page web files. The content management for the Shopping catalogs is one option in the administration list. To the content manager, it does not look any different, and it leverages the same workflow application. However, the process to launch content is preferably different. Instead of using the database for the product information pages (product information pages encompassing any content that is served in the Shopping application of the E-Commerce web site), the manager manages content up to the database insertion point—the "live" content is stored in the Commerce product/catalog/shopping database. A customized workflow is necessary for any section of the E-Commerce site that uses this hybrid content management/content delivery system.

When the content manager selects to edit a content page in the catalog, the application "pulls" the data for that record from the live database. The new or updated record in progress is stored in an "edits" database (a separate database that could be a table on the logical database on the E-Commerce SQL cluster) until workflow is completed. Preview is enabled by bringing up the live ASP template, and passing parameters (these can include all information required to draw the page in ASP as well as a "preview" flag). The "preview" flag needs to be able to change the data connection, so that the page is looking to the "edits" database. Upon "launch," the last step in workflow, the customized workflow application in executes an "update" query on the live database (or table) and replaces the record.

Reporting

There are several business reports made available to Members Plus and IBO's within the Virtual Office site as noted above. Exemplary reports include, but are not limited to the following:

PV/BV Status Reports—Independent Business Owners can access their PV/BV monthly totals and line of sponsorship of PV/BV.

IBO Profiles—IBO profile information made available showing a profile of their business. May be limited by level.

Line of Sponsorship Information—Allows Independent Business Owners to view down-line pertinent personal information such as name, address and telephone number.

Internal Business Information—Allows Independent Business Owners to view their PV/BV information and qualification information for their internal organization.

Renewal Information for Down-line—Allows Independent Business Owners to access information on their down-line that indicates which individuals need to renew their membership.

There are also a number of system reports made available to Members Plus and IBO's within the Virtual Office site. Exemplary system reports include, but are not limited to the following:

Order Fulfillment and System Reporting—Tracks and analyzes shopper's interaction with the site such as popular pages, trends, popular deals and promotions, the path visitors take to get to popular pages, how long they stay, where they came from.

Network Communications Configuration

Figure 25:
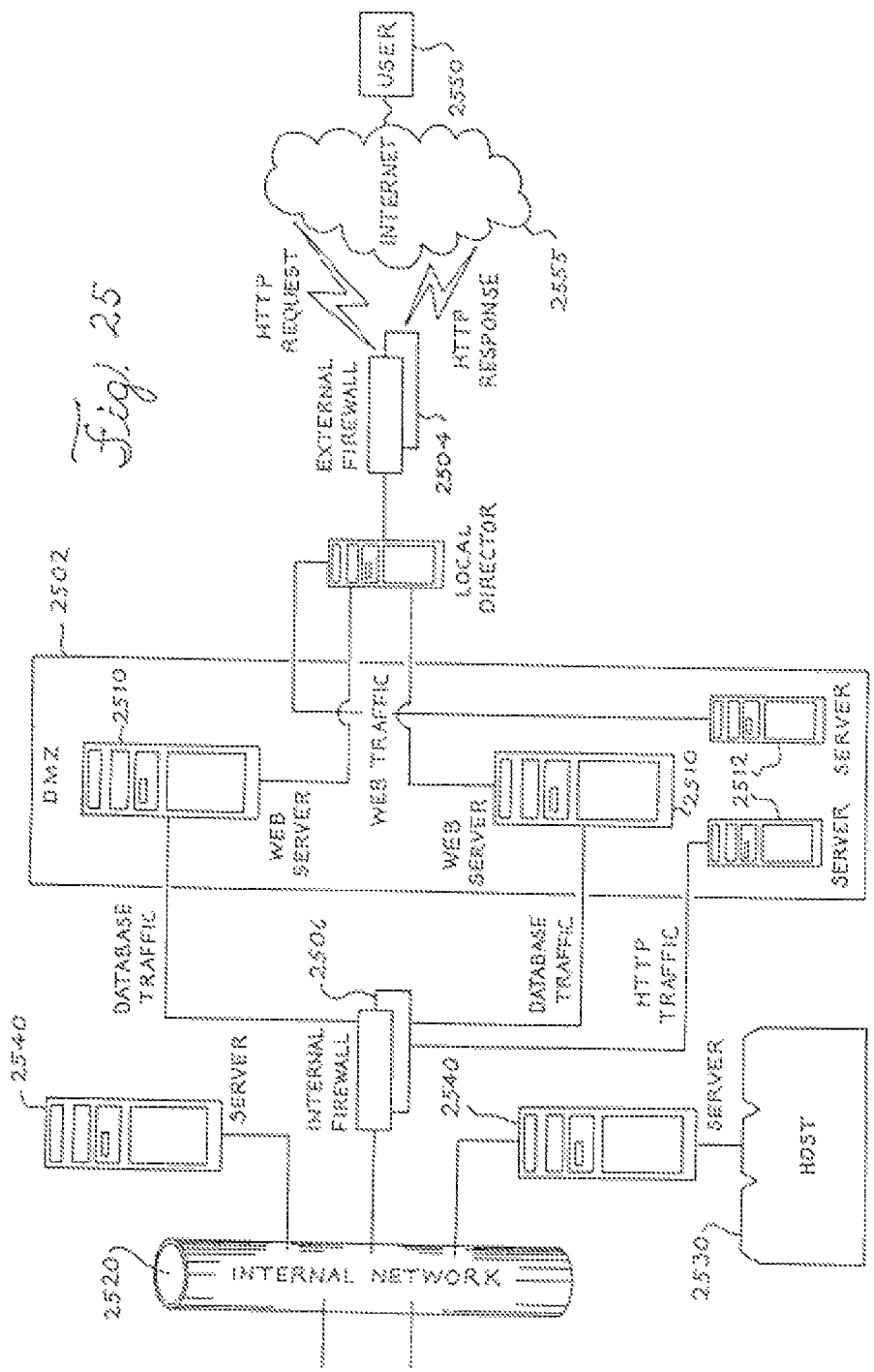
FIG. 25 shows a block diagram of an exemplary implementation of a marketing company network and communication over a network to a user.

Referring now to FIG. 25, there is shown one embodiment of an exemplary implementation of a marketing company network suitable for use with the present invention. The company preferably hosts all Web-related services within the firewalls of the company. As shown in FIG. 25, a DMZ 2502 is located between an external firewall 2504 and an internal firewall 2506. DMZ 2502 preferably comprises web servers 2510 for receiving Web traffic and routing Database traffic. Servers 2512 route http traffic. Traffic is routed by internal firewall 2506 onto Internal Network 2520. Host 2530 and internal servers 2540 also route traffic onto the Internal Network 2520. User 2550 interfaces to the system preferably through a public network such as the Internet 2555.

Data may be stored according to the present invention in a variety of well-known data sources, which can reside in mainframe, AS/400, UNIX and PC based systems, such as host 2530. The majority of the E-Commerce transactions are preferably transactions running on a Legacy system. The backend data sources in host 2530, for example, reside in the following exemplary formats: IMS on the MVS hosts, DB2/400 on the AS/400 hosts and Sybase on the UNIX systems. The following table (Table 3) identifies an embodiment of intended locations of database information required to support an E-Commerce environment of the present invention. It should be apparent to one of skill in the art that the following table is exemplary and does not limit the present invention to the particular objects set forth below.

TABLE 3

Windows NT ® ES/9000 AS/400
Recurring Web Recurring Order Recurring Order
Order Management Management Management
Web Order Tracking Order Order
Tracking Customer Tracking Customer
Service Service
E-Mail and List
Processing
Web Content
Management
Web Membership Membership Membership
Management Management Management
Promotional Pricing Promotional Pricing Promotional Pricing
Content Search
Inventory Inventory Inventory Moreover, data is stored in a variety of data sources that reside in, for example, Legacy, UNIX and PC based systems. It is preferred that a majority of the E-Commerce transactions be processed on either an IBM ES/9000 and/or AS/400 Legacy system, such as host 2530. It should be apparent however that other suitable systems may also be employed.

Testing

To implement a system as embodied in the present invention, it should be apparent to one of ordinary skill in the art that an iterative testing and deployment plan could be useful. Exemplary testing procedures for implementing the present invention are discussed below. It should be apparent to one of ordinary skill in the art, however, that other suitable devices and/or methods may be used.

Unit Testing

The process of testing individual application components/modules. This entails the individual programmer testing the component versus the specification given. This test ensures that the component operates within the specified parameters and is self-contained insofar as tracing and error trapping.

Integration Testing

This phase of testing is to test the interaction between the components specified in the design specification. All components acting independently should now operate smoothly within the integrated environment with respect to data integrity, memory usage, error handling and tracing.

Regression Testing

The process of developing a reiterative process (usually scripts) that will test the base functionality of a site. This ensures that changes made during application development do not produce further errors throughout the system.

Systems/Quality Assurance (QA) Testing

The process of testing a suite of application components/modules, which constitute the complete application. This is usually described as "black-box testing", because Quality Assurance personnel are concerned with ensuring that the application behaves, as it should (i.e., the application functions according to end-user requirements).

Stress Testing

The process of verifying that different services will be delivered as expected under varying loads. Microsoft offers several in-house developed tools free of charge for stress testing. One such tool, the Microsoft Web Capacity Analysis Tool (WCAT) is well-suited for testing E-Commerce configurations. The tool is used to simulate a variety of workload scenarios on the network, allowing a determination to be made regarding the best configuration for the server and network. WCAT is designed specifically for evaluating Internet servers running Microsoft Windows® NT Server and Microsoft Internet Information Server (IIS).

WCAT provides more than 40 ready-to-run workload simulations that enable the user to test the download of various-sized pages or content from the server at different levels of connectivity. The tool is capable of testing Internet server performance using Active Server Pages (ASP), Internet Server Application Programming Interface (ISAPI) extensions and Common Gateway Interface (CGI) applications.

To determine the maximum possible performance of the E-Commerce sites, the following are preferred:

An isolated private network should be available (so as not to disrupt normal business operations);

The generation of enough Web clients to max out a test Web server;

Adequate network bandwidth (100 MBPS or better);

Several network cards/connections to distribute the load; and

A multiprocessor database server for scalability testing (intended hardware for database services).

Performance/Capacity Testing

Performance/Capacity test ensures that the system is capable of meeting its performance and capacity requirements. A performance/capacity test specification outlines the tests to be performed, sample data that needs to be created and any test software that needs to be developed.

Usability Testing

The process of verifying that users can accomplish their tasks with the software as well as ensuring that software meets recognized standards. As an example, the CSS Style Testing Tool (StyleT) performs a series of tests to ensure that the syntax of the Web content meets the Cascading Style Sheet (CSS) Specification.

Acceptance Testing

The user organization tests the complete application against the requirements of functional acceptance ("black-box" testing). E-Commerce brings together very complex business logic (different membership types, language requirements, product types, member profiles, content creation and distribution methods) as well as several layers of technology. Testing is forecasted to be one of the critical success factors and accordingly requires considerably more time to validate and implement the deliverables.

Computer System

Figure 26:
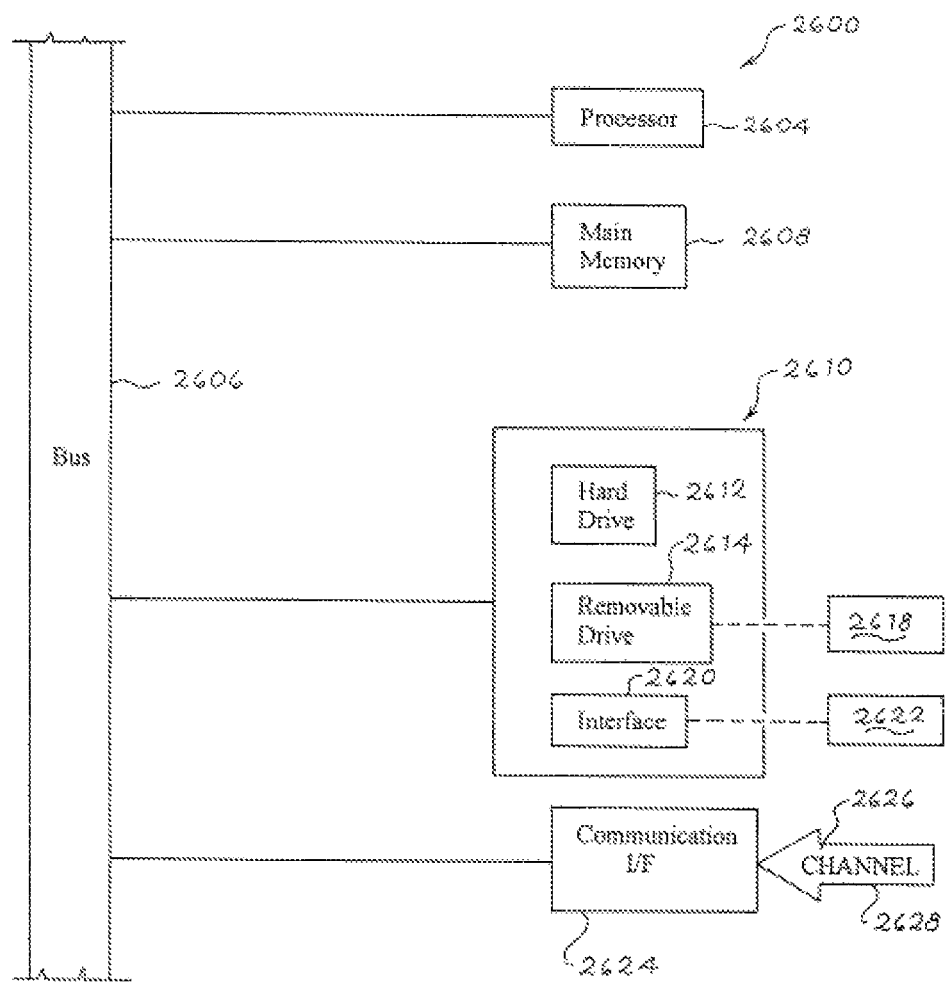
FIG. 26 shows an exemplary computer system suitable for use with the present invention.

A computer system capable of carrying out the functionality described herein is shown in more detail in FIG. 26. Computer system 2600 includes one or more processors, such as processor 2604. Processor 2604 is connected to a communication bus 2606. Various software embodiments are described in terms of this exemplary computer system. After reading this description, it will become apparent to a person skilled in the relevant art how to implement the invention using other computer systems and/or computer architectures.

Computer system 2600 also includes a main memory 2608, preferably random access memory (RAM), and can also include a secondary memory 2610. Secondary memory 2610 can include, for example, a hard disk drive 2612 and/or a removable storage drive 2614, representing a floppy disk drive, a magnetic tape drive, an optical disk drive, etc. Removable storage drive 2614 reads from and/or writes to a removable storage unit 2618 in a well known manner. Removable storage unit 2618, represents a floppy disk, magnetic tape, optical disk, etc. which is read by and written to by removable storage drive 2614. As will be appreciated, removable storage unit 2618 includes a computer usable storage medium having stored therein computer software and/or data.

In alternative embodiments, secondary memory 2610 may include other similar means for allowing computer programs or other instructions to be loaded into computer system 2600. Such means can include, for example, a removable storage unit 2622 and an interface 2620. Examples of such can include a program cartridge and cartridge interface (such as that found in video game devices), a removable memory chip (such as an EPROM, or PROM) and associated socket, and other removable storage units 2622 and interfaces 2620 which allow software and data to be transferred from removable storage unit 2622 to computer system 2600.

Computer system 2600 can also include a communications interface 2624. Communications interface 2624 allows software and data to be transferred between computer system 2600 and external devices. Examples of communications interface 2624 can include a modem, a network interface (such as an Ethernet card), a communications port, a PCM-CIA slot and card, etc. Software and data transferred via communications interface 2624 are in the form of signals 2626 that can be electronic, electromagnetic, optical or other signals capable of being received by communications interface 2624. Signals 2626 are provided to communications interface via a channel 2628. Channel 2628 carries signals 2626 and can be implemented using wire or cable, fiber optics, a phone line, a cellular phone link, an RF link and other communications channels.

In this document, the terms "computer program medium" and "computer usable medium" are used to generally refer to media such as removable storage device 2618, a hard disk installed in hard disk drive 2612, and signals 2626. These computer program products are means for providing software to computer system 2600.

Computer programs (also called computer control logic) are stored in main memory 2608 and/or secondary memory 2610. Computer programs can also be received via communications interface 2624. Such computer programs, when executed, enable computer system 2600 to perform the features of the present invention as discussed herein. In particular, the computer programs, when executed, enable processor 2604 to perform the features of the present invention. Accordingly, such computer programs represent controllers of computer system 2600.

In an embodiment where the invention is implemented using software, the software may be stored in a computer program product and loaded into computer system 2600 using removable storage drive 2614, hard drive 2612 or communications interface 2624. The control logic (software), when executed by processor 2604, causes processor 2604 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

CONCLUSION

While various embodiments of the present invention have been described above, it should be understood that they have been presented by way of example only, and not limitation. Thus, the breadth and scope of the present invention should not be limited by any of the above-described exemplary embodiments.

We claim:

1. A system for facilitating electronic commerce transactions in a marketing system comprising:
    a memory device having embodied therein information relating to a plurality of marketing system products or services; and
    a processor in communication with the memory device, the processor configured to:
        establish an interactive online registration process so that a plurality of individuals may register with the marketing system in a First Participation Category wherein an individual registered in the First Participation Category is eligible to buy products or services at a First Participation Category price and is eligible to earn compensation based on sales to other individuals;
        provide a plurality of web files operatively coupled to a web site associated with the marketing system;
        allow access to a plurality of marketing system products or services to an individual not registered with the marketing system via at least one of the plurality of web files; and
        receive an indication that the unregistered individual wishes to undertake a transaction with the marketing system and, in response thereto, select an individual registered in the First Participation Category of the plurality of individuals registered in the First Participation Category, the selection being based on a geographic proximity of the registered individual to the unregistered individual, and establish an assignment of the unregistered individual with the selected registered individual such that the selected registered individual earns compensation based on the transaction, the selected individual having no participation in the transaction between the marketing system and the unregistered individual.

2. The system of claim 1 wherein the selection is based on postal or zip code.

3. The system of claim 1 wherein the assignment of the unregistered individual with the selected registered individual is transparent to unregistered individual.

4. The system of claim 1 wherein each of the plurality of individuals registered in the First Participation Category is an intermediary between the marketing system and individuals not registered with the marketing system and capable of selling marketing system products or services thereto.

5. The system of claim 1 wherein the processor is further configured to:
    establish the interactive online registration process so that the plurality of individuals may register in a Second Participation Category or a Third Participation Category, wherein an individual registered in the Second Participation Category is not eligible to earn compensation and is eligible to buy products or services at a Second Participation Category price, wherein an individual registered in the Third Participation Category is eligible to earn compensation based on sales to other individuals registered in the Second Participation Category and is eligible to buy products or services at a Third Participation Category price and wherein an individual registered in the Third Participation Category may be promoted to the First Participation Category based on satisfaction of a goal, the goal comprising satisfaction of a sales qualification.

6. The system of claim 1 wherein the processor is further configured to calculate the amount of compensation earned by the selected registered individual based on the transaction.

7. The system of claim 1 wherein the system further comprises a database coupled with the processor, the database operative to store data representative of the plurality of registered individuals including geographic data associated therewith.

8. The system of claim 1 wherein the processor is further configured to allow access to the plurality of marketing system products or services via web browser program executing on a computer associated with the unregistered individual.

9. The system of claim 1 wherein the processor is further configured to allow access to the plurality of marketing system products or services via the Internet.

10. The system of claim 1 wherein the processor is further configured to allow access to the plurality of marketing system products or services via a telephone.

11. The system of claim 1 wherein the processor is further configured to allow a registered individual to review their compensation.

* * * * *